(12) United States Patent
Faletti et al.

(10) Patent No.: US 9,298,702 B1
(45) Date of Patent: *Mar. 29, 2016

(54) SYSTEMS AND METHODS FOR PAIRING OF A SEMANTIC NETWORK AND A NATURAL LANGUAGE PROCESSING INFORMATION EXTRACTION SYSTEM

(71) Applicant: Semantic Research, Inc., San Diego, CA (US)

(72) Inventors: Joseph Faletti, San Diego, CA (US); Hilary Anne Stockley, San Diego, CA (US); Harold Jason Wells, San Diego, CA (US); Timothy Andrew Murphy, Bowie, MD (US)

(73) Assignee: Semantic Research Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,726

(22) Filed: Apr. 4, 2013

Related U.S. Application Data

(63) Continuation of application No. 12/621,478, filed on Nov. 18, 2009, now Pat. No. 8,442,940.

(60) Provisional application No. 61/115,543, filed on Nov. 18, 2008.

(51) Int. Cl.
*G06F 17/27* (2006.01)
*G06F 17/30* (2006.01)
*G06F 17/28* (2006.01)

(52) U.S. Cl.
CPC .......... *G06F 17/28* (2013.01); *G06F 17/2785* (2013.01); *G06F 17/30734* (2013.01)

(58) Field of Classification Search
CPC .................... G06F 17/2785; G06F 17/30734
USPC .............................................. 704/9; 707/610
See application file for complete search history.

(56) References Cited

U.S. PATENT DOCUMENTS

| 2004/0230572 | A1* | 11/2004 | Omoigui ........................... 707/3 |
| 2006/0004703 | A1* | 1/2006 | Spivack et al. .................... 707/2 |
| 2010/0070448 | A1* | 3/2010 | Omoigui ......................... 706/47 |
| 2010/0100546 | A1* | 4/2010 | Kohler .......................... 707/739 |

OTHER PUBLICATIONS

Witte et al. "Connecting Wikis and Natural Language Processing Systems", Proceedings of the 2007 International Symposium on Wikis, pp. 165-176, Oct. 2007.*
Witte et al. "A Semantic Wiki Approach to Cultural Heritage Data Management", Proceedings of LREC Workshop on Language Technology for Cultural Heritage Data, Jun. 2008.*
Buffa et al. "SweetWiki: A Semantic Wiki", Web Semantics: Science, Services and Agents on the World Wide Web, vol. 6, Issue 1, Feb. 2008.*

* cited by examiner

*Primary Examiner* — Samuel G Neway
(74) *Attorney, Agent, or Firm* — Cooley LLP

(57) ABSTRACT

Systems and methods for coupling a semantic network editing tool and a natural language processing (NLP) system are disclosed. In one embodiment, a network editing tool includes or is connected to an application module configured to facilitate queries to the NLP system and extraction of data from a collection of document by the NLP system for integration of contents with the semantic network.

54 Claims, 35 Drawing Sheets

High-Level Data and Control Flow in an Exemplary Embodiment

Traditional Semantic Network
(PRIOR ART)

Example of Entities in a Semantica® Network

Physical Configuration of An Exemplary Embodiment

High-Level Data and Control Flow in an Exemplary Embodiment

Knowledge Architecture of an Example NLP System

Information Extraction Processes in an Example NLP System

Flow of Information Among Service Modules in an Example NLP System

Components of an Example NLP System in Accordance with Aspects of the Present Invention An Embodiment of an NLP Panel Provided in an Exemplary NLP System An Embodiment of an NLP Question and Answer Panel Embedded in a Network Editing Environment An Example Instance of Entity Type Ship_Attack, shown as Ship_Attack 19, along with its Triplets Element Types for Triplet Roles in the Drug Seizure Element Type Example Marked Up Document Containing 7 Instances of Drug Seizures An Example of a Typical User's Local Collection of Indices in their "My Indexes" Folder An Example of Results from Querying "What Drug Seizures in Mexico Involved Cocaine"

An Example of Workflow for Loading the Individual Document Selection Module and Choosing the Target Documents and Extractors An Example of Completed NLP Processing of an Individually Selected Document An Example of A Sample of Available Extractors in the NLP System Integrated in an Exemplary Embodiment

Fig. 18
An Example of a Custom DrugSeizure Extractor Being Defined in the NLP System of an Exemplary Embodiment The Provenance for an Entity Extracted by an NLP System Embedded in an
Exemplary Embodiment and Stored as Properties in the Network Editing Tool An Example of Training of Roles of a Drug Seizure Extractor in an Exemplary Embodiment's NLP System An Example of A Portion of the Ontology Provided by an Exemplary Embodiment's NLP System, Including Many of the Element Types Mapped Into the DrugSeizure Template An Example of Element Type Assignments To Extracted Role Fillers in the Triplets of an Extracted Frame An Example Showing Provenance and Other Source References An Example Semantica Report Example Screen Shot Showing A Report Produced with Embedded Geospatial Information Superimposed on a Goole Earth Map A Screen Shot of an Example Wiki Page (Taken from Wikipedia)

Example Screen Shot of a Gap Filling User Interface

Example of Gap Filling Results Corresponding to the Screen Shot of FIG. 10

Example Screen Shot Showing Special Menu Items in the Main Menu of a Network Editing Tool Example Screen Shot Showing Extraction of Entities and Their Types Example Screen Shot Showing Extraction of All Events of Desired Types Example Screen Shot Showing Extraction Being Requested Example Screen Shot Showing Colored Entities That Can be Added to the Network Editing Tool Example of Choice of Methods for Creating Role-Filler Concepts with More Structure

SYSTEMS AND METHODS FOR PAIRING OF A SEMANTIC NETWORK AND A NATURAL LANGUAGE PROCESSING INFORMATION EXTRACTION SYSTEM

CROSS-REFERENCE TO RELATED APPLICATIONS

This application is a continuation of U.S. patent application Ser. No. 12/621,478, entitled SYSTEMS & METHODS FOR PAIRING OF A SEMANTIC NETWORK AND A NATURAL LANGUAGE PROCESSING INFORMATION EXTRACTION SYSTEM, filed on Nov. 18, 2009, which claims priority under 35 U.S. C. §119(e) to U.S. Provisional Patent Application Ser. No. 61/115,543, entitled THE PAIRING OF A SEMANTIC NETWORK AND A NATURAL LANGUAGE PROCESSING INFORMATION EXTRACTION SYSTEM, filed on Nov. 18, 2008, the contents of each of which are hereby incorporated by reference herein in their entirety for all purposes.

This application is also related to U.S. Utility patent application Ser. No. 12/436,052, entitled SYSTEMS AND METHODS FOR PAIRING OF A SEMANTIC NETWORK AND A KNOWLEDGE SHARING REPOSITORY, filed on May 5, 2009, the content of which is hereby incorporated by reference herein in its entirety for all purposes.

FIELD OF THE INVENTION

The present invention relates generally to computer systems and computer implemented methods and associated user interfaces for knowledge capture and representation. More specifically, but not exclusively, the present invention relates to systems and methods for transfer of information to and among a group of users of networks of knowledge in a semi-structured way that may be acquired or augmented, as well as annotated, through processing, storage and extraction in conjunction with a Natural Language Processing (NLP) system.

BACKGROUND

A traditional semantic network is a formal structure for embodying or representing knowledge. It is designed to impose a rigorous structure upon knowledge so that an artificial intelligence computer program or expert system can operate on and reason from and with the knowledge. It is also used to embody the new knowledge resulting from the reasoning of such systems.

Traditional semantic networks constrain how knowledge can be captured and organized so that it fits with the reasoning system's needs for reasoning, while still maintaining enough flexibility to handle variations in kinds of expert knowledge that needs to be reasoned with and about.

Most prior uses of semantic networks in computer software applications have been focused on managing information for the use of expert systems or other artificially intelligent programs. Experts setting about the task of entering their knowledge into such a traditional system are required to learn constrained methods for expressing what they know in a form that the expert system can use and reason with. Consequently, the methods used to operate on these traditional semantic networks have been tailored for the needs of the systems using this knowledge, and consequently lack flexibility.

SUMMARY

The present invention relates generally to systems and methods for knowledge capture, representation and storage by pairing an NLP with a semantic network in conjunction with NLP and semantic network editing tools.

In one aspect, the present invention relates to a computer implemented method for processing natural language information in conjunction with a natural language processing (NLP) system, comprising providing a user interface in communication with a network editing tool disposed to facilitate processing of information in the NLP system from a collection of documents stored in a document repository so as to provide a set of processed information, communicatively coupling the network editing tool and the NLP system so as to facilitate transfer of data or information between the network editing tool and the NLP system and responsive to a user input provided at the user interface, extracting the set of processed information from the NLP system to a semantic network.

In another aspect, the present invention relates to a machine readable medium including executable instructions for execution on a processor to provide a user interface in communication with a network editing tool disposed to facilitate processing of information in an NLP system from a collection of documents stored in a document repository so as to provide a set of processed information, communicatively couple the network editing tool and the NLP system so as to facilitate transfer of data or information between the network editing tool and the NLP system and, responsive to said coupling, extracting the set of processed information from the NLP system to a semantic network.

In another aspect, the present invention relates to a system for processing natural language information, comprising a a processor, a memory and a network editing tool, said network editing tool including one or more modules disposed to be communicatively coupled with an NLP system and a document repository to facilitate extraction of processed information from the NLP system into a semantic network disposed to be editing with the network editing tool.

Various additional aspects of the present invention are further described below in conjunction with the appended drawings.

BRIEF DESCRIPTION OF THE DRAWINGS

The present invention is more fully appreciated in connection with the following detailed description taken in conjunction with the accompanying drawings, wherein:

FIG. 18 is an illustration of an example of a custom Drug-Seizure Extractor being defined in an NLP System of an exemplary embodiment of the present invention;

DETAILED DESCRIPTION OF EMBODIMENTS OF THE INVENTION

Introduction

Figure 1:
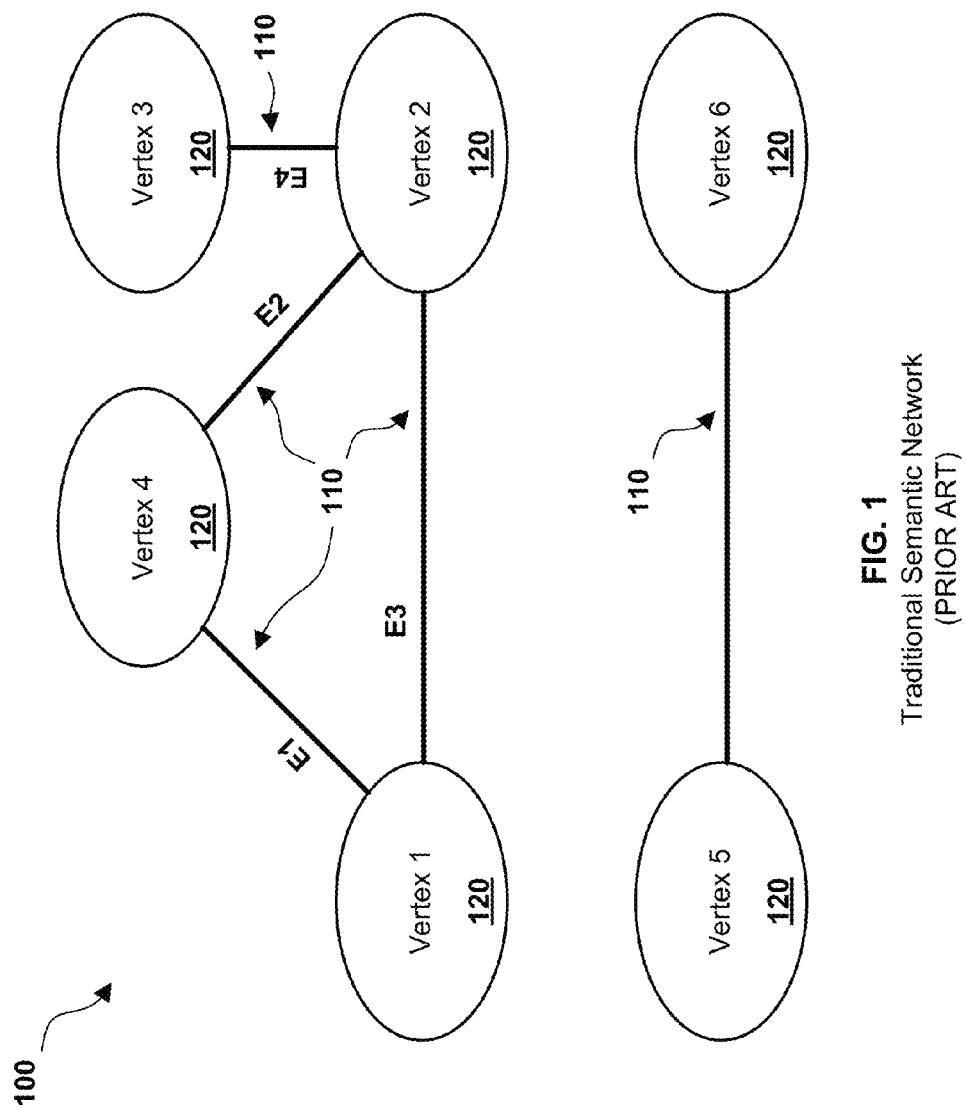
FIG. 1 is a high level illustration of a traditional semantic network.

The present invention relates generally to computer systems and computer implemented methods and associated user interfaces for knowledge capture, representation, storage, analysis and presentation. More specifically, but not exclusively, the present invention relates to systems and methods for transfer of information to and among a group of collaborating users of networks of knowledge in a semi-structured way that may be acquired or augmented, as well as annotated, through processing, storage and extraction in conjunction with a Natural Language Processing (NLP) system.

Summary of Selected Terminology and Definitions Used Herein

Various terminology is used herein to describe details of particular embodiments of the present invention. This terminology and associated definitions are used for purposes of explanation, not limitation. Accordingly, other terminology and definitions may also be used to represent the same or equivalent functionality as is described herein. In order to facilitate understanding of the terminology used herein, a summary of terms used herein and their associated definition is provided below:

Concepts—Describes each individual labeled Vertex in a Knowledge Structure.

Edges—Edges are links that are used to tie together Vertices.

Element Types—As applied to Entities (Concepts, Triplets, Relation Types and other kinds of Elements), the term describes labels applied to Entities to categorize them and embody meaning about the kind of entity they represent. Associated with each Element Type may be a separate network of linked, typed entities called a Semantica®-style Knowledge Structure Template that includes links that are typically expected to be present in describing the details of entities of that type, although Triplets connected to an entity of this element type are neither required to include these Semantica template links, nor limited to only these links.

Gap—A Gap is a concept that has been marked to indicate that it is an unknown or unfilled-in value that is needed to specify this attribute's value.

Knowledge Sharing Repository or "Wiki"—A Knowledge Sharing Repository is any collection of user- or community-generated aggregations of information as a collection of web pages or as an otherwise collected knowledge base of entity-focused documents, pages or other information content. Knowledge Sharing Repositories are frequently referred to as, but are not limited to, so called "wikis," such as may be found at online sites such as Wikipedia (www.wikipedia.org). However, other types of Knowledge Sharing Repositories that are not in the form of web pages also exist, and the functionality provided by the present invention may also be applied to them unless noted otherwise.

Knowledge Structure—As used herein, this refers to a Semantica-Style Knowledge Structure embodying a Semantic Network and based on Semantica software applications. Unless noted otherwise, implementations of the present invention may be equally applied to other types of Semantic Networks that include the characteristic features described herein and/or known in the art, and not just specifically to Knowledge Structures as defined above. For purposes of providing details of specific implementations, the term Knowledge Structure may be used interchangeably herein to refer to a Semantic Network; however, the functionality of the present invention may be equally applied to other similar or equivalent structures for organizing data that lacks explicit structure.

Knowledge Object (Attachment)—A special case of an Entity that encapsulates or points to a document such as a picture, a text note, the URL of a web page, or any other electronic document, allowing it to be linked to other entities.

Labels—Labels on Edges are used to characterize the nature of the link between two Vertices.

Network Editing and Analysis Tool—A network editing and analysis tool is a computer software application for creating, modifying and exploring a network-like collection of links.

Natural Language Processing (NLP) System—A natural language processing (NLP) information extraction system is a computer software application providing one or more tools that extract information from documents or other sources containing natural language including but not limited to Named Entity Recognition (NER), Event Extraction (EE), Relationship/Role Extraction (R/RE), Attribute Extraction, and Subjective Information Extraction, also referred to herein as an "NLP system" for brevity. An NLP system identifies occurrences of various entities and events along with their roles, attributes or properties, and the relationships among them, supplying them in an easy exchange medium for further processing by other software tools.

Relation Type—A Label that defines or categorizes the nature of a Link between two Concepts, such as in a Triplet.

Semantic Network—A Semantic network is a multi-dimensional web of ideas or things that are linked together in specific ways. As used herein, the terms "semantic network" and "knowledge structure" may be used interchangeably, with a knowledge structure referring, for purposes of example, to a specific type of Semantic Network used in Semantica software applications.

Triplet An individual Edge or Link, tying two Concepts together labeled with a particular Relation Type.

Vertex, Vertices—Vertices (sometimes also known as Nodes) are the fundamental unit from which graphs are formed. Vertices may have additional structure, such as representing Concepts or Knowledge Objects or Triplets in Semantic Networks.

Semantic Networks Overview

The present invention relates generally to systems and methods for coupling or pairing a semantic network with information extracted from a collection of documents, and in particular from information, typically based on a collection of documents, that may be obtained in conjunction with functionality provided by a natural language processing system (NLP) system. This information or data may be processed and incorporated in the semantic network and/or information or data from the semantic network may be shared with the NLP system. In order to further understand various aspects of the present invention, additional details of semantic networks are further described below.

As is known in the art, a semantic network is a multi-dimensional web of ideas or things that are linked together in specific ways. Semantic networks have been historically used in fields such as artificial intelligence to aid in the organization and embodiment of expert knowledge to feed computer-automated deductive, problem solving or training applications.

In general, the work described herein is focused on applying the described systems and methods to two different but related tasks: the one-to-many transfer or communication of knowledge from a knowledge source, which may be human or machine, to users of that knowledge, and/or facilitating sharing and/or collaborative massaging of knowledge by a group of knowledge workers. In a typical embodiment, the knowledge source is an "expert," either human or machine; however, it does not necessarily need to be so.

Attention is now directed to FIG. 1, which illustrates an example of a traditional semantic network 100. Semantic network 100 is an undirected, non-simple graph with labeled edges 110 and (possibly labeled) vertices 120. The vertices and edges may be interpreted individually or in combination to form one or more of the four fundamental semantic network constructs:

1) Vertices, possibly with labels (as shown in FIG. 1, vertices 120 are labeled Vertex 1 through Vertex 6 for purposes of illustration);
2) Edges tying two vertices together;
3) Labels on Edges (as shown in FIG. 1, edges 110 are labeled E1 through E4, with the lowest edge having no label) characterizing the nature of the link between the two vertices; and
4) Entity Types associated with the vertices (not shown in FIG. 1).

Every traditional semantic network is an assembly of these elements (vertices, edges, edge labels and entity types). Each one imposes rules about the ways in which vertices and edges are labeled or typed and about the ways in which reasoning is performed based on those labels or types.

The assignee of the present invention, Semantic Research, Inc., designs and develops tools for creating, editing and interacting with semantic networks. One provided product is Semantica software, which supports a form of semantic network known as a Semantica-style knowledge structure (also denoted herein as a "knowledge structure" for brevity).

A knowledge structure is an idealized and generalized structure for capturing and representing knowledge. It is related in its most abstract form to the general description above of a traditional semantic network. However, in application, it is particularly appropriate for capturing data and information for human use that lacks explicit structure, that is difficult to impose a rigorous structure upon or that is tacit in nature (and hence not commonly or easily expressed in computer documents intended for direct comprehension by humans). It may also be useful as a common representation model for creating a single view of data and information from multiple, potentially disparate sources, such as structured data from databases of varying flavors, unstructured information from various types of documents and/or web pages (via NLP) and/or handmade tacit knowledge annotations.

A knowledge structure provides extensive flexibility in how knowledge is captured and organized, while still maintaining an effective and unambiguous framework for qualitative, cognitive (human) interaction and quantitative, automated machine interaction, storage and retrieval. In this sense, a knowledge structure sits at an ideal midpoint between the abstract notion of how knowledge is composed and the forms in which knowledge is conventionally concretely organized in computer-based representations such as diagrams, word processing documents, spreadsheets, databases, and formal networks.

A knowledge structure may further extend the structure of a traditional semantic network by: a) promoting edges to the status of vertices or entities, often referred to as reifying the edges; b) promoting edge labels to the status of entity types, called relation types to distinguish them from other kinds of entity types; and/or c) by promoting entity types to the status of vertices or entities, that is, by also reifying element types.

A knowledge structure may also be uniquely easy for humans to enter and organize compared with other more conventional representations. This ease of creation is particularly facilitated by allowing creation of individual edges without need for a context, and by providing great flexibility in the definition of edge labels and other entity types. This flexible editing may be instantly saved in a network database or other storage format that can be modified in a piecemeal fashion for shared access.

In various aspects, the present invention is focused on applying these constructs and techniques to two different but related tasks:

1) the one-to-many transfer or communication of knowledge from a knowledge source (as noted previously, possibly, but not necessarily, an "expert") to users of that knowledge, and;
2) the sharing and collaborative massaging of knowledge by a group of knowledge workers.

As such, various embodiments of the present invention may be provided as a generalized tool for use on computer based systems to provide a variety of applications. This generalized tool may be incorporated directly into a network editing and analysis tool such as the Semantica, software applications or other network editing and analysis tool. Alternately, embodiments of the present invention may comprise an "add on" or "plug-in" application for incorporation into or operation in conjunction with a network editing and analysis tool. In yet other implementations, embodiments of the present invention may be in the form of a standalone application disposed to implement the functionality herein.

The present invention may be applied to a wide range of applications in different fields. These may include applications in a range of business processes, intelligence capture and analysis, as well as a wide variety of other applications. Specific applications to which the present invention may be applied include, but are not limited to: education and training; knowledge construction, management and transfer; bio-informatics; genealogy; law enforcement; insurance; intelligence; law; medicine; entertainment; other case-management fields; other fields involving sharing of knowledge; as well as other applications.

In particular, features and advantage of embodiments of the present invention may include the following:

Providing a smooth and complete work-flow from raw documents through reports and recommendations including the steps of 1) finding documents locally or on the web that satisfy user criteria, either through traditional search terms or as specified by indicating templates or gaps in a semantic network that need to be filled; 2) gathering documents, either in a local file system or in a possibly-shared document repository; 3) filtering documents to a more focused subset based on specific aspects of the information and data in them; 4) indexing and annotating documents to enhance targeted queries, either manually as discovered in a desktop environment, or in batches in an integrated enterprise environment; 5) querying for relevant documents with natural language questions or other search queries processed by the NLP system; 6) manually filtering the documents returned by the query; 7) viewing and refining the resulting document markup; 8) extracting the complete set of annotations (entities, events, roles, attributes, relationships and subjective views of them) from the filtered and refined documents into data or information for incorporation into a semantic network, along with ancillary information from the NLP system, including entity types transformed from the NLP ontology into the semantic network ontology, and complete provenance allowing access back to the original, plus direct attachment of the textual context (sentence, paragraph) of each annotation in the semantic network; 9) manually dragging extracted annotations (entities, events, roles, attributes, relationships and subjective views) from a single document into a semantic network, along with said ancillary information; 10) further analyzing, visualizing, amending, augmenting, annotating, and merging semantic network content from multiple sources, including other information entered manually or from alternative process; 11) packaging the results as a sharable semantic network that other analysts can further modify or use, and that is also further indexable/searchable by the NLP system or web search engines; 12) generating a printable and editable word-processing-formatted report, intended for human reading or editing, containing the concise conclusions derived from the extraction and analysis in several forms including a) pictorial graph views, b) natural language text summaries of the source text ("gisting"), c) natural language-based triplet summaries and semi-structured (frame-and-slot-filler) summaries of the graph views, and/or d) complete provenance and source context, and 13) storing the resulting semantic network file and other reports in the document repository for further analysis.

In addition, embodiments of the present invention may allow users to share much more complex information that is still structured enough to edit with a network/link editing and analysis tool but still tied to the source documents and derived from and embedded in unstructured documents suitable for processing by an NLP system; supporting a structured ontology behind the scenes while leaving the flexibility of processing and editing text with standard text editing tools; supporting two separate structured ontologies or other categorization systems behind the scenes of both a network/link editing and analysis tool and an NLP system, while leaving the flexibility of editing the network and its ontology or editing the text and adapting the NLP system's ontology or other categorization system dynamically; taking advantage of existing open-source standards and protocols such as HTML, HTTP, HTTPS, PKI, CSS, RMI, RPC, XML, and published APIs for various NLP systems to 1) allow cooperation with multiple computer applications, thus allowing the easy switching to the optimum editing and management tools for the task; 2) transform from the documents and collections of documents structure of a document repository through an NLP system to the node-and-edge representations of semantic networks and specifically knowledge structures; 3) maintain secure connections and establish encrypted or network-based user identification to provide element-level access control and other security measures.

In addition, embodiments of the present invention may provide or facilitate smooth transformations and transitions between semantic networks or knowledge structures and document repositories, thereby 1) allowing insertion of information in whichever format is most convenient; 2) allowing translation of NLP entity types and ontologies into semantic network element types and ontologies and back; 3) allowing the full capabilities of a network editing tool to be used while supporting the document-by-document control and tracking of individual changes and other affordances provided by a document repository accessible to an NLP system; and/or 4) allowing the uploading, storing and accessing of the same or related information in various forms in a document repository so that other users have the same options of editing in either text document formats or semantic network format and/or allows transformation of existing unstructured, tagged, or other semi-structured documents containing text into semantic network formats and then back into more heavily tagged, refined, and annotated documents so that future users benefit from the previous analytical work of others.

These features and functions may be implemented using combinations of the various Components as are described in further detail subsequently herein.

Semantica®-Style Semantic Network/Knowledge Structure Overview

Figure 2:
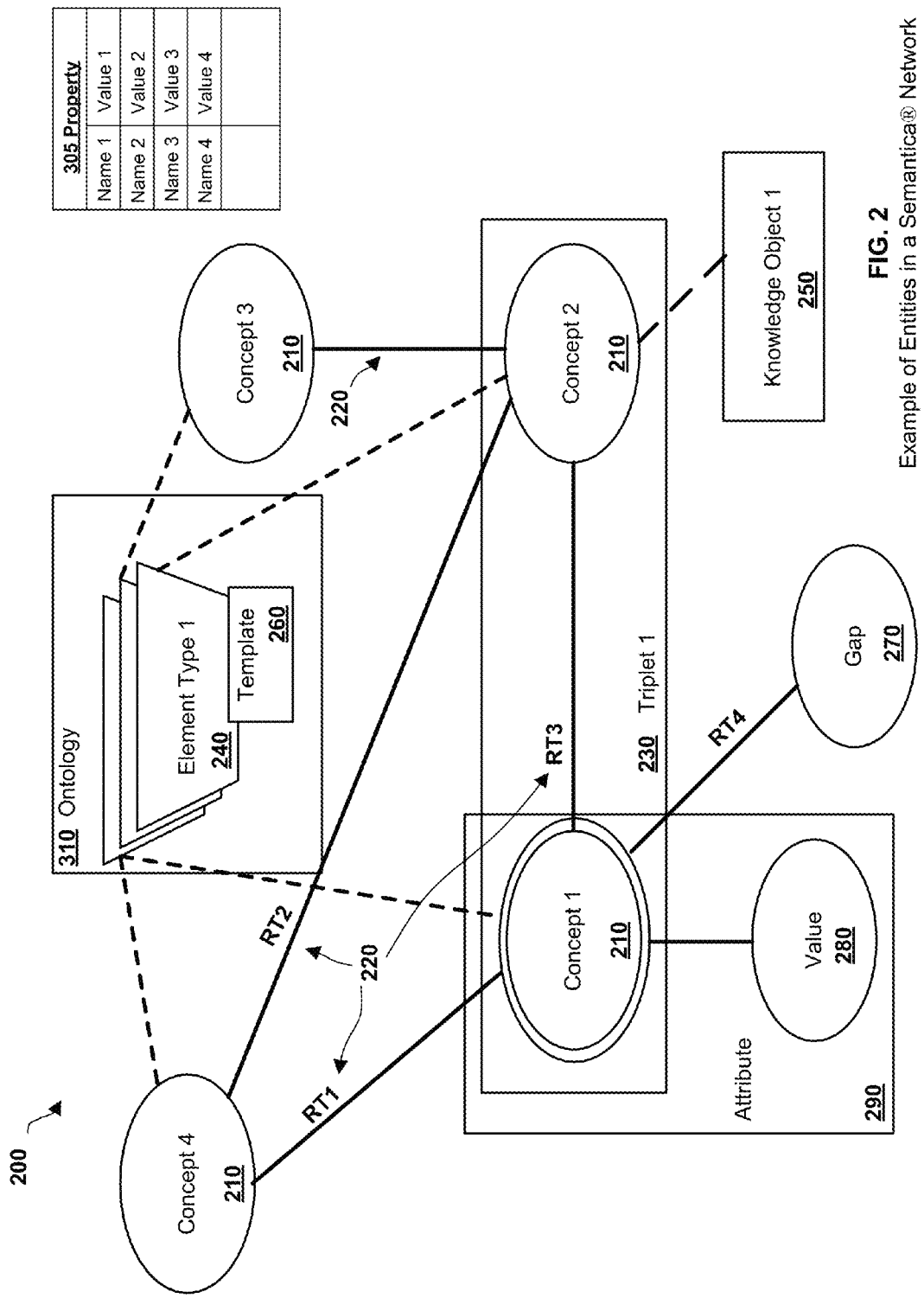
FIG. 2 is a high level illustration of Entities in a Semantica® style semantic network.

In an exemplary embodiment, the present invention may operate in conjunction with a specific form of semantic network denoted as a Semantica-style knowledge structure (also denoted herein as a "knowledge structure" for brevity). Referring to FIG. 2, an example knowledge structure 200 is illustrated. Knowledge structure 200 is, at base, a form of the structure shown in FIG. 1, i.e., an undirected, non-simple graph with labeled edges or links and vertices. However, knowledge structure 200 is made up of vertices and edges with additional structure imposed on them, as shown in FIG. 2.

These vertices and edges may be interpreted individually or in combination to form one or more of the fundamental knowledge structure constructs:
  A) Concepts 210 (entities or vertices);
  B) Relation Types 220 (types or labels for edges or links);
  C) Triplets 230 (individual edges or links), tying two concepts together labeled with a particular relation type; and
  D) Element Types 240 applied to entities (concepts, triplets, relation types and other element types).

Knowledge Object 250, sometimes interpreted as a fifth fundamental construct depending on context, is a special case of an entity that encapsulates or points to a document such as a picture, a text note, the URL of a web page, or any other electronic document, allowing it to be linked to other entities. Examples of knowledge objects may include pictures or images (such as on a web page or Wiki) and the various URLs to external web sites. In the example of a Wiki this may also include a See Also section, References section, Sources and External Links sections, or other sections or objects. Examples of knowledge objects are further shown in related U.S. patent application Ser. No. 12/436,052, incorporate by reference herein.

In general, every knowledge structure is an assembly of entities, relation types, triplets, element types and knowledge objects. In a knowledge structure, concepts, relation types, element types, knowledge objects, and triplets themselves are all considered entities and can all be tied to another entity via a triplet. In the case of triplets being considered entities and taking part in triplets, this is common known as "reification" of triplets. An additional kind of information that can be associated with any entity is a property or role 260 which is a non-triplet form of association between an entity and a non-entity string or other value (number, Boolean, etc).

The methods and apparatus described herein depend upon the adaptation and generalization of the broadest features of a traditional semantic network described above to shift the focus of their application to support human reasoning and application in semi-structured and easily modifiable forms. These methods are generally applicable to a wide variety of business processes and other knowledge-related processes.

Similar tools as are known in the art are typically more limited because they enforce limited and pre-defined collections of elements on the underlying data. Most frequently, the set of possible relation types is very limited and frequently restricted to pre-defined fields in predefined data-entry forms, database tables or other highly-structured data formats.

As used herein, the term Concept (such as, for example, Concepts 210 as shown in FIG. 2) describes each individual labeled vertex within a knowledge structure. In the most basic cases, the label is a locally unique identifier that each concept also has associated with it. In more complex cases, distinct concepts may have the same label but are distinguished by also having locally unique alphanumeric IDs. These concepts represent individual objects, ideas or thoughts that have meaning Since a knowledge structure is a non-simple graph, any two concepts within a knowledge structure may be connected by a common edge. In general these edges (known as triplets or instances of relation types as further described below) are graphically represented by lines on a two-dimensional plane or in a simulated three-dimensional space. However, the knowledge being represented has no physical dimensions per se and such dimensional representations are used purely as a medium for human visual perception and manipulation, and for publication on paper, computer screens, and web pages.

A Gap (such as, for example, Gap 270 as shown in FIG. 2) is a concept that has been marked to indicate that it is an unknown or unfilled-in value that is needed to specify this attribute's value.

The term Relation Type (such as, for example, relation types 220 as shown in FIG. 2) is used to describe labels that are applied to triplets or links to categorize them and embody meaning represented by the link.

An Anonymous Relation Type is a relation type that has been marked to indicate that the actual type of relationship is still unknown or unspecified and needs to be filled in at a later time when possible. In more sophisticated semantic networks, relation types form a type hierarchy, with each relation type having a super-type, and a predefined root for the most abstract of relation types. These are called "related" in Semantica software implementations.

The term Triplet (such as, for example, Triplet 230 as shown in FIG. 2) is used to describe a link between two entities which has been labeled with a relation type. The two entities and the relation type are the three components that results in the terminology triplet. For example, Triplet 230 consists of a link connecting Concept 1 and Concept 2 and labeled RT3. In a Semantica-style knowledge structure, triplets contain two additional components; the element types of the two entities being linked.

The term Attribute (such as attribute 290 as shown in FIG. 2), is used in a Semantica knowledge structure to describe a special case of a triplet. In some semantic network systems, triplet-like information is sometimes called an "attribute", "slot", "property", "field", or even "(data) member" and treated fundamentally differently from a triplet in that (1) the first element is considered to be a fully-functional entity and primary, (2) the second element is often considered to be less than fully functional and sometimes not allowed to be an entity at all, but rather is considered and often called simply a value 291, and (3) the name of the relationship between the first and second element is given less function than a relation type and is often reduced to a simple label, thus limiting the semantic information allowed to be associated with them. However, in a Semantica knowledge structure, these kinds of information are considered to be in need of the same capabilities as triplets, and instead needing only some differences in how they are best visualized and processed. This allows the association of various annotations and other metadata with the name of the relationship, and with the second element, and the fluid inclusion of attribute information in various visualizations that other systems must do extra work to provide.

The term Property, (such as Property 305 as shown in FIG. 2), is used in a Semantica knowledge structure for the more limited cases where a truly property-value kind of information needs to be stored with each entity, providing a place for such things as provenance, stylistic instructions to the visualization methods, etc. However, even in the case of provenance, some the relegation of such information to properties sometimes gets in the way of needed processing, such as when the source documents, the authors of the documents, judgments about the reliability of the authors and sources, and other information becomes something that is useful to the analysis.

The term Element Type (such as, for example, element type 240 as shown in FIG. 2) is used to describe labels applied to entities to categorizing them and embody meaning about the kind of entity they represent. Associated with each element type is a separate network of linked, typed entities called a Semantica®-style knowledge structure Template (such as, for example, template 260 as shown in FIG. 2) that includes links that are typically expected to be present in describing the details of entities of that type, although triplets connected to an entity of this element type are neither required to be among these Semantica® template links, nor limited to only these links.

In more sophisticated semantic networks, element types form a type hierarchy, with each element type having a supertype, and a predefined root for the most abstract of element types, called "Element" in Semantica software implementations. Relation types are also element types in current Semantica implementations, although this is not strictly essential as relation types may be treated differently in other semantic network editing applications.

In some embodiments, element types form a strict hierarchy, that is, only one parent element type for each element type; but elements are allowed to have any number of element types. Alternative embodiments that have been implemented include loosening to multiple parents for element types and limitation to single element types on elements. When the network editing tool supports only a strict hierarchy in its built-in element type structure but allows triplets that tie two element types together, as in an exemplary embodiment, a custom relation type such as "has supertype/has subtype" is used to store a non-hierarchical category structure to match a non-hierarchical ontology in the targeted knowledge sharing repository.

Together, the set of all element types and relation types, along with their possibly-re-entrant hierarchical structure and their templates and other appended information, constitute what is referred to as an Ontology (such as Ontology 310 as shown in FIG. 2) for the semantic network. The ontology can be embodied entirely as a special case of a knowledge structure, but in a preferred embodiment it is implemented with more efficient specialized representations which can still be viewed as a network or knowledge structure.

Example NLP System

An NLP system on which embodiments of the present invention may be implemented, as described herein, may be used to build on a general architecture for describing knowledge that can be extracted from natural language text, provide some or all of a set of possible information extraction methods, embed these in a collection of modules providing several broad classes of services that use the extracted information as well as provide other functionality. It may then provide these services to integrating component embodiments of the present invention.

Many companies or other organizations provide tools satisfying either the particular NLP system features usable by various embodiments of the invention, or the particular document collection features used by various embodiments of this invention, or both. Any of these tools can be used to provide the NLP system elements associated with the present invention as long as the tools provide a method to accomplish the particular features described further below.

Figure 4:
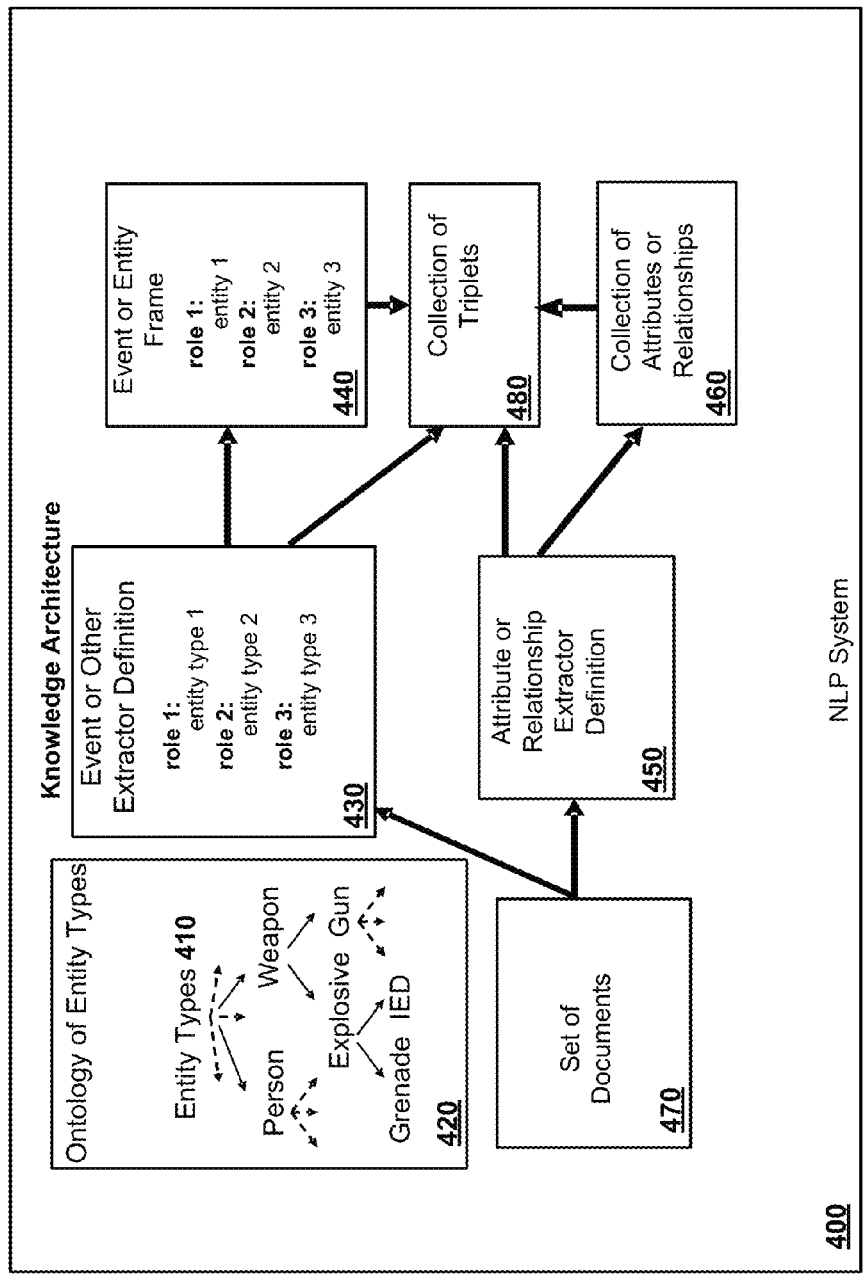
FIG. 4 is an illustration of a Knowledge Architecture of an Example NLP System.

Attention is now directed to FIG. 4, which illustrates an example NLP system Knowledge Architecture 400 consistent with the present invention. NLP System 400 includes an architecture for the knowledge that it is able to extract from natural language text and the methods available for defining how to extract the knowledge. In order to be maximally useful, the NLP System architecture should preferably contain the following kinds of objects, or to the extent that an implementation architecture differs, it should be possible to map or adapt the implementation architecture to provide these general kinds of information.

Entity Types 410—

The system should be able to assign types to the entities, events, relationships, roles and the like that are extracted. In the simplest of systems, this might be simply to identify certain words in the text as representing certain named entities, events, roles and the like, and certain combinations of entities as taking part in certain events, relationships, etc. For maximum usefulness, most NLP systems provide a rich collection of entity types allowing users to distinguish certain entities as particularly relevant or more fully or specifically identified.

Ontology 420—

An NLP system will normally provide a hierarchical organization of the entity types. This allows easier mapping to hierarchical ontologies in the semantic network editing tool, but is not essential to implementations of this invention.

Entity or Event Extractor Definitions 430—

An NLP system will generally at a minimum provide predefined methods for extracting the entities about which it has already been trained. However, most NLP systems will also provide a method for users to enhance the system to define additional entity types and methods for extracting them, denoted herein as extractors. Typically, this is implemented as a two-phase looped training process in which an extractor definition is created and then a training sequence is performed, during which the system applies its current definitions to a body of text and is given feedback by a user judging its success.

The feedback is used to refine the method, perhaps including user modifications to the original definition. Subsequent cycles of refining the definition and training the extractor normally lead to the system/user determining that the extractor has been trained sufficiently. This training cycle is typical of most current NLP systems. However, note that as long as there is a method for defining extractors that can be mapped from elements, element types, relation types, and triplets in a semantic network, the method by which the NLP system achieves the accurate creation of an extractor is not critical to implementations of this invention. To the extent that these extractor definitions map easily to and from the semantic network editing tool's notion of a template or other collection of triplets involving an entity or describing an event, the ease of implementing embodiments of this invention with a particular NLP system is enhanced. In an exemplary embodiment only predefined entity extractors are provided, but event extractors can be created, modified and trained as described above.

Frames and Events 440 and Other Collections of Triplets 480—

The output of an extractor in the simplest of NLP systems may be merely the identification of entities in the text, usually with entity types assigned to them. This may be somewhat useful in embodiments of the invention, but in a preferred NLP system that would be particularly useful, the system also extracts more information about each entity beyond where it occurs in the text and what its type is. In most cases this may be essentially a set of triplets 480 associating the entities with each other and with other information in the text. In simple cases, these entities are essentially groups of slots filled with values extracted from the text that describe an entity in more detail. When these are provided in a semi-structured manner that looks more like a collection of slots that have been filled in (much like a record or structure in a programming language, or the fields in a row of a table in a database), they may be called "frames" 440. Some systems will provide this information as a collection of triplets 480, or in a more system-specific representation 460 which can be transformed into a frame or into triplets. Some systems will separate frames describing entities from identification of events described in the text and treat those as different. For simplicity, the results of extraction that either describe entities or events are referred to herein as a "frame" whether they are slot-filler-like or not.

Attribute and Relationship Extractor Definitions 450—

Some NLP systems will also provide individual pieces of information about entities or about events that are thought of as attributes of the entity or event, or as relationships between two entities or events. These may look more like a triplet or more like an attribute name-value pair. The distinction between attributes and relationships is not always easily drawn but tends toward attributes connecting a named entity to a value that is not a named entity, while relationships connect two named entities. However, this distinction gets fuzzy, since the employer-employee relationship can sometimes be treated as an attribute of an employee. Systems that provide attribute and relationship extraction will ideally provide a method for defining extractors for new attributes and if necessary for training the NLP system to apply them.

Extracted Attributes and Relationships 460—

An NLP system that provides attribute and relationship extraction may provide a specialized representation 480 for those extracted results. If so, then it will often be easily converted to a collection of triplets 480. A frame-like result describing individual entities or events might also be provided to represent collections of individual attributes or relationships in a triplet-like format, or one that can be easily converted to a collection of triplets.

Targeted Set of Documents 470—

An NLP system will usually provide a mechanism for targeting its extraction processes on subsets of the entire repository of available documents.

Figure 5:
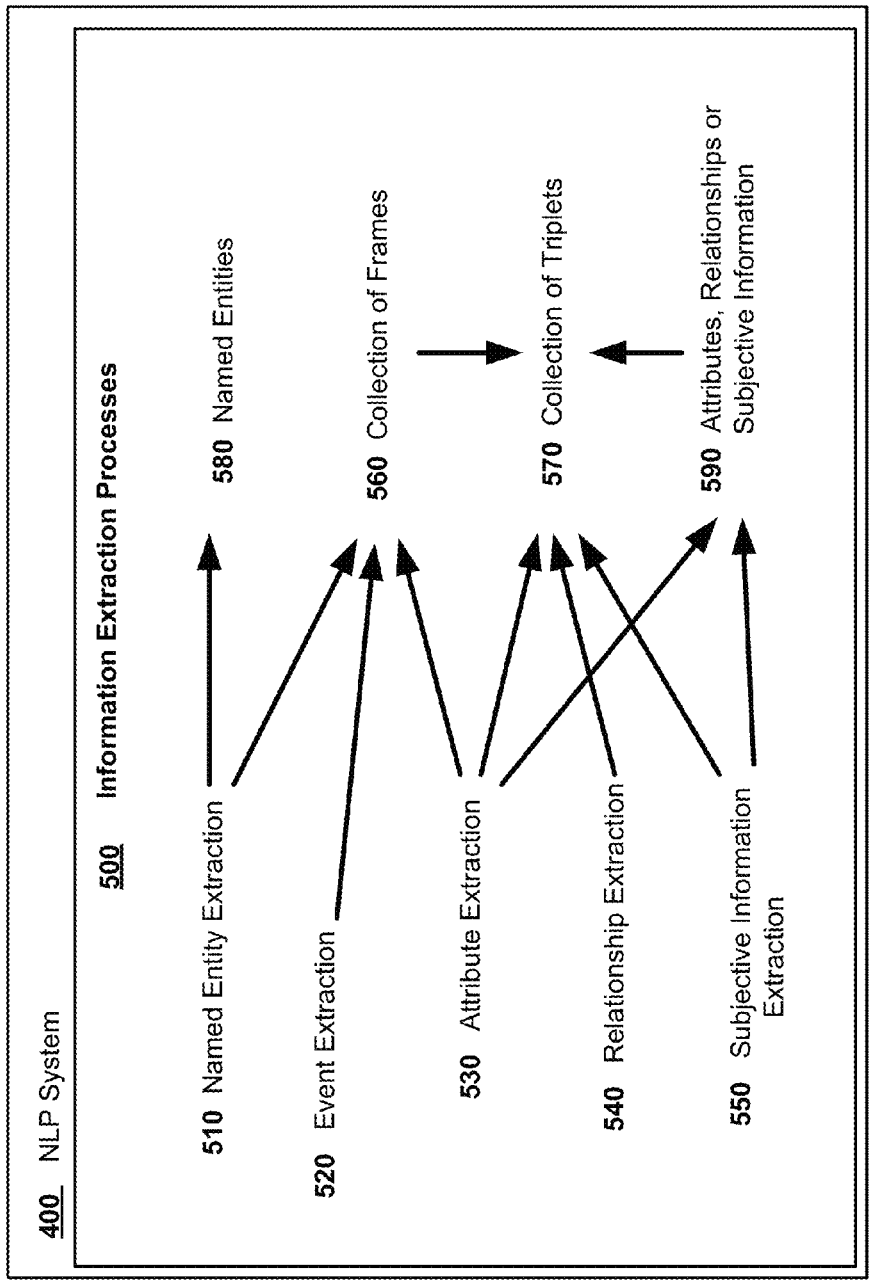
FIG. 5 shows processes in an implementation of Information Extraction in an Example NLP System, along with their extracted results.

Attention is now directed to FIG. 5 which illustrates details of various Information Extraction processes that are typically provided by an NLP System in accordance with aspects of the present invention.

Information Extraction Processes 500—

A purpose of using an NLP System 400 in conjunction with a semantic network editing tool for this invention is ultimately to extract as much information as possible from natural language text into the target semantic network format. As a result of targeted research funding programs, targeted competitions among NLP systems organized by governments and industry groups, and the particular areas in which the most success has been achieved, NLP systems typically provide the following five different information extraction methods as separate services. To the extent that a particular NLP system organizes these processes differently, whether by combining two or more, or by making different distinctions in kinds of information extracted, if the information provided can be mapped to entities, events, roles, relationships, attributes, and subjective information and thence to semantic network elements, triplets, attributes and properties in this invention, the NLP system satisfies the needs of this invention.

Named Entity Recognition (NER) 510—

The focus of named entity recognition is on identifying references in the text to entities. The most useful entities usually targeted are those with names or other distinguishing labels that are explicitly mentioned, such as persons, companies, schools, governments, other organizations, ships, planes, automobiles, other vehicles, cities, states, countries, other locations, etc. However, the use of "Named" should not be used to exclude references to person, places or things that do not have known or mentioned names in the text. The key purpose for the purposes of this invention is to identify references to persons, places, organizations, things, and other entities about which other information can be extracted, including their names or other distinguishing identifiers. Typical output from NER is a list of entities 580 with their entity types and where they occurred in the text.

Event Extraction 520—

The focus of event extraction is on identifying references in the text to events, that is, things that happened at certain places and times, along with the entities that were involved in them, whether the people who caused them to happen, or to whom they happened, or the other entities that were involved such as vehicles, weapons, businesses or other organizations, buildings or other locations, etc. Typical output of event extraction is a collection of frames 560 describing the events mentioned or described in the text.

Attribute Extraction 530—

The focus of attribute extraction is on identifying attributes or characteristics of entities in the text. For example, attributes of people that might be extracted include gender, height, weight, birth date, hair color, eye color, employer, profession, address, birth place etc., while attributes of companies or other organizations might be their products, employees, location, income, value, etc. Typical output of attribute extraction might be organized into system-specific collections of attributes 590, or collections of frames 560 each describing one entity, or into collections of triplets 570 describing individual attributes of entities one at a time.

Relationship Extraction 540—

The focus of relationship extraction is not always distinguishable from that of attribute extraction, but tends to be on identifying relationships among entities in the text. For example, relationships among people that might be extracted include boss/subordinate, family relationships such as sibling, parent/child, spouse, etc., employee/company, etc. Typical output of relationship extraction might be system-specific collections of relationships 59, or a collection of triplets 570.

Subjective Information Extraction 550—

The focus of subjective information extraction is on identifying description in the text of the judgments, opinions, perspectives, or point of view of certain entities about other entities or events. Typical output might be system-specific collections of subjective information representations 590, or as a collection of triplets 570 tying the entities having the viewpoint and the entity or event they are judging, labeled with the judgment.

Service Modules—

Figure 6:
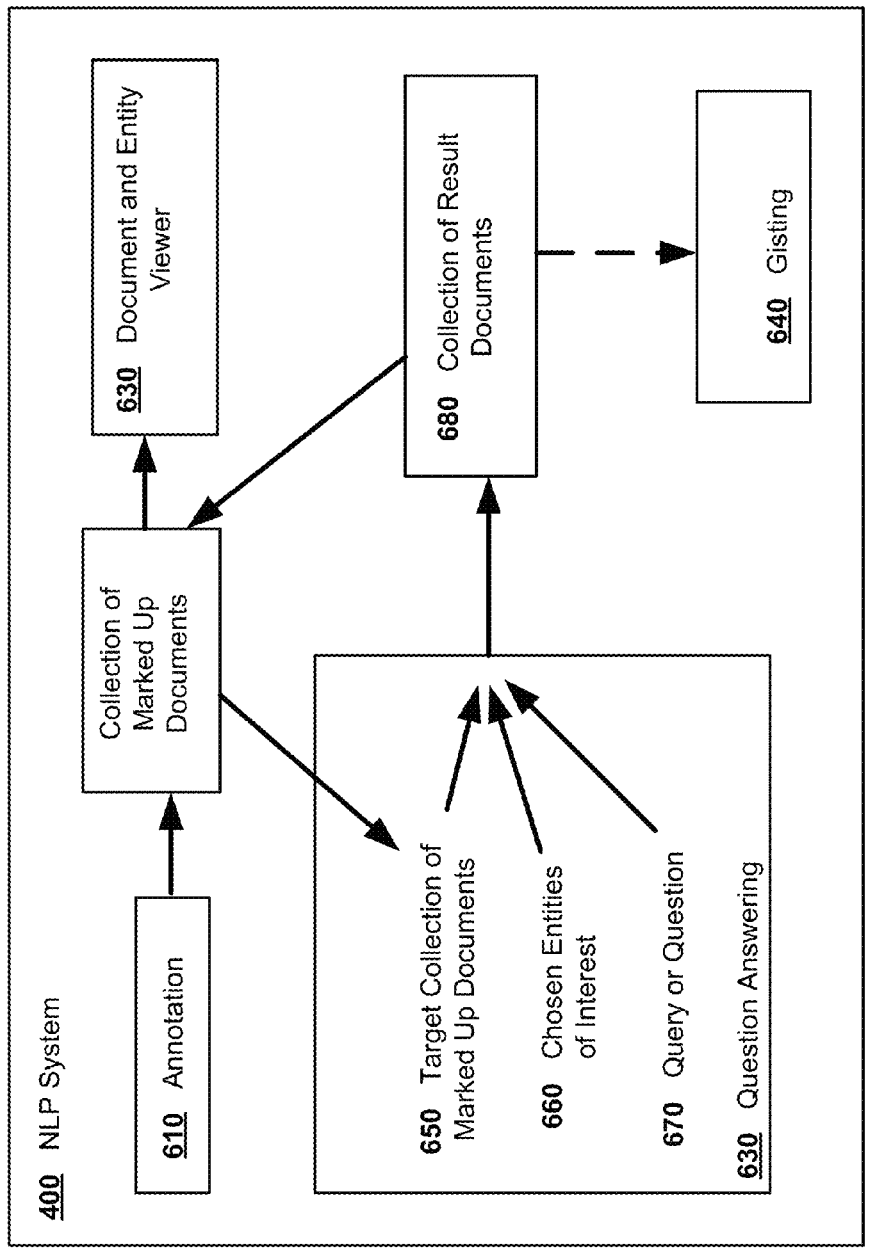
FIG. 6 is an illustration of flow of information among top level application accessible Service Modules provided by an Example NLP System.

Referring now to FIG. 6, an NLP system 400 typically provides one or more of the following service modules built on top of the architecture and information extraction methods described above:

Annotation 610—

In a typical NLP system, while the results of the various extraction methods are available as the typical outputs described above, they are also usually provided as an annotated or marked-up version of the original text. The text might be in HTML or XML or any number of other formats. Typically the text describing each extracted entity or event or relationship is wrapped with the additional information constructed through the extraction process, such as entity types, the kind of relationship or attribute identified, etc.

Document and Entity Viewing 620—

In a typical NLP system, a standard UI is provided for viewing documents from which information has been extracted, showing the annotations in context in the original text. Typically this viewer provides methods for extracting the information associated with particular entities by dragging and dropping or other UI methods.

Question Answering 630—

In a typical NLP system, an environment is provided in which users choose a set of documents 650 to focus on, possibly specify particular entity types, event types, attributes, relationships, or subjective information 660 they are particularly interested in, and then formulate a query or question 670, perhaps structured or in free-form natural language, to indicate the kind of information they want to have extracted. The NLP system then processes the chosen text, looking for portions of text that appear to contain the desired information. Typical results are a collection of result documents or portions thereof 680 that might contain the desired information, ranked according to some measure of likelihood.

Gisting or Summarizing 640—

In the most capable of NLP systems, a user is allowed to select a collection of extracted entities, events, attributes, roles, relationships, and subjective information, and to request that a natural language summary or gist 690 be created by the NLP system from the original source material.

Figure 7:
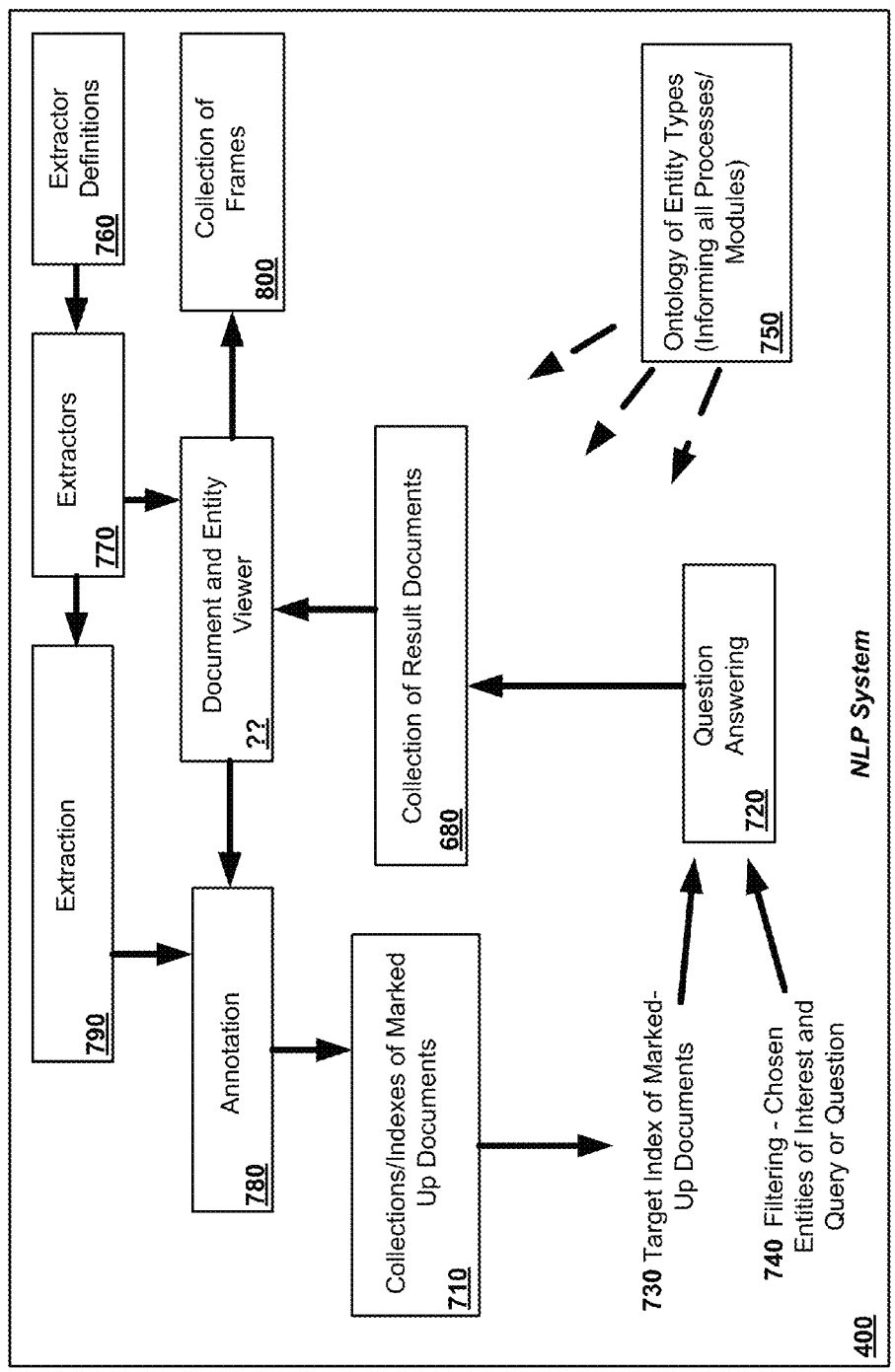
FIG. 7 is an illustration of data flow among user-level components of an Example NLP System.

The previous descriptions summarize the component view of a typical NLP system consistent with various embodiments of the present invention. Attention is now directed to FIG. 7 which makes it easier to consider an NLP system 400 consistent with the present invention as a group of modules that take a collection of documents containing natural language text, processes them to find various kinds of entities of interest to a user to produce a collection of marked up or "annotated" documents 710, and provides access to those entities in the context of the marked up text for further use in aggregating and filtering knowledge.

An exemplary implementation of the invention includes one or more of the following (typically all):

A Question Answering Module 720 for searching or querying a collection of documents containing natural language text expressing or containing information of use to a user. The Question Answering Module is configured to produce a subset of the collection of documents that are likely to contain information satisfying the search or query. A typical embodiment of this module usually includes the following components, although various modules that take a search/query as input and produce a collection of documents as output may be used in alternate implementations of the invention.

An Index Choice Module 730 or other document sub-collection choice method for selecting or grouping documents according to various user-provided criteria in order to target the search/query on subsets of documents, e.g., batches of documents organized by date, or source, or other metadata. In an exemplary embodiment, the most efficient processing uses pre-selection and processing of batches of documents, and produces a separate index for each batch. A process is then performed to aggregate separate batches' indexes into a composite or "multi-index." However, in a typical desktop implementation, chosen documents are not annotated and stored in file-system-based indexes but rather an index is built in memory at the time that the documents are first targeted, and only stored in the file-system later if requested by the user. Module 730 may use a graphical user interface (GUI), text or batch interface, or other mechanism to facilitate document sub-collection choice based on provided user criteria.

A Filtering process 740 for specifying which of various kinds of entities are of particular interest to the user for this query along with a question or query specifying the particular kinds of information are desired. In the preferred embodiment, the most efficient processing requires that indexes be further annotated by extractors capable of identifying the target entities An Ontology 750 or hierarchy of entity types that the NLP system can assign to entities that have been identified. This module stores the ontology information and provides data to inform the various processes of the particular NLP system.

In an exemplary embodiment, the entity types in this ontology typically are organized in the following structure, or in an analogous or similar structure where each entity type has a name, and conceptually, each entity type has zero or more templates or extractor definitions 760 which define the properties, roles, or attributes that might be filled to describe an instance of the entity type. However, in one embodiment, this connection is less direct—instead there are one or more NLP extractors in an extractor module 770, which have such a modifiable extractor definition but are not directly associated with a single entity type, and which are capable of identifying entities or events, and of assigning entity types to each of them.

In an exemplary embodiment, the NLP system's ontology supports a full hierarchy of entity types each with associated NLP extractor definitions forming an analog of the semantic network ontology that can be mapped to and from it.

An Annotation Module 780 configured so that each document returned by a search/query as relevant is marked up to indicate what entities, events, roles or relationships were identified along with assignments of entity types for each.

An Extraction Module 790 configured so that a frame or frames are provided for each identified entity, event, role, or relationship which contains references to other related entities or values filling the slots in the extractor definition. These slots are in effect relationships or roles of the identified entity that are filled with other identified entities or values.

User and/or Computer Defined Extractors—

In various embodiments, Extractors may be defined and edited by users, either manually by persons, or automatically by an application program, or ideally by both. This may be done by, for example, proving a user with an associated GUI or other user interaction mechanisms as are known or developed in the art.

In cases where the NLP system does not allow editing of pre-defined extractors, an exemplary embodiment allows for creating a sub-type and associating an edited extractor with that sub-type. In implementations where manual editing is not supported, the transformations between semantic network templates and NLP system template definitions are done entirely automatically through a program and some, but not all, of the benefits of this invention are unavailable.

Extraction of Implied Relationships—

In some implementations, more sophisticated NLP systems are capable of extracting implied relationships between two entities or between an entity and a value. These are typically called "relationships" and "attributes" respectively, although in many semantic network formats, this distinction is fuzzier, and in Semantica-style knowledge structures the distinction is simply one of preferred visualization methods. For example, the "hair color" attribute and "has employee/employee of" relation type can be filled with "red" and "Acme Bicycle" for "Sam" or "the guy" when any of the following sentences is processed:

"Sam, who is red-headed, works for Acme Bicycle."
"Sam, a red-head, is employed by Acme Bicycle.
"The guy with the red hair who works at Acme Bicycle is nice."
"Sam, the Acme Bicycle worker, has red hair."

This is known as Relationship Extraction and Attribute Extraction and in either case is simply the specification of a triplet along with its provenance. In an ideal NLP system, these capabilities are quite similar to the roles in the extractor template definitions described above. However, in an exemplary embodiment, they may still be done by separate processing and/or modules and only combined, in accordance with aspects of the invention, through the methods described herein.

Extraction of Implied Views—

In addition, more sophisticated NLP systems are capable of extracting the implied subjective views or attitudes of various entities in the text toward other entities described in the text. For example, the positive or negative opinions of "Harry" and "Sally" toward the events of their meeting or the color of their hair in the following sentences can be extracted when any of the following sentences is processed:

"Harry was pleased to meet Sally at the local pub but she was not."
"When Harry met Sally, he was overjoyed, but she wished they hadn't."
"Sally was dismayed to run into Harry but he leapt for joy at the sight."
"Harry loved Sally's blond hair but she would have preferred to be a red-head".

This is known as Subjective Information Extraction and requires that the NLP system provide an event such as meeting, or an attribute such as hair color and also the subjective judgment of another entity toward that information.

Journal—

In an optimal or most capable form, the NLP system maintains a complete journal of where each entity extracted came from, providing complete provenance for each entity, including the source document, document path, index path, start and end offsets, dates of authorship/acquisition/indexing, classification and source type, unique IDs in the NLP and semantic network systems and the like.

Example Components of Embodiments of the Invention

Described further below are example components that may be used in various embodiments of the present invention. In addition, example embodiments of the associated components are described. In various embodiments, the components described below may be integrated in various combinations to provide the functionality described herein. However, it is noted that one or more of the following components may be unavailable in particular implementations in the network editing tool, the document repository, and/or the NLP system and/or in related elements used in a particular embodiment. While lack of availability of these component may result in degradation of certain features as described herein, their absence will typically still leave one or more potential advantages of the present invention. Accordingly, it is noted that these components simply describe a non-exclusive set of preferred components or modules that may be used in combination in various exemplary embodiments of the invention, and are not meant to be mandatory or exclusive. Moreover, other combinations of the described components configured in other arrangements may also be provided within the spirit and scope of the present invention.

Figure 3A:
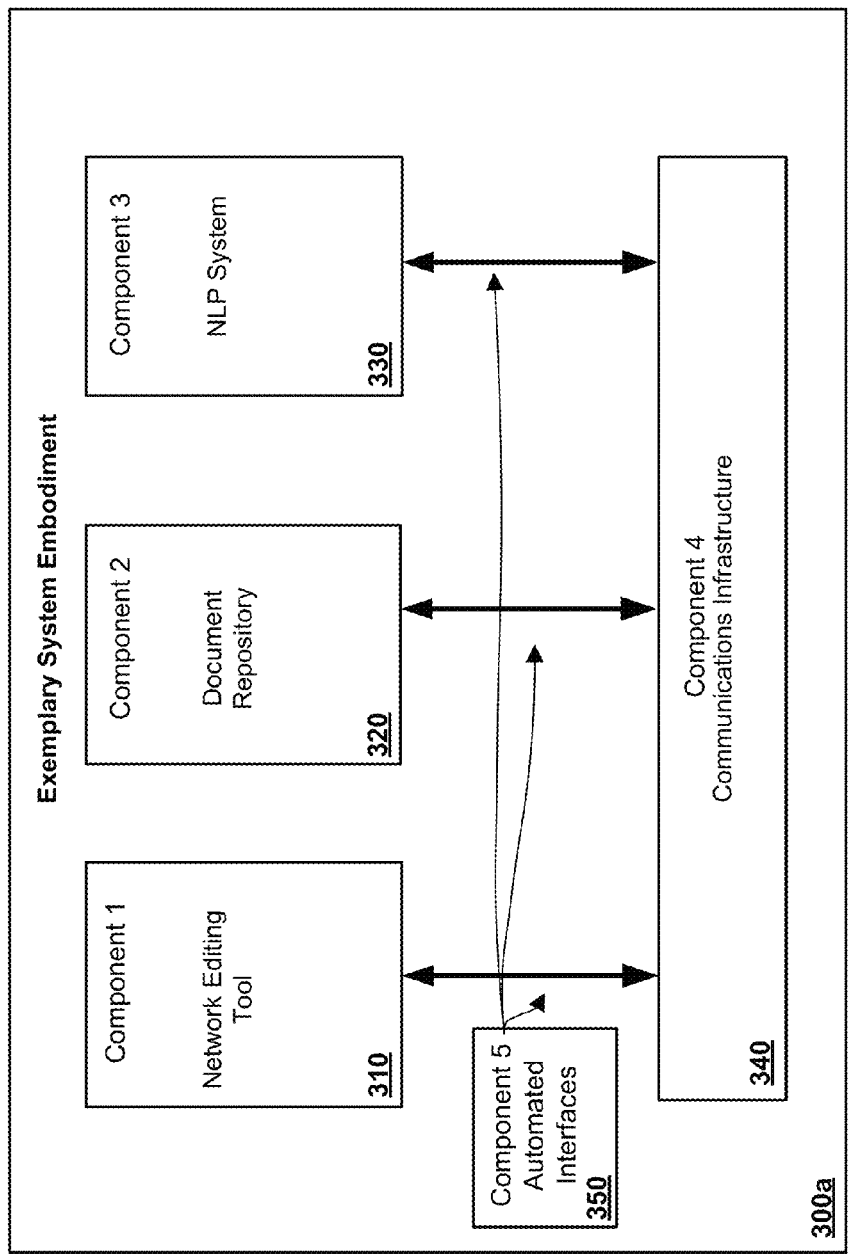
FIG. 3A is an example illustration of a physical configuration of an exemplary system embodiment consistent with the present invention.

Attention is now directed to FIG. 3A, which illustrates a high level view of an exemplary system embodiment consistent with the present invention. As shown in FIG. 3A, a system 300 includes a semantic network editing tool 310 (which may correspond to Component 1 as further described below), a collection of documents, or "document repository" 320 (which may correspond to Component 2 as further described below), an NLP system 330 (which may correspond to Component 3 as further described below), as well as automated interfaces 350 (which may correspond to Component 5 as further described below) and a communication infrastructure 340 (which may correspond to Component 4 as further described below) supporting communications, including transfer of queries or other instructions and corresponding data between the various other elements, as well as transfer of data and information between the various other elements. Additional elements (not shown) comprising system 300 may include other user interfaces, computer hardware such as processors, memory devices, communications hardware and/or software, peripheral devices, and/or other computer hardware and software sub-systems as are known or developed in the art. At a high level, the coupling of these components, and in particular the semantic network editing tool and the NLP system, as well as the document repository, in conjunction with one or more user interfaces that may be provided in the editing tool, NLP and/or in a separate application program (not shown), facilitates the functionality of the present invention as described herein.

Figure 3B:
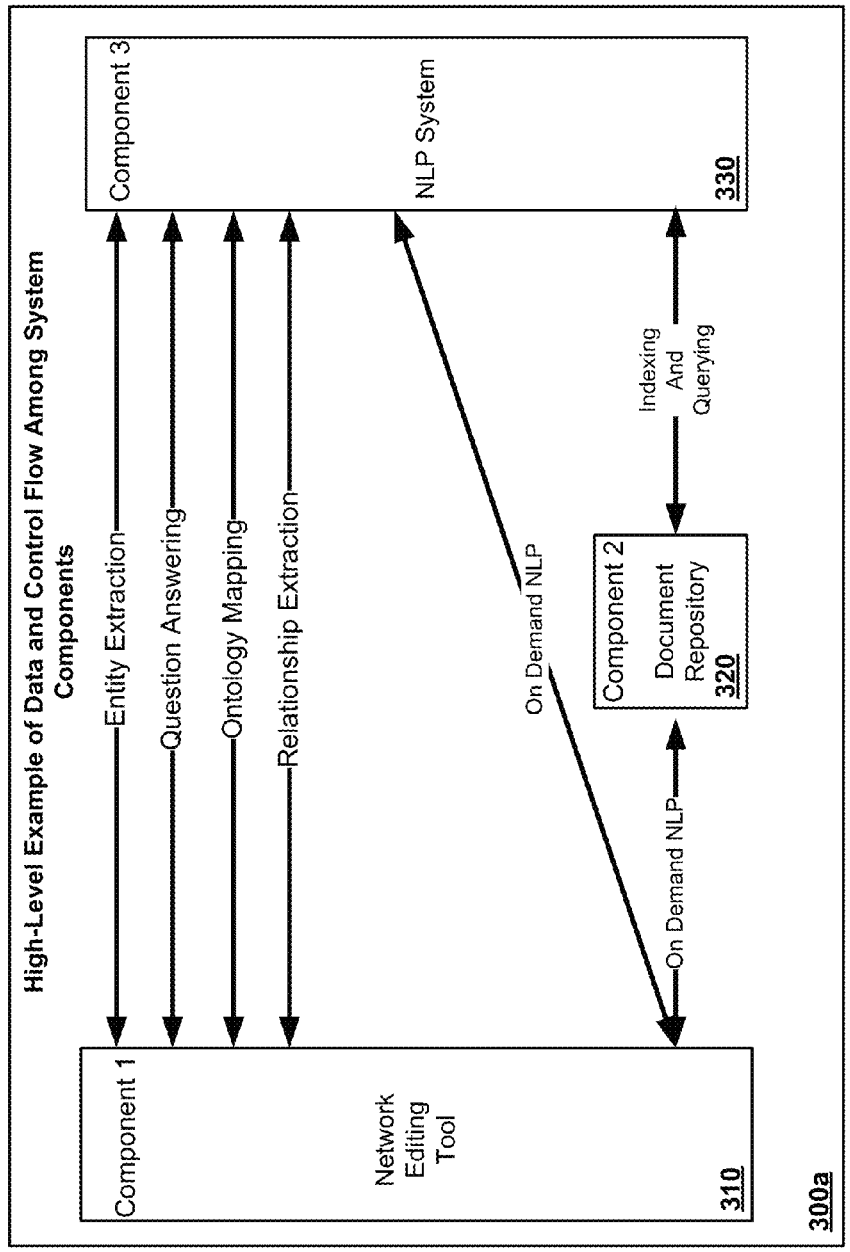
FIG. 3B is an example illustration of data and control flow among various system components of an exemplary embodiment consistent with the present invention.

FIG. 3B illustrates a high level view of example data and control flow among the system components as shown in FIG. 3A. Data and control flow may be in the form of standardized control, command or query instructions, standardized data structure and formats, and/or customized or application specific control, command or query instructions and associated reply data and/or information.

Attention details of various elements of the Components shown in FIGS. 3A and 3B are further described below.

Specifically, primary components and the associated environment consistent with an exemplary embodiment may include the following.

Example Hardware/Software Components

Component 1—A First Computer System Configured to Run a Network Editing Tool—

A computer system including one or more software and/or hardware modules configured to run a network/link editing and analysis environment and support creation and storage of data representing or defining a semantic network or knowledge structure.

In various embodiments, implementations of the presentation invention may be implemented on top of any network/link editing and analysis environment providing the key capabilities described herein, and does not depend on a particular implementation of such a tool. However, in an exemplary embodiment, the present invention may be implemented using any of the various versions of the Semantica desktop or enterprise software applications provided by the assignee of the present invention and configured to include NLP integration capabilities consistent with the description provided herein. This functionality may be implemented on a standalone computer system configured with an NLP and network editing tool or may be implemented on distributed systems including multiple computer system.

Component 2—A Second Computer System Configured to Provide Access to a Collection of Natural Language Documents—

A second computer system accessible through a communications network (which may be in some embodiments be the same computer system as described with respect to component 1 above or may be a separate computer system or systems) that provides access to a collection or plurality of documents containing natural language text, frequently referred to as, but in no way limited to, a document repository or document management system, or content management system. As used herein, the term Natural Language Text (NLT) generally describes text documents in a natural or human language format (as opposed to an artificial language such as a computer language), where the data representing characters corresponds to or represents characters and syntax of a natural or human language. For purposes of brevity, a general collection of natural language documents may also be referred to herein as a "document repository."

In general, any of a variety of systems providing access to a collection of documents that support the features described herein are equally usable in various embodiments of the invention, including for example, but not limited to, a) web or intranet search systems that provide links to documents available on the web or communications network, b) individual wikis or other web-based knowledge sharing repositories, c) file-system-based document collections, or d) a collection of text that is stored and organized in a database or other formal system that presents chunks of text on demand in other ways.

In an exemplary embodiment, both local and server-based document storage is used, but provenance is more useful through the work-flow in circumstances where the documents are stored on servers shared by all users and accessed through the same naming scheme, such as a Mapped Drive in implementations using Microsoft Windows variants.

Component 3—A Third Computer System Configured to Provide Access to an NLP System and/or NLP Application Program—

A third computer accessible through a communications network (which may be the same computer as components 1 and/or 2 above) that provides access to an NLP system either incorporating a document repository or capable of accessing and processing the documents in a document repository such as described with respect to component 2 above. Embodiments of the invention may be implemented on top of any NLP system or NLP application program providing the capabilities described herein, and does not depend on a particular implementation of a NLP system.

In an exemplary embodiment, NLP tools provided as application programs by Language Computer Corporation (LCC) through their Index Manager, Ferret, Cicero, and related products may be integrated to provide all of the key subsystems for an NLP system as described herein. In other embodiments, NLP tools from the open source General Architecture for Text Engineering (GATE) system or other NLP tools that fit into a custom NLP tool aggregation environment may be integrated to provide all or a subset of the functionality described with respect to various embodiments of the present invention.

Component 4—Communications Infrastructure—

A communications and data transport infrastructure network or system connecting the semantic network editing tool (also referred to herein as a "network editing tool" for brevity), the document repository, and the NLP system, and supporting HTTP, HTTPS, PKI, RMI, RPC, XML, and/or other communications or external execution and data interchange protocols, whether secure or open, that allow for the exchange of data among the three tools (components 1, 2 and 3) and that allow each tool to initiate actions within the others and to maintain secure connections and establish encrypted or network-based user identification to provide element-level access control and other security measures. In a typical implementation, this would be a standard TCP/IP protocol stack providing networked communications between computers as is typical in most computer environments, along with an RMI/RPC communication method, but could just as easily be any mechanism that encodes packets of information from one computer or application, transmits them to another computer or application, and translates them on that computer to invocation of the standard protocols such as HTTP, HTTPS, PKI, HTML, RMI/RPC, XML, etc. on the remote, or possibly the same, computer. In an exemplary embodiment, the NLP system uses Java events and an API that uses RMI along with XML snippets passed back and forth for data exchange.

Component 5. Automated Interfaces—

This component may be any of a number of possible automated interfaces, and/or manually invoked user interfaces, that connect or couple the various components of implementations of the invention to the network editing tool, the document repository, and the NLP system to allow use of the invention. These can be implemented as modules inside one of the tools in whole or part and/or can be implemented externally as appropriate for a particular application and system.

In an exemplary environment, the functionality added by embodiments of the invention to the network editing tool may be provided by custom views or panels added to the UI at launch time. This may be provided along with various widgets and menu items embedded in the network editing tool's user interface at the places where a user can most conveniently invoke them when desired, sometimes from the main menu bar, and sometimes from a contextual menu or via other menus or interfaces. This may be done using various methods of integration such as add-on applications or plug-ins, or may be provided in a separate, standalone application.

Figure 8:
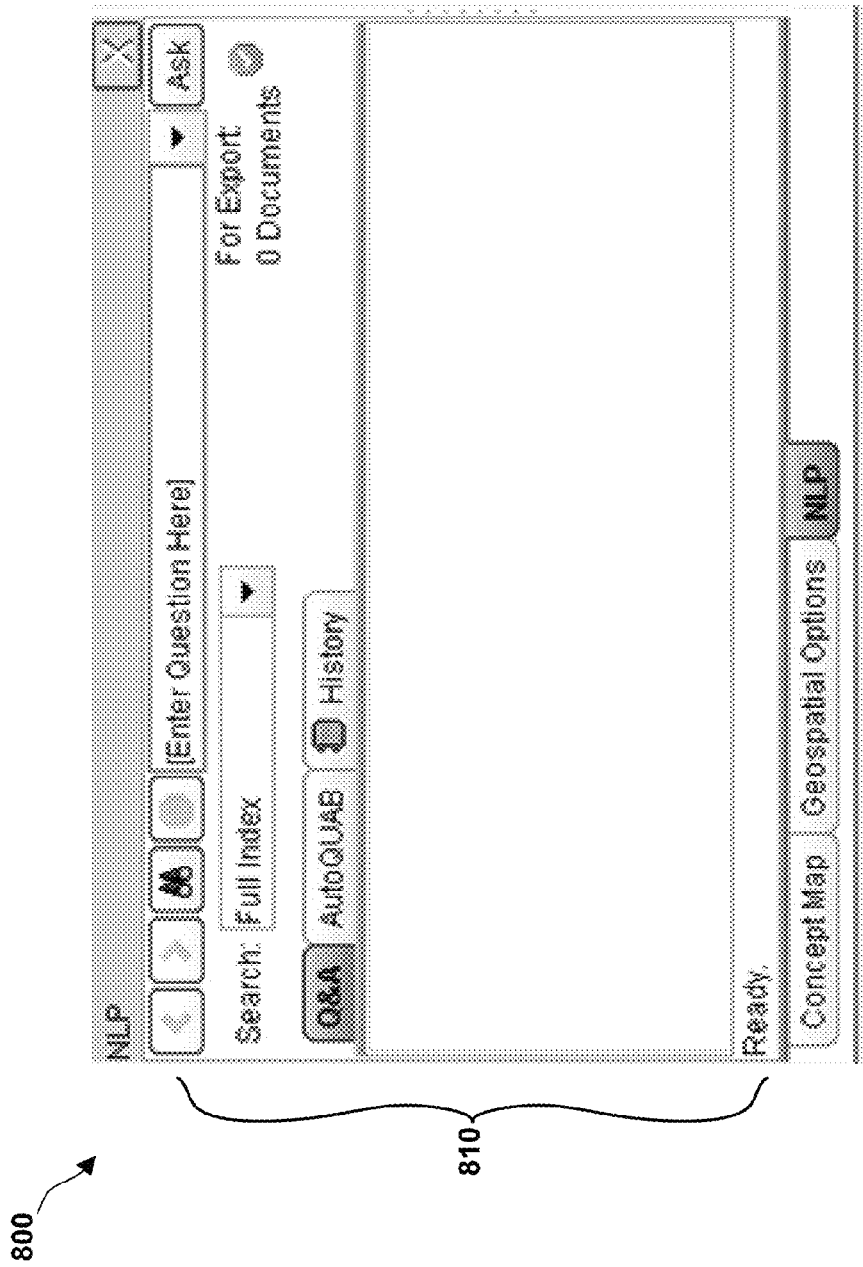
FIG. 8 is an illustration of an embodiment of an NLP Panel provided in an Exemplary NLP System in accordance with aspects of the present invention.

As one example, FIG. 8 illustrates one embodiment of a custom NLP panel 800 in the execution environment of the Semantica family of software applications (i.e., a network editing tool) provided by the assignee of the present invention that wraps an NLP-system-provided internal panel 810 provided by LCC through their Index Manager, Ferret, Cicero and related products. In another embodiment, NLP tools from the open source GATE system or NLP tools that fit into a custom NLP tool aggregation environment may be integrated to provide all or a subset of the functionality described herein with respect to various embodiments of the invention.

Figure 9:
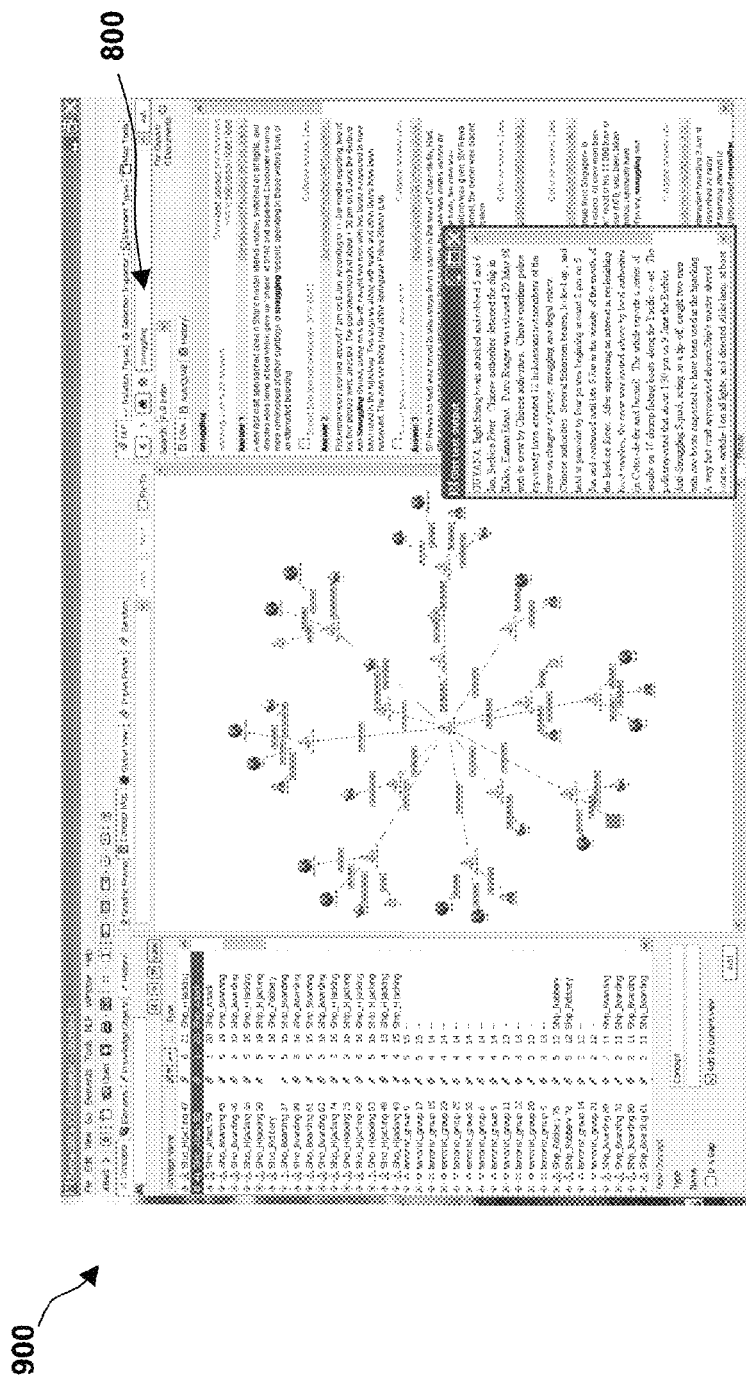
FIG. 9 is an illustration of an embodiment of an NLP Question and Answer Panel in an network editing environment in accordance with aspects of the present invention.

FIG. 9 shows additional details of the panel shown in FIG. 8 in use while embedded in a network editing tool (in this case, the network tool is Semantica, provided by the assignee of the present invention). These panels typically only show up when the NLP system is present. In an embodiment with a network editing tool that is still the user's primary environment but does not permit the addition of new UI elements, an external UI or embedding in the NLP system would be the best embodiment possible. In each case, the desired actions provided by the components of the invention described below would be the same and all that would change would be the place and manner in which a user would invoke them. In FIG. 8, the NLP panel is in the front on the right hand side, and everything that is below the row of tabs describing "NLP, Relation Type, Selection Inspector, Element Types, Map Tools," is provided in the NLP system.

In exemplary embodiments of the invention, custom add-ons have been created for the execution environment of the Semantica family of software applications provide by the assignee of the present invention. In these implementations, the add-ons are provided by a combination of installer changes and code changes.

However, in other embodiments, the functionality could be modified to be a standard Semantica tool plug-in that adds a new panel in, for example, more recent versions of Semantica that support that functionality and/or through other methods for application or widget integration as are known or developed in the art. In addition, the functionality could also easily be extended to other environments providing a knowledge structure semantic network persistence mechanism supporting subsets of the key features described above, including but not limited to, i2 Analyst Notebook, Palantir, Inxight, Protégé and the like . . . .

These implementations are easily modified to run against alternative persistence models such as A) the Semantica TripletSphere product which implements persistence for Semantica-style knowledge structures in a stand-alone database with custom tools implementing the querying and editing of entities, triplets, and element types with their templates, B) the Semantica Staging DB database which implements a simplified form of semantic network sufficient to support these same mechanisms, and/or C) any other storage mechanism for persisting entities and their connections through triplet-like links.

Example Network Editing Tool Data Components

Targeted data components within the network editing tool for a typical use of an embodiment of the invention may include the following.

Component 6—One or more Semantic Networks—

One or more semantic networks comprising data defining the elements and structure of the semantic network or knowledge structure (also described herein as simply a "semantic network" for brevity), said semantic networks capable of being edited with a semantic network editing tool, such as the Semantica tool provided by the assignee of the present invention.

The target semantic network is typically a Semantica-style knowledge structure, but in alternate embodiments could be any semantic network that provides the knowledge structure features of entity types, relation types on triplets, and templates associated with entity types.

Figure 10:
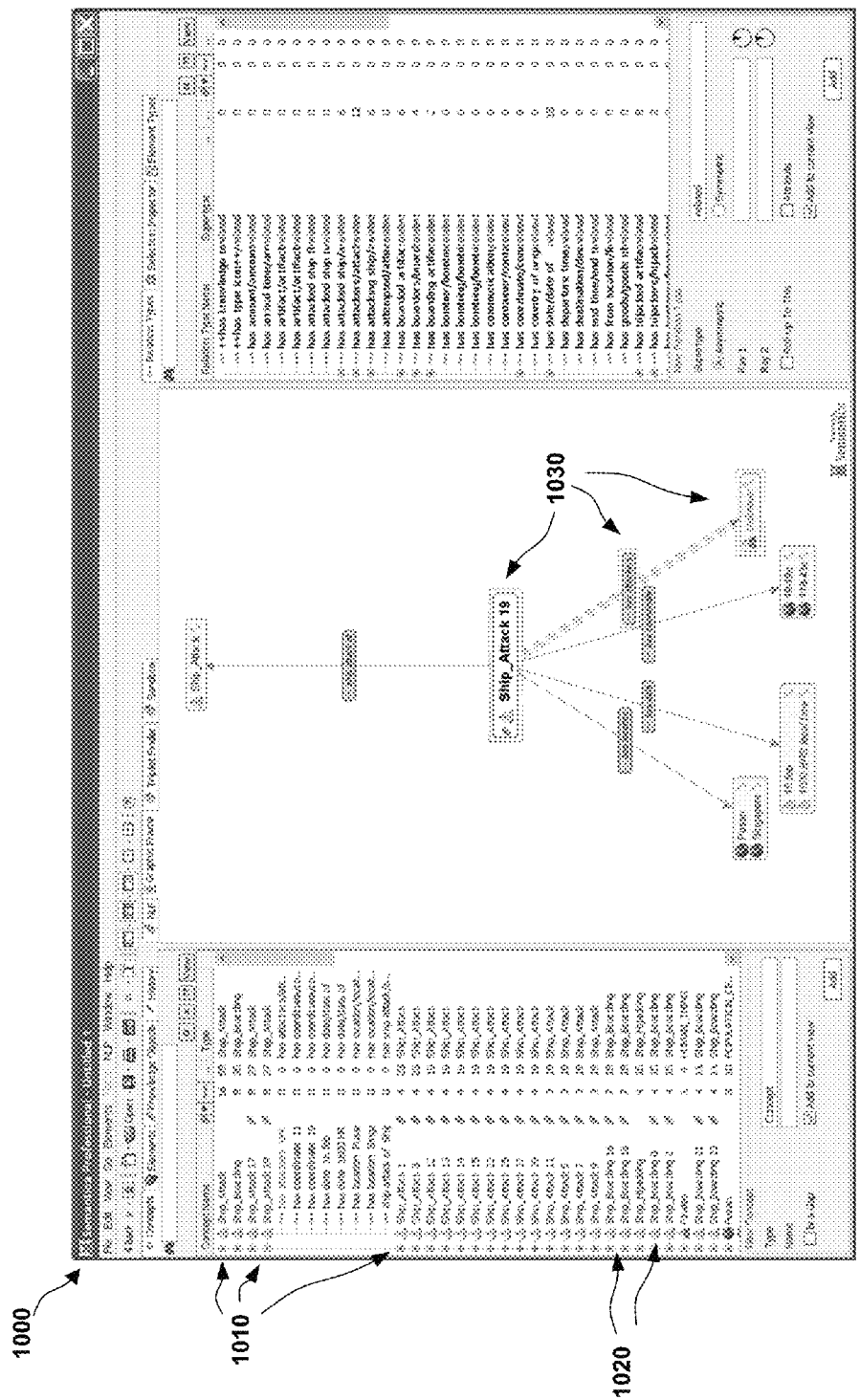
FIG. 10 is an illustration of an example of an instance of "Ship Attack," along with associated triplets in accordance with aspects of the present invention.

For example, FIG. 10 shows a newly created "Untitled 1" semantic network being editing in the network editing tool used in an exemplary embodiment. This network contains at least thirty instances of the entity Ship Attack, shown as Ship Attack 1010, and twenty three instances of Ship Boardings 1020, which were extracted via the NLP system. Ship Attack 19 and its Triplets are further expanded graphically in FIG. 10, with one triplet 1030 selected to highlight it, showing the identities of those who carried out the attack are "Unknown."

If the network editing tool provides enough hooks for adding custom content such as new element types, the template mechanism could even be implemented as part of the invention embodiment rather than being expected or provided from the network editing tool. Embodiments of the invention do not require that element types or relation types be allowed to be entities to provide the primary benefits. However, adding a template mechanism to a network editing tool that does not already provide it would be much easier to implement if this is allowed.

7. Entities—various single targeted/selected/focused entities, with the triplets each said entity is part of, and the additional entities on the other ends of said triplets, along with other associated pieces of knowledge associated with said targeted and additional entities.

As described previously, this is the selection of a single entity that is the focus and corresponds to a target extracted entity in the NLP system, (for example, Ship_Attack 19 in FIG. 10), and a collection of all the triplets that have the focus entity on either end of the triplet. This is further illustrated graphically in FIG. 10, which shows the triplets:

Ship_Attack 19 ship attack of Ship_Attack
Ship_Attack 19 has location Pusan
Ship_Attack 19 has location Singapore
Ship_Attack 19 has date 16 feb
Ship_Attack 19 has date 1600 HRS local time
Ship_Attack 19 has coordinate 19-19n
Ship_Attack 19 has coordinate 118-43e
Ship_Attack 19 has attackers Unknown In general, any implementation of a semantic network would typically support a simple query into the semantic network persistence mechanism requesting this collection of triplets for a particular entity or entities.

Component 8—an Entity Type for the Targeted Entity and Associated Entities in the Template for Said Entity Type—

In general, any implementation of a semantic network that supports entity types will typically also support a simple query into the semantic network persistence mechanism requesting the entity type associated with an entity. Accessing the triplets in the template for an entity type is typically a simple query into the semantic network persistence mechanism.

Figure 11:
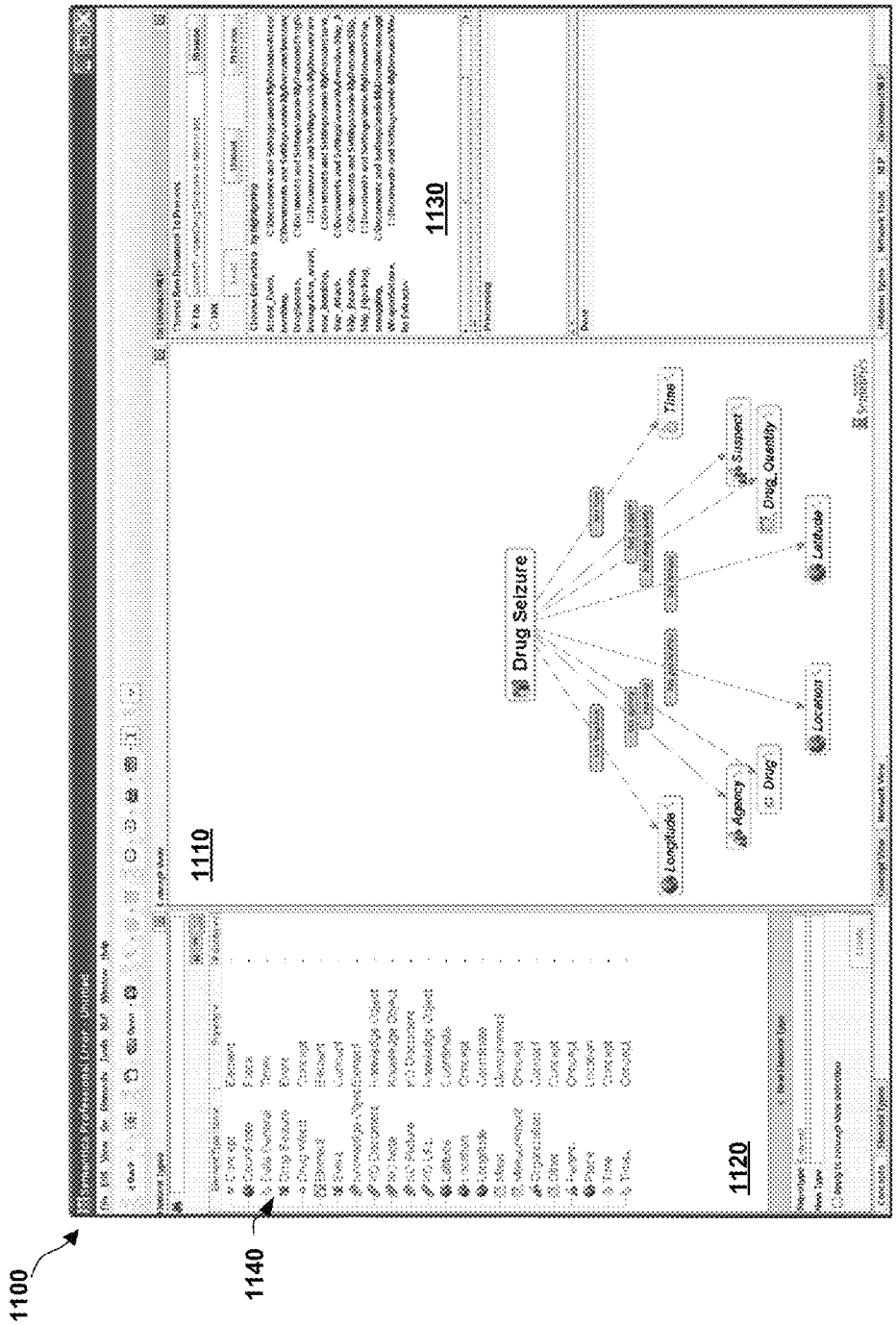
FIG. 11 is an illustration of an example of Element Types for Triplet Roles in a Drug Seizure Element Type in accordance with aspects of the present invention.

For example, as shown in FIG. 11, the triplets in the template for the Drug Seizure type are shown graphically in the center panel 1110, and the corresponding Drug Seizure element type 1140 is shown in the Element Types panel 1120 on the left, along with the element types for the roles in the template such as Longitude, Latitude, Location, Agency, Drug Word, Organization, etc. Example Targeted data components within the document repository for a typical use of the invention:

Component 9—Document Collections/Repositories—

This component includes collections of documents in a digital format, stored in such a way that they are accessible, searchable, editable, and extractable by the NLP system. Typically these are:

9a. minimally are accessible to the NLP system for batch indexing, and 9b. ideally are also accessible through a URI or other programmatically usable content-addressing system for display to users throughout the process supported by the invention. In the absence of this feature, the NLP system must store and provide copies of at least the text of the documents and make that available for full provenance to be usable.

This component includes a collections of documents stored in such a way that they minimally are accessible to the NLP enterprise processing system for batch indexing, and ideally are also accessible through a URI or other programmatically usable content-addressing system for display to users throughout the various processing provided by embodiments of the invention. In the absence of this feature, the NLP system should be configured to store and provide copies of at least the text of the documents and make that available for full provenance in order to provide maximum utility.

In an exemplary embodiment, if the standard path to the document comes from a shared server, then that is stored in the provenance information and thus provides subsequent users with access to the original document. In one embodiment, any document that is in an XML-based markup format has additional XML inserted to support the NLP additions, and various scripting languages to use these XML annotations and add UI comparable to the NLP system's standard viewers to allow manipulation of the marked up NLP-processed text. This can be done with XHTML documents (possibly derived from HTML documents) as well as with XML document formats for Microsoft Office or Open Office (or other newer XML-based formatted) documents.

Figure 12:
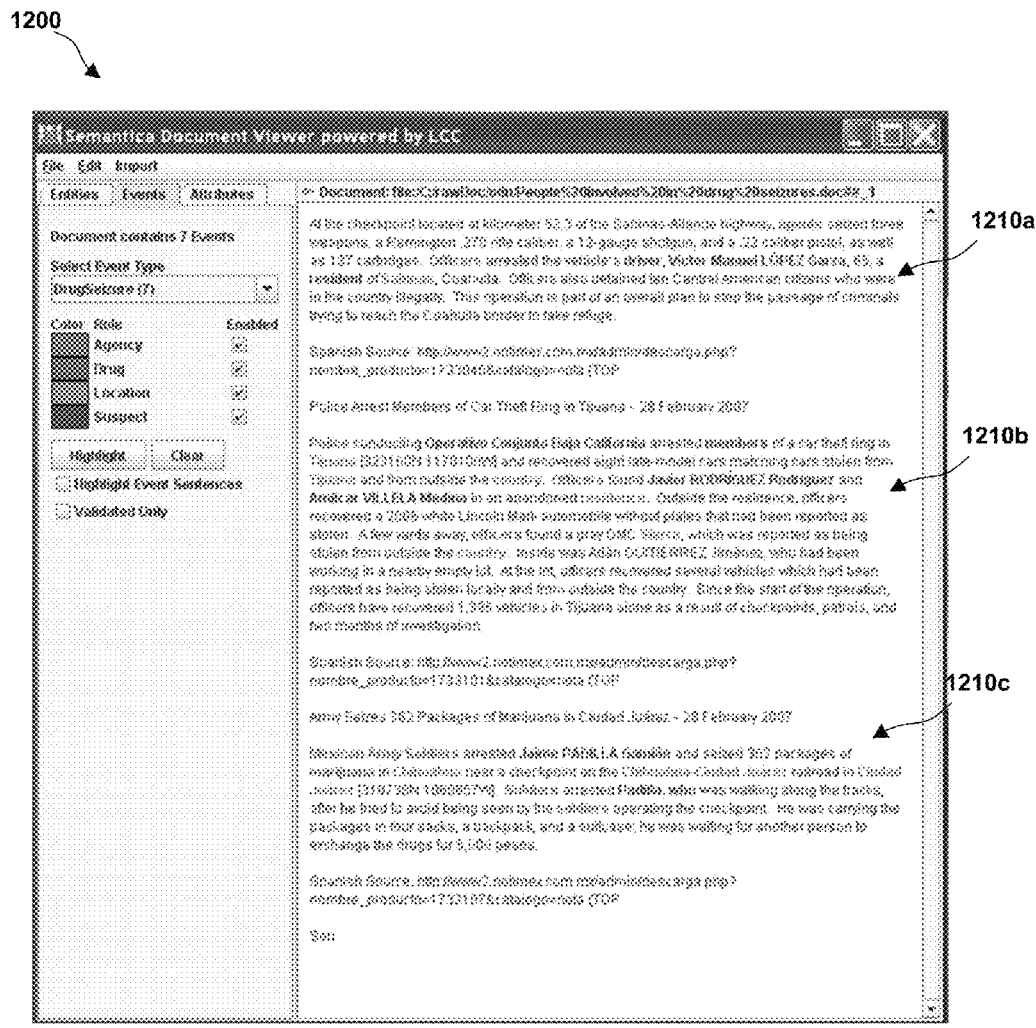
FIG. 12 is an illustration of an example Marked Up Document containing 7 instances of Drug Seizures in accordance with aspects of the present invention.

However, for maximum flexibility, the NLP system in an exemplary embodiment also stores copies of just the text and provides that in standard marked up views. For example, FIG. 12 illustrates a marked up document containing passages identified by the NLP system as seven DrugSeizure events, three of which are shown in the text of the screen as 1210*a*, 1210*b* and 1210*c*. Note that in this example, DrugSeizure events are events identified with the documents by the NLP system as being similar to the trained event extractors for that type. However, upon closer inspection, only 1210*c* actually describes a drug seizure, while 1210*a* is a weapons seizure and 1210*b* is a stolen vehicle seizure, both misidentified by the NLP system based on the presence of words like "seized" or "recovered," or common roles that occur in all kinds of counter-crime interventions. In effect, many embodiments of the present invention are dependent on the information provided by the NLP system, which may or may not be complete or entirely accurate.

Component 10—Document Management Module—

This module/interface is configured to enable users to add, remove, organize and reorganize the documents in the repository. An exemplary embodiment comprises one or more Document Management modules to allow users to add, remove, organize and reorganize the documents in the repository. In one embodiment, the server's file system may be used to provide this functionality; however, this functionality may alternately be incorporated in the network analysis tool, NLP and/or in other modules of the hosting computer systems.

Component 11—Repository Browse Module—

This module/interface is configured to enable users to browse the repository and choose documents manually when needed. As such, it is an interface for users to browse the repository and choose documents manually when desired. As with component 10, in an exemplary embodiment, the server's file system augmented with a standard File Chooser dialog may be used to provide this functionality. However, this functionality may alternately be incorporated in other components An exemplary embodiment of the enterprise NLP system is provided by LCC or GATE as described previously, but any other NLP system that provides similar capabilities could be incorporated in other embodiments of the invention.

Example Implementation Methods for Targeted Data Components for Processing within the Enterprise NLP System for a Typical Use of the Invention Example targeted data components and associated methods for processing within the enterprise NLP system for a typical use of the invention may include:

Component 12—Document Processing Modules—

One or more modules, which may be manual, automatic or preferably both manual and automatic that process or cause documents to be processed by the NLP system so that subsequent queries for documents containing content of interest can be executed quickly. The balance between automatic/batch processing and desktop processing will vary as different NLP systems are used, depending on the requirements of each NLP system. In typical embodiments with current available hardware, state-of-the-art enterprise systems are frequently needed to process large collections, and high-speed multi-core and multi-processor desktop systems are required for satisfactory desktop indexing and querying.

12a. The balance between automatic/batch processing and desktop processing will vary as different NLP systems are used, depending on the requirements of each NLP system.

12b. In typical embodiments with currently available computer hardware and software, state-of-the-art enterprise systems are frequently needed to process large collections, and high-speed multi-core and multi-processor desktop systems are required for satisfactory desktop indexing and querying.

In an exemplary embodiment, banks of enterprise-class servers are used for indexing of large collections of documents, although smaller collections are handled by desktop-class machines. Manual indexing is invoked through the NLP system's standard manual indexing process. Automatic indexing is provided with a script that watches a folder for new additions and submits them to the NLP system on a regular basis.

Component 13—Document and Index Storage—

Figure 13:
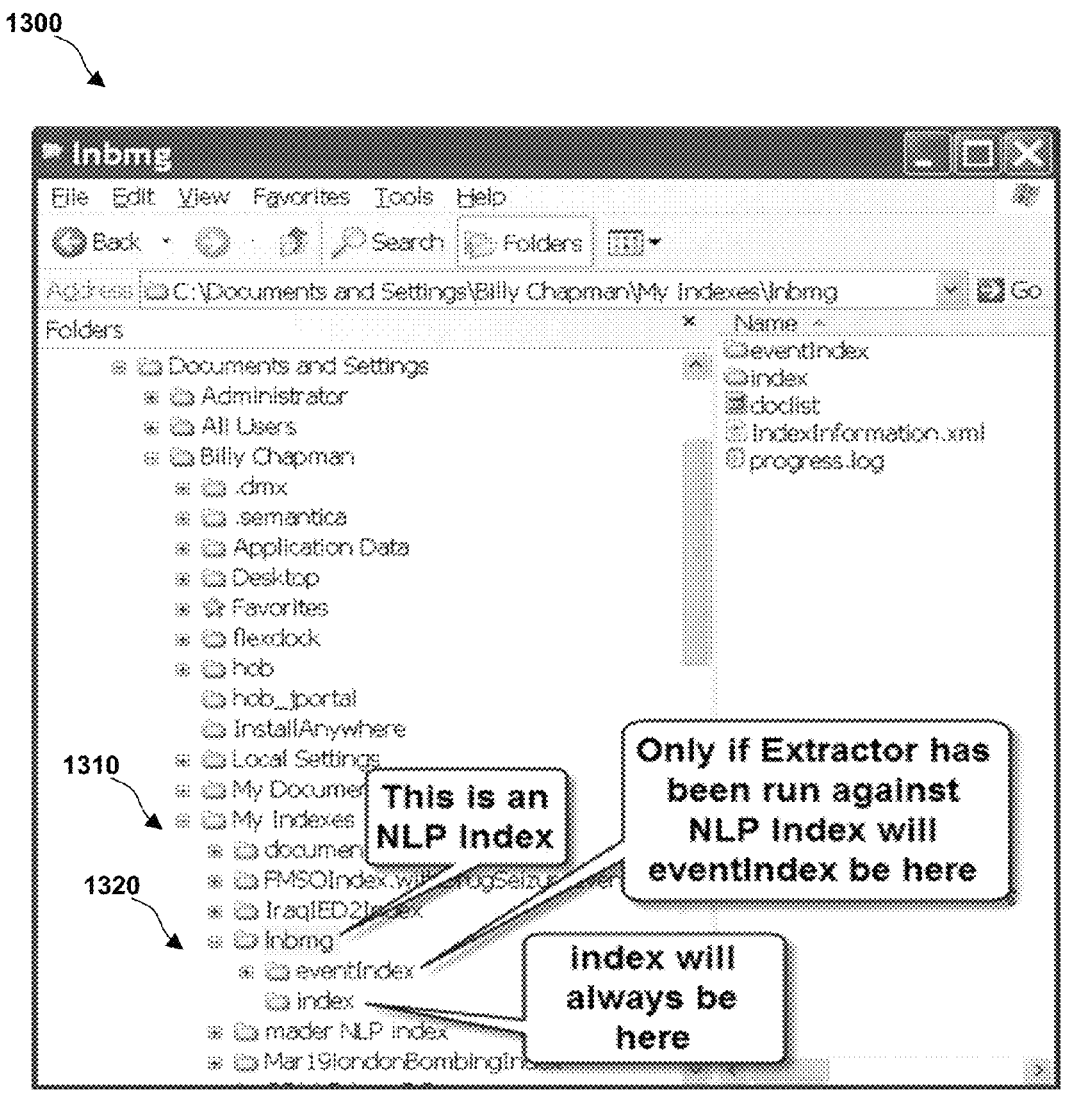
FIG. 13 is an illustration of an example of a typical user's local collection of Indices in an associated "My Indexes" folder in accordance with aspects of the present invention.

Both shared and local storage or other managed access for collections of indexes of collections of documents should preferably be provided. In an exemplary embodiment, indexes are placed on a standard shared server and managed with the server's and/or host computer's file system. For example, FIG. 13 shows a typical user's local collection of indexes on a Microsoft Windows based system ("FMSOIndex.withDrugSeizures", "IraqIED2Index", "lnbmg", "madder NLP index", etc.) stored in a "My Indexes" folder 1310, with "lnbmg" 1320 being chosen as the target index.

Component 14—Storage for NLP Extractor Definitions—

Both shared and local storage or other managed access for collections of NLP extractor definitions. In an exemplary embodiment, shared indexes are placed on a standard shared server and managed with the file system.

Component 15—Document Processing Based on New/Modified NLP Extractors—

One or more modules for processing documents or updating indexes by applying newly defined or modified NLP extractors as they are refined. In an exemplary embodiment, the standard indexing mechanism provided by the NLP system will supports this functionality directly.

Component 16—Index Query Modules.

One or more modules for querying one or more indexes for a collection of marked-up documents (i.e., entities, events, etc. fully extracted) likely to contain answers to a natural language question or other search query, or documents likely to be relevant based on other kinds of queries, ideally sorted by likely relevance. In an exemplary embodiment, a question-answering subsystem provides the ability to target a particular index (or multi-index which combines indexes into one) after choosing it. In one embodiment using NLP tools provided by LCC as described previously, the user chooses an index by selecting the folder containing the index as, for example, is shown in screenshot 1300 of FIG. 13.

Figure 14:
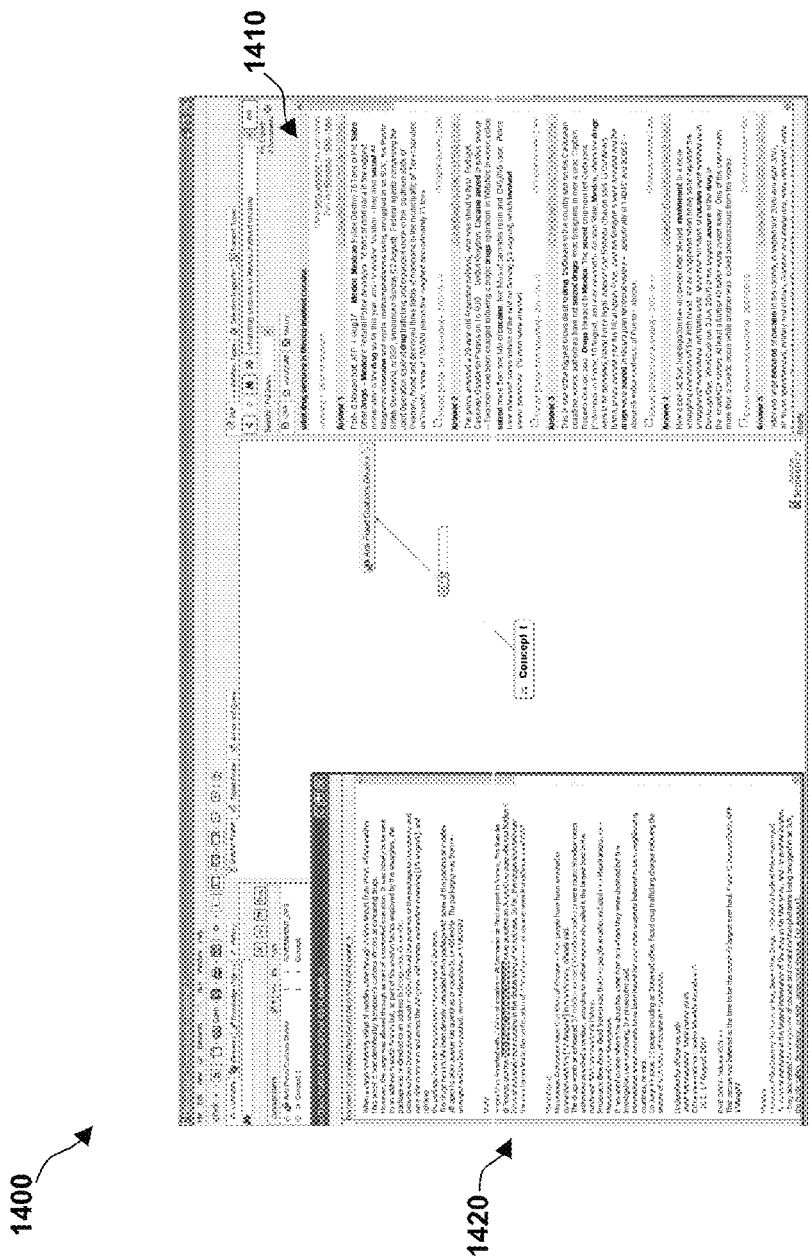
FIG. 14 is an illustration of example results from a query in accordance with aspects of the present invention.

The user can then query the target index using natural language text that may be just keywords of interest, and/or may be a natural language question or other search criteria to narrow down the query. An example resulting list of documents provided may then be sorted by a measure of likely relevance. For example, screenshot 1400 of FIG. 14 shows the query "what drug seizures in Mexico involved cocaine" having been run on the right side, shown as 1410 and resulting in 39 documents, one of which has been opened on the left side and shown as 1420.

Example Implementation Methods for Targeted Data Components Comparable to the Enterprise Processing within the Local Desktop NLP System for a Typical Implementation of the Invention:

In an exemplary embodiment, the desktop NLP system is provided by particular tools that provide the key subsystems for an NLP system as described above, however, other NLP system that provides similar capabilities could be incorporated into embodiments of the invention. In these implementations, modules may include one or more of the following.

Component 17—Selection Module for Selecting and Indexing Individual Documents—

This component may be one or more modules for selecting and indexing or otherwise processing individual documents, producing a marked up document similar to what is returned by an enterprise NLP system result. Under resource-limited situations, the result might be less well marked-up, although in an exemplary embodiment, sizes are instead limited to fit demand to the capabilities of the platform.

In an exemplary embodiment using NLP tools provided by LCC as described previously, local desktop NLP processing uses the provided file system and a File Chooser dialog to select one or more documents. The files are size-limited based on type of document. A local desktop-optimized NLP markup tool may be embedded and run with the local CPU to produce a marked up document similar to that provided by the enterprise NLP solution.

Figure 15:
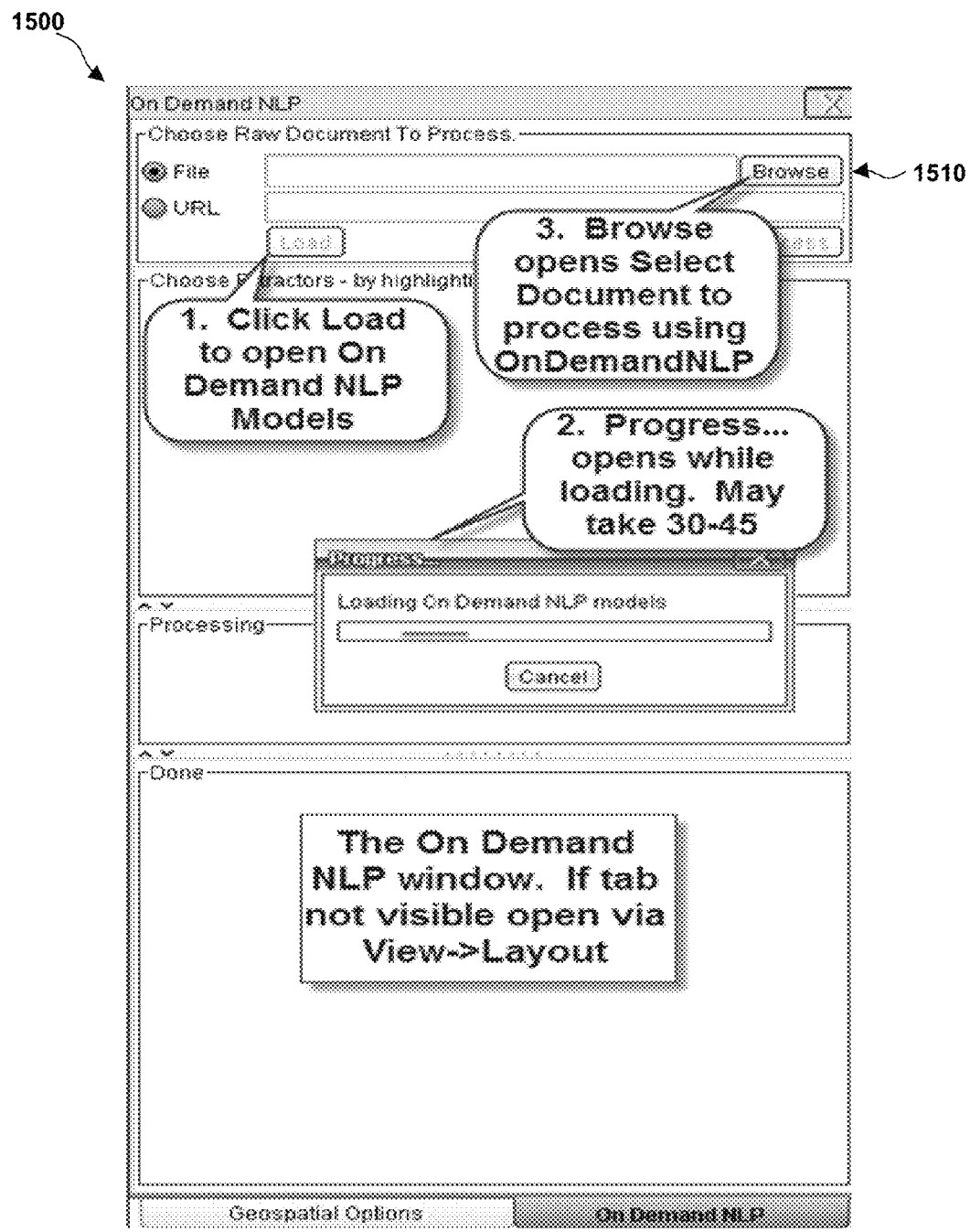
FIG. 15 is an illustration of an example Workflow for loading an Individual Selection Module and choosing Target Documents and Extractors in accordance with aspects of the present invention.
Figure 16:
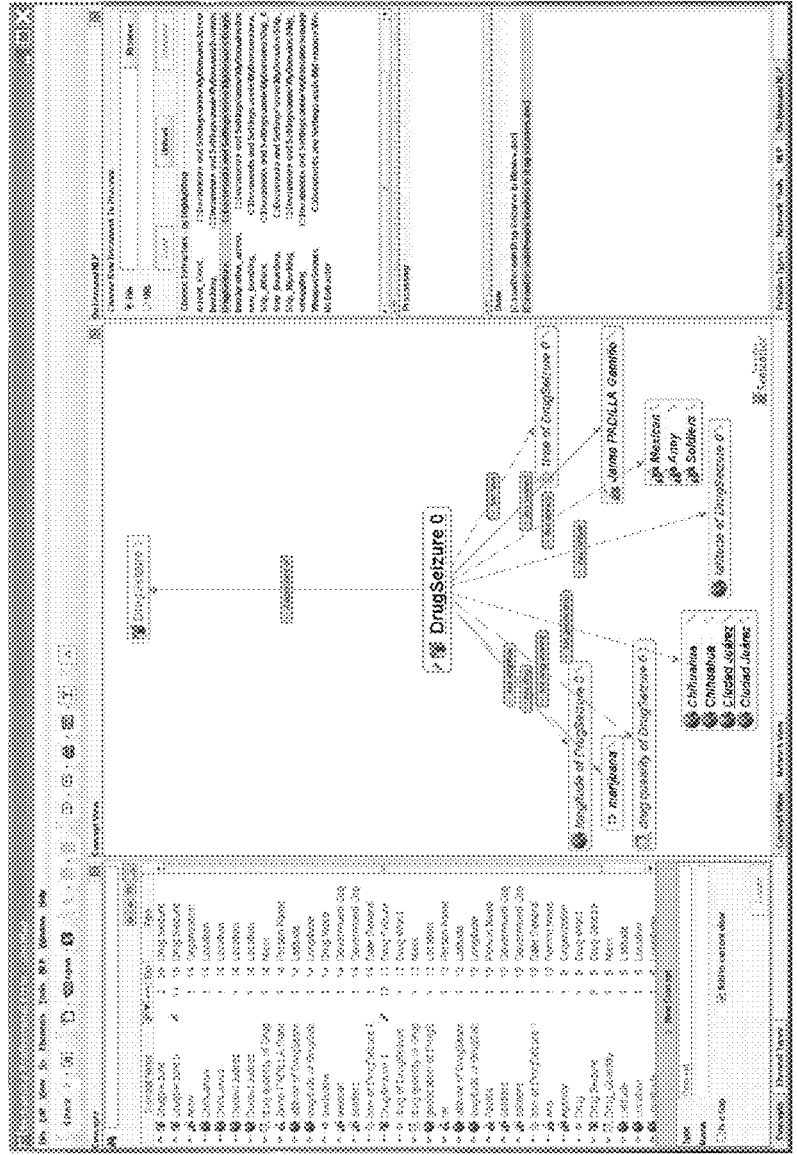
FIG. 16 is an illustration of an example of completed NLP processing of an individually selected document in accordance with aspects of the present invention.

For example, FIG. 15 shows a screenshot 1500 of the workflow for loading the system and choosing a document in an exemplary embodiment of individual document selection. The example panel shown on the right in FIG. 11 illustrates the intermediate steps of choosing an individual document and extractors for it. FIG. 16 shows an example screenshot 1600 of the completed processing of an individually chosen document.

Example Implementation Methods for Targeted Data Components within the NLP System for Interactive Use in a Typical Implementation of the Invention In both the LCC and GATE embodiments, portions of the NLP system for interactive use are provided by custom views that embed widgets and panels provided by libraries and APIs from the NLP system. These libraries and APIs access their NLP subsystems as described previously herein. However, other NLP systems that provides similar capabilities may be incorporated into embodiments of the invention in a similar fashion to provide the same or similar functionality.

Component 18—Indexes—

One or more indexes (or other modules or processes provided by the NLP system for filtering the entire contents of the document repository to a focused subset) chosen by the user to narrow their query environment to a subset of the documents available from the repository or locally, and possibly to sharpen the focus on particular desired types of entities, events, roles, or relationships. Indexes may be built in advance and stored on disk (as shown in, for example, FIG. 13), or may be built as needed and stored in memory (as shown in the panel 1130 on the right of FIG. 11), perhaps for storage later. In an exemplary embodiment, this component is provided by tools from an NLP system provided by LCC as described previously herein providing the key subsystems described above, but other NLP systems that provides similar subsystems can also be used.

Component 19—A Set of One or more Marked Up Documents—

These are documents chosen from the document repository by the NLP system, and/or chosen manually by the user on the desktop/GUI interface, along with identified and extracted entities, events, roles, attributes, relationships, or subjective information of interest to the user that are accessed via the document repository interfaces, or manual desktop document selection. Ideally, the implementation is configured to allow a user to manually add, change, or correct mark-up and have those modifications be persisted in the index and affect later queries. An exemplary embodiment uses the standard markup format provided by the NLP system and is shown in example screenshot 1200 of FIG. 12.

Component 20—NLP Extractor Definitions—

Figure 17:
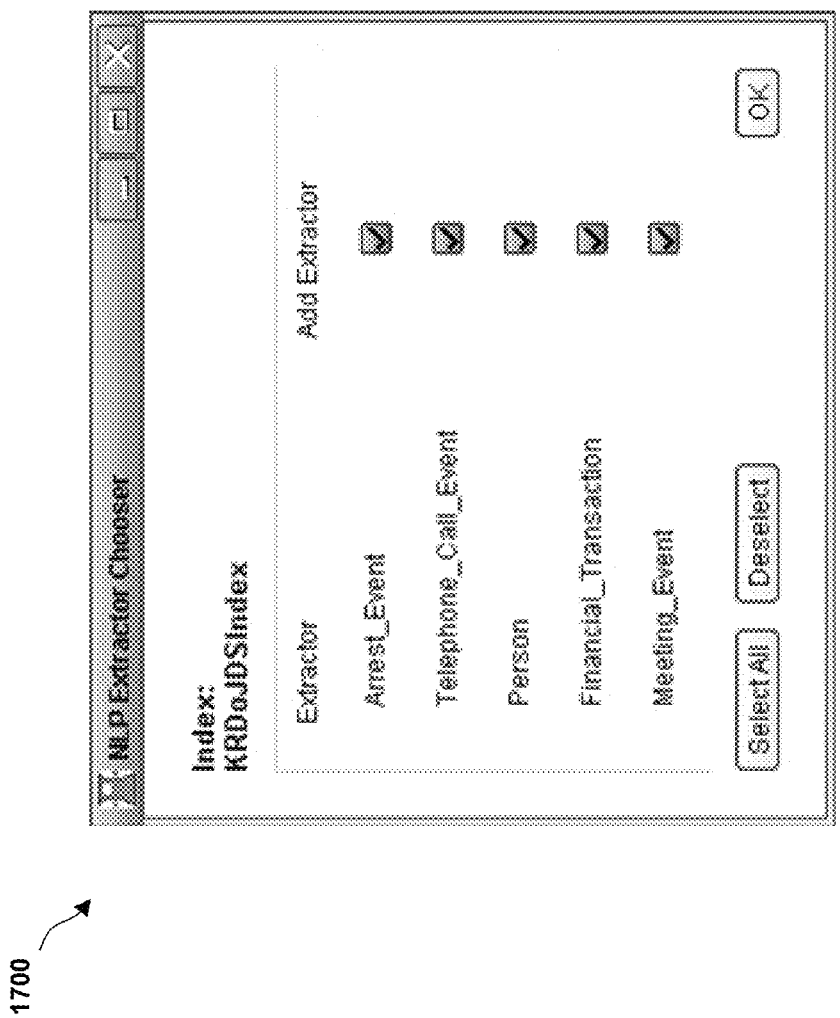
FIG. 17 is an illustration of an example of a sample of available Extractors in an NLP System of an exemplary embodiment of the present invention.

These may be one or more NLP extractor definitions or other pattern specification methods provided by the NLP system for describing the kinds of information it should find and extract. Ideally, the implementation is configured to allow users and programs to create new ones and to modify old ones, whether they were provided by the NLP system or created by the user. An exemplary embodiment's chosen NLP system may be configured to provide dozens of predefined but un-modifiable event and attribute extractors, some of them shown in example screenshot 1700 of FIG. 17, and allows the creation and modification of new ones by the user.

Figure 18:
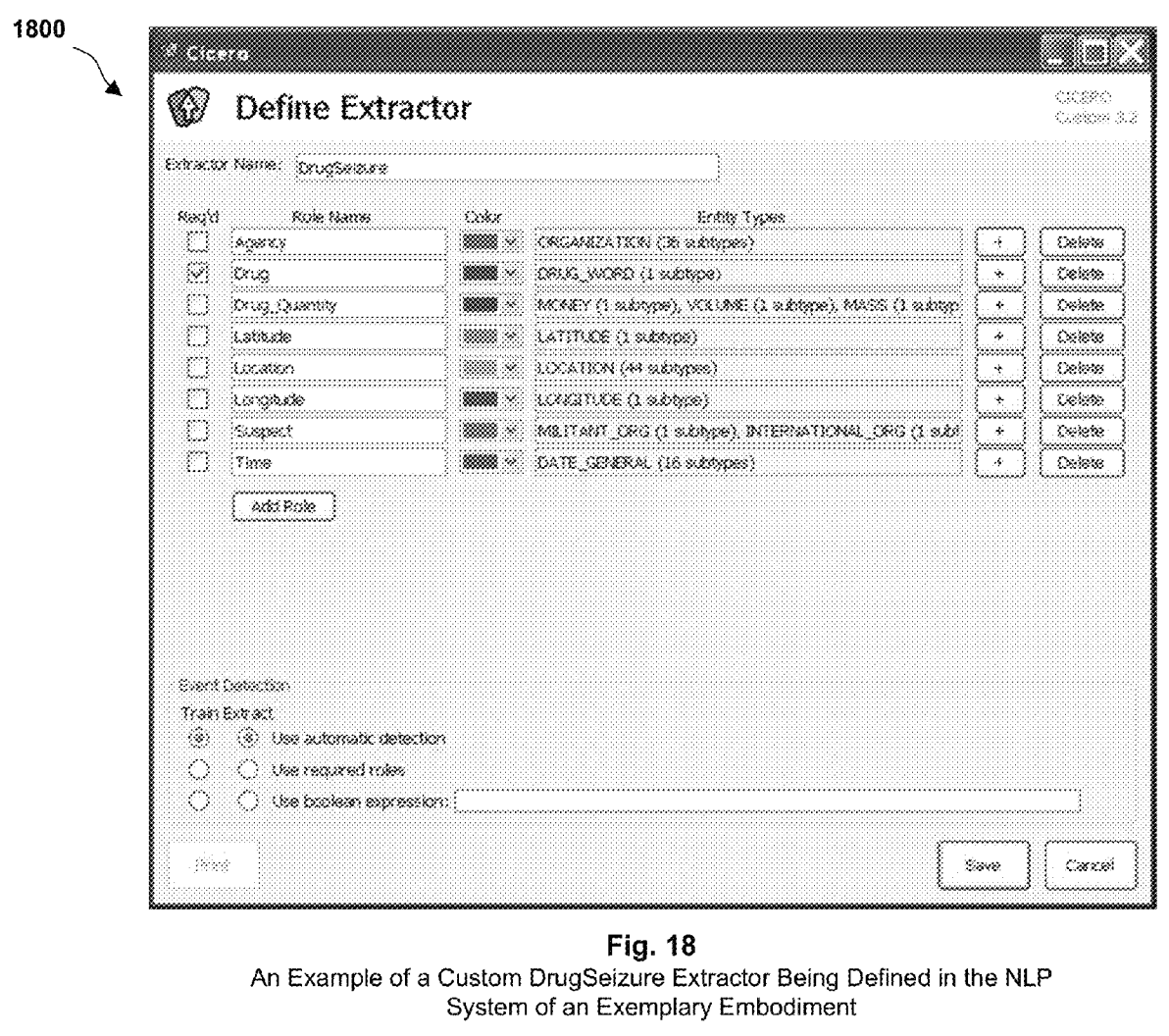

For example, FIG. 18 illustrates an example screenshot 1800 showing a DrugSeizure extractor being defined in the NLP system in an exemplary embodiment using NLP tools provided by LCC's Cicero application, resulting in later extractions produced as shown in FIG. 9, FIG. 11 and FIG. 16.

Component 21—Access to Filled-In NLP Extractor Frames—

The component facilitates access to filled-in NLP extractor frames for each type of event, role, or attribute that can be extracted, describing the related entities and their entity types whose nearby or otherwise connected occurrence influenced the NLP system to detect the occurrence of each event or role and its various sub-components as described below. An exemplary embodiment's NLP system provides API access to NLP extractors that allows access to the individual roles and other components of each extractor's definition. FIG. 9, FIG. 11 and FIG. 16 show examples of such filled in DrugSeizure frames after extraction into the semantic network.

Component 22—Collection of Related Content—

This component is a a collection of related content for each occurrence containing various sub-components. An exemplary embodiment's NLP system provides API access to this content related to each extracted entity, event, role, or relationship. FIG. 9, FIG. 11, and FIG. 16 show screenshot examples of such sub-components for the DrugSeizure frames after extraction into the semantic network.

Component 23—One or More Entity Types from the Entity Ontology—

An exemplary embodiment's NLP system using NLP tools provided by LCC as described previously herein provides API access to the entity types of each entity along with access to the NLP system ontology.

Component 24—NLP Extractor-Produced Frames—

If the identified entity is an event, or a collection of roles of said identified entity, one or more NLP extractor-produced frames or other semi-structured components (slots filled with natural language) for describing said identified entity, filling the roles in the NLP extractor definitions used to identify it with other entities extracted from nearby text. An exemplary embodiment's NLP system provides API access to the components of the frame, including the entities filling the roles defined in the extractor. FIG. 9, FIG. 11, and FIG. 16 show screenshot examples of multiple DrugSeizure frames and their roles filled with entities after extraction into the semantic network.

Component 25—Text Components—

Figure 19:
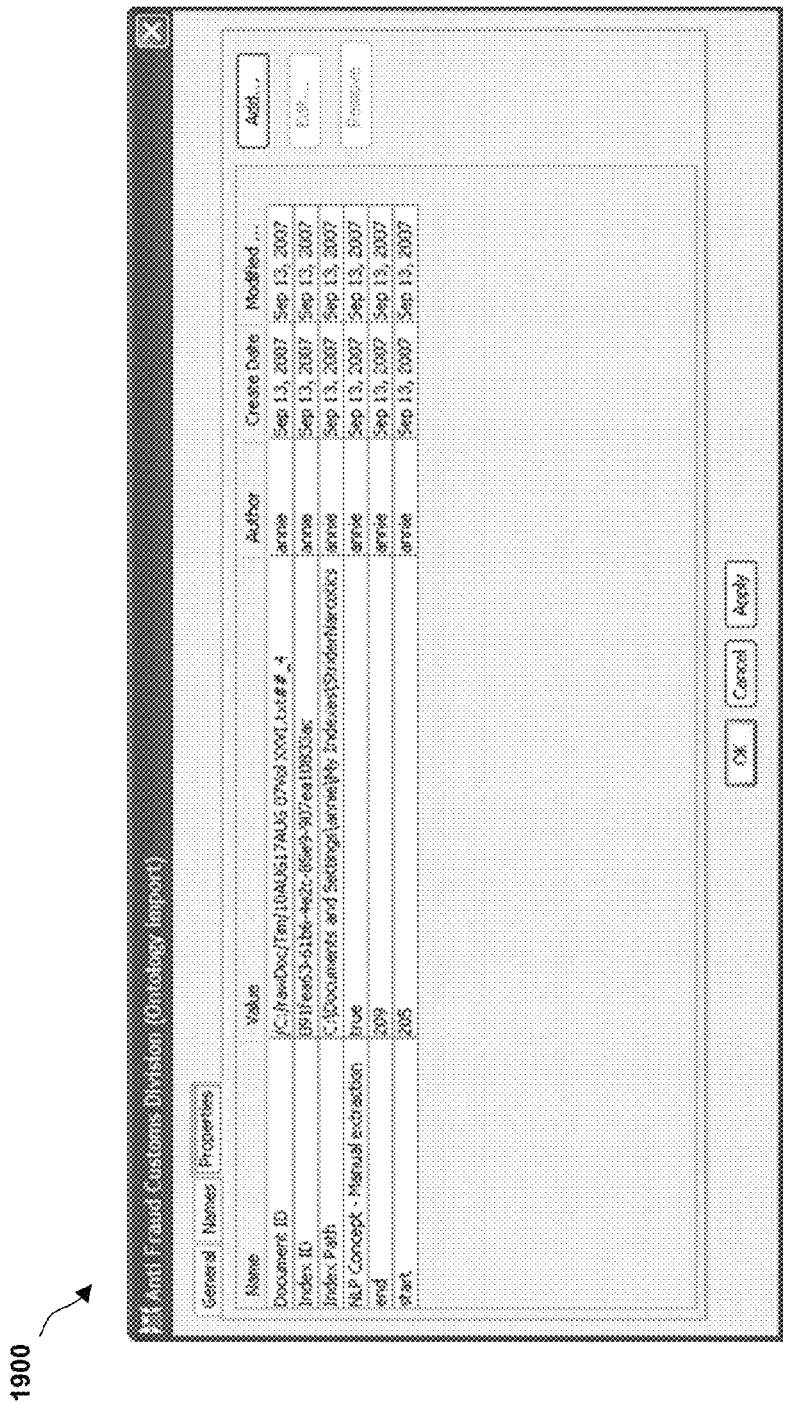
FIG. 19 is an illustration of the Provenance for an Entity Extracted by an NLP System embedded in an exemplary embodiment and stored as properties in a Network Editing Tool.

These are the text component or components from which said identified entity has been extracted by the NLP system. An exemplary embodiment's NLP system provides API access to the text within which the said entity was found. FIG. 19 shows the resulting provenance provided by an exemplary embodiment's NLP system stored as properties in the network editing tool.

Component 26—Provenance and Other Information—

This includes other associated information such as provenance (authorship, dates of authorship/discovery/processing, document, and document path, index path, classification, type of source, start and end offsets, unique source entity IDs, and unique network element IDs), etc., for said identified entity and for the associated text components within which it occurs. An exemplary embodiment's NLP system provides API access to the information stored in the index including various metadata available about the document. As an example, FIG. 19 shows a screenshot 1900 of the resulting provenance provided by an exemplary embodiment's NLP system stored as properties in the network editing tool.

Example Data Processing Modules May Include

Component 27—

One or more Ontology Search Modules configured for searching the NLP system ontology for entity types containing a selected string. In an exemplary embodiment, this module uses the provided NLP system API to acquire the ontology and search the names of entity types. With support from the NLP system or with integration of WordNet synset processing, more flexible mappings can be constructed to broaden the mapping.

Component 28—

One or more NLP Extractor Definition Retrieval Modules configured for retrieving the NLP extractor definition for a particular NLP extractor. In an exemplary embodiment using NLP tools provided by LCC as described previously herein, this module uses the NLP system API for retrieving the contents of the NLP extractor definition. As an example, this approach was used to turn the extractor definition shown by an exemplary embodiment's NLP system, as shown by way of example in screenshot 1800 of FIG. 18, into the network editing tool's element type template shown in FIG. 11.

Component 29—

Figure 20:
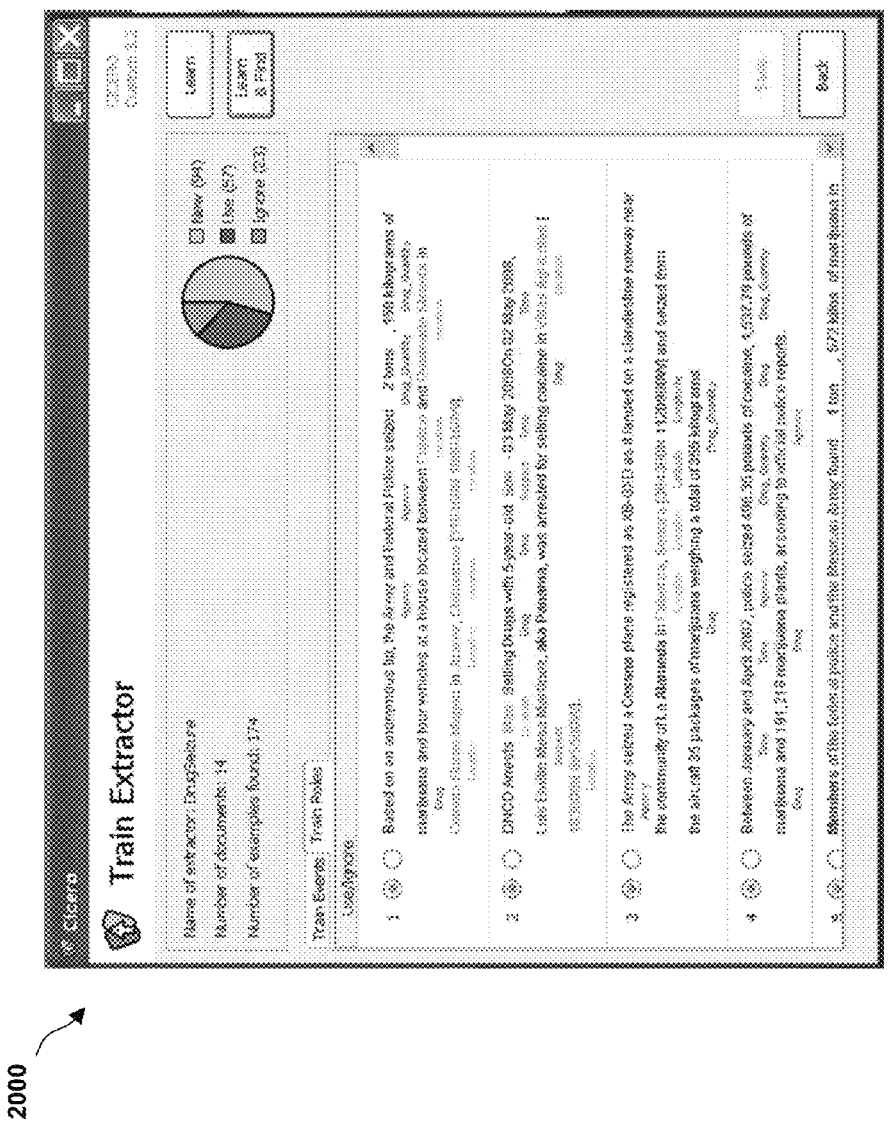
FIG. 20 is an illustration of an example of Training Roles of a Drug Seizure Extractor in an Exemplary Embodiment of the present invention's NLP System.

One or more NLP Extractor Definition Setting Modules configured for setting the NLP extractor definition for an NLP entity. In an exemplary embodiment, this module uses the NLP system API for setting the definition of the NLP extractor definition. In an exemplary embodiment, this method may be used to turn the element type template shown in screenshot 1100 of FIG. 11 into the beginnings of the extractor definition shown in screenshot 1800 of FIG. 18. The subsequent extractor training that must be done generally requires separate user access to the training portions of the NLP system itself through its own UI. FIG. 20 shows an example screenshot 2000 illustrating the training of the DrugSeizure extractor in an exemplary embodiment's NLP system using NLP tools provided by LCC as described previously herein.

Component 30—

One or more NLP Extractor Frame Content Retrieval Modules configured for retrieving the NLP extractor frame contents for an NLP extracted entity. In an exemplary embodiment, this module uses the NLP system API for accessing an NLP extractor frame. It then extracts the contents of the NLP extractor frame from the returned XML fragment, and fills in whatever additional information is needed by further API calls, typically in a straightforward manner. FIG. 9, FIG. 11 and FIG. 16 show screenshot examples of such filled in DrugSeizure frames after retrieval from the NLP system via this mechanism and after insertion into the semantic network.

Example Embodiments of Components of Embodiments of the Invention Connected to and Interacting with the Above Infrastructure Components Through their Interfaces In an exemplary embodiment, these components are provided as a plug in or other integratable application module so as to be fully integrated in the network editing tool to support a preferred work flow.

In other embodiments of the invention and depending on whether the network editing tool or the NLP tool is better equipped to support work-flow, these components might better be embedded in the NLP tool and/or in a separate work-flow support environment. For example, they may be integrated into a web-based environment accessing network editing tools and NLP tools on a shared enterprise-level server, or in other configurations. These modules may include one or more of the following types of modules configured to implement the associated described functionality.

Component 31—

One or more Entity Type to Element Type Translation Modules configured for translating between the entity types in the NLP system ontology and the element types in the semantic network ontology.

In an exemplary embodiment, this module maintains a straight name-matching-and-transformation mapping between NLP entity types and roles and semantic network element types and relation types. However, a potentially beneficial enhancement may be provided through a user-modifiable mapping between the two ontologies. Because many NLP systems have a fixed ontology and most network editing tools allow user modification of the ontology, it is common to import anything from the NLP system ontology into the semantic network ontology whenever one is needed that does not have a mapping.

Figure 21:
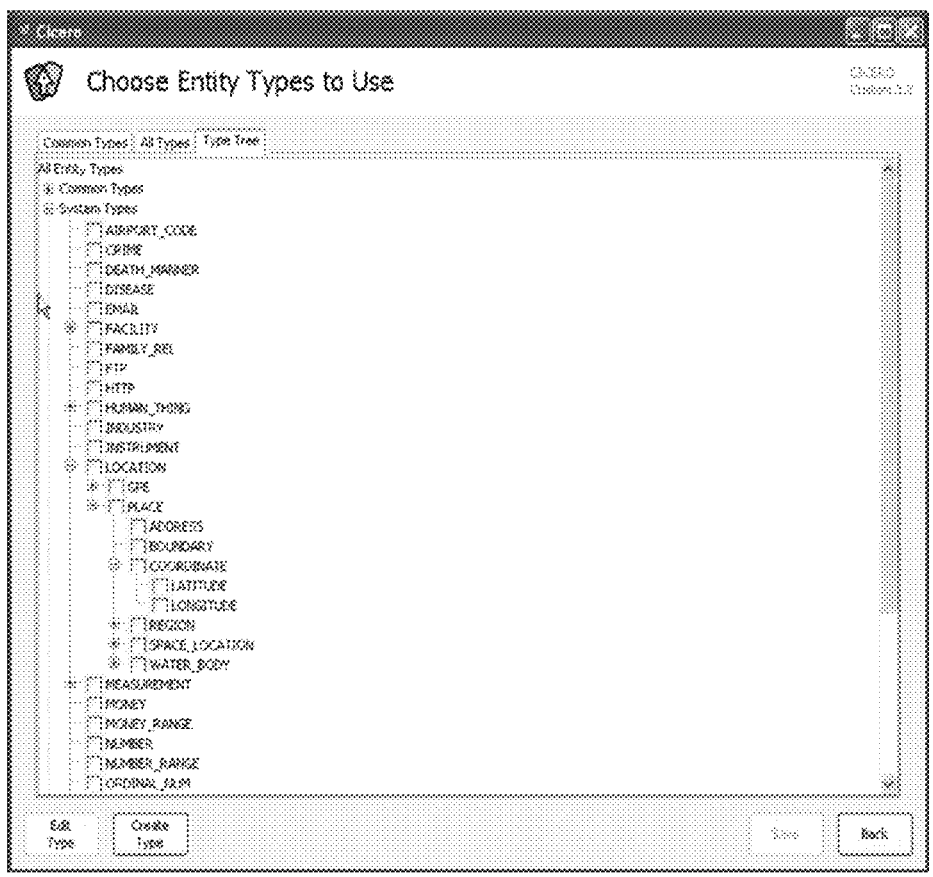
FIG. 21 is an illustration of an example of a portion of the Ontology provided by an Exemplary Embodiment of the present invention's NLP System.

In cases where the NLP system ontology is particularly authoritative and amenable to the users' preferred terminology, the entire NLP ontology can be transformed into a base ontology for the semantic network whenever a new network is created. For example, FIG. 21 shows a screenshot 2100 of a portion of the ontology provided by an exemplary embodiment's NLP system, portions of which have been mapped into semantic network element types used in the resulting DrugSeizure element type and its template as is shown in FIG. 11. Note that the preferred embodiment automates certain kinds of simple mappings such as changing from all uppercase letters with underscores to first-letter-uppercase with spaces, and merging separate but similar NLP distinctions, such as HUMAN_THING, HUMAN_NAME and PERSON, into a single semantic network element type that fits human usage better.

Component 32—

One or more User Mapping Definition Modules configured to allow users to define preferred mappings between the NLP system ontology and the semantic network ontology. In an exemplary embodiment, this module allows users to define a two-way mapping between element types in their semantic network ontology and the entity types in the NLP system's ontology as part of individual semantic network ontologies.

Component 33—

Figure 22:
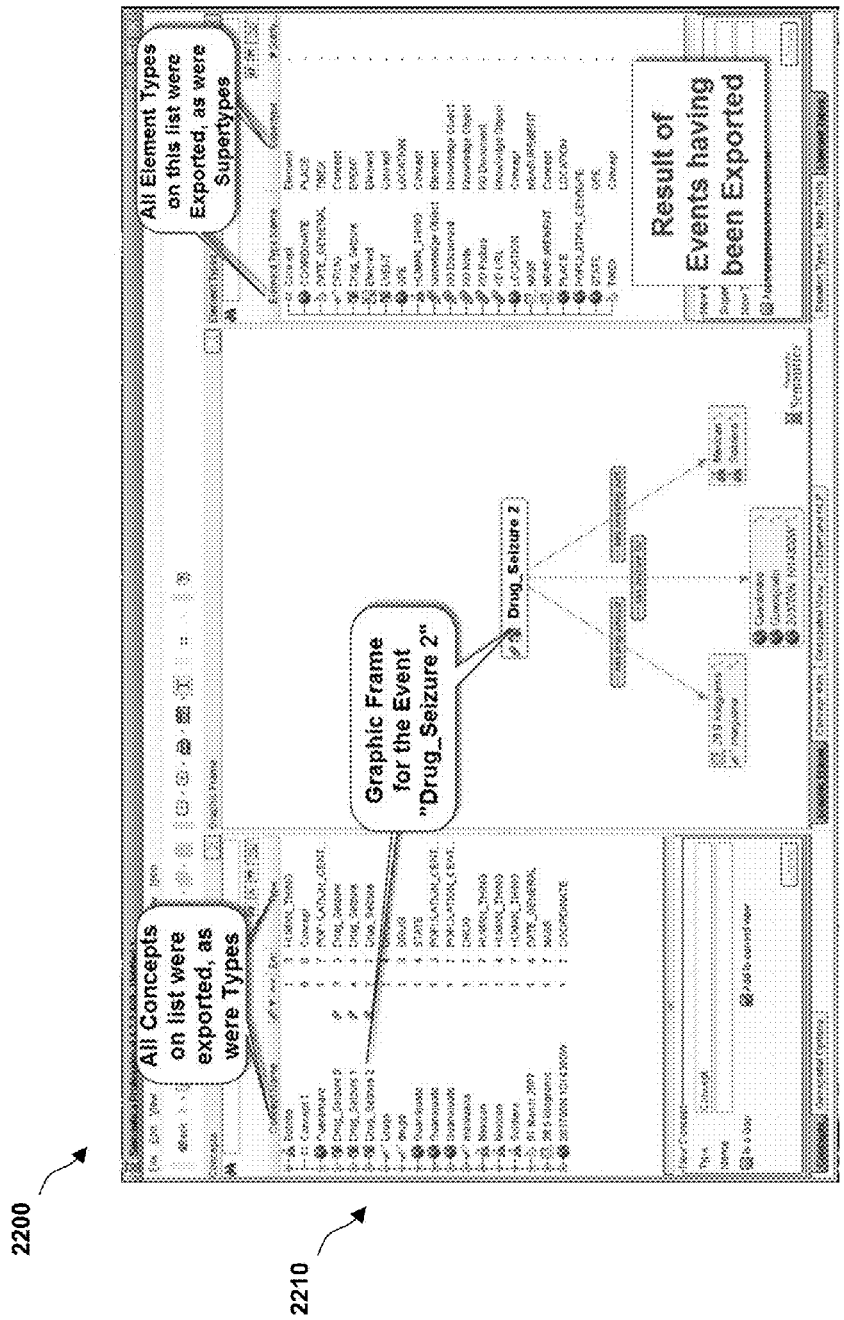
FIG. 22 is an illustration of an example of Element Type Assignments to Extracted Role Filters in the Triplets of an Extracted Frame in accordance with aspects of the present invention.

One or more NLP Extractor Definition Translation Modules configured for translating an NLP extractor definition into knowledge structure triplets and thence to a knowledge structure template with triplets containing gaps. In an exemplary embodiment, this module may be implemented using the following process.

i. Create an element type corresponding to the type of entity represented by this NLP extractor definition. In the preferred embodiment, NLP extractors are not directly tied to an entity type that they extract, but the name of the extractor, e.g., "weapon seizure" or "ship attack", is assumed to be an appropriate type name for the kind of event it detects.
  ii. For each role name in the NLP extractor definition (e.g., "Location", "Suspect", and "Agency" in the DrugSeizure NLP extractor definition example screenshot 1800 shown in FIG. 18).
    a. Create a (or use an existing) corresponding relation type, giving it a name that can be easily mapped back to the NLP extractor role name, e.g., "has location", "has suspect", "has agency", etc., including adding "has" and transforming from partial or all uppercase to the network editing tool's conventions for naming relation types as shown in screenshot 1100 of FIG. 11.
    b. Create a corresponding new gap concept, applying similar cosmetic transformations as shown in FIG. 11.
    c. Create a triplet tying the NLP extractor entity to the new gap using the corresponding relation type as shown in FIG. 11. d. In an exemplary embodiment, the role has an associated set of entity types that role-fillers will be among. In cases where the NLP system has a more refined or differentiated set of types, e.g., distinguishing kinds of locations more extensively than users prefer, the invention does a built-in and frozen mapping to a more usable level. If the user-defined mapping between the two ontologies that is described above is provided, then this mapping can be more flexible and user-defined.
    iii. Create an (or find an existing) element type corresponding to the type of entity identified by this NLP extractor.
    iv. Give the corresponding element type a knowledge structure template containing the triplets created in step ii as shown by the element type assignments in the left panel 2210 of screenshot 2200 of FIG. 22.

Component 34—

One or more Cluster of Triples Translation Modules configured for translating a cluster of triplets attached to a single concept, or stored as a knowledge structure template into a suitable definition for an NLP extractor. In an exemplary embodiment, this module translates a cluster of triplets attached to a single concept, or stored as a knowledge structure template into a new NLP extractor definition in the NLP system, or adds to an existing one that needs enhancing. This module may be implemented by the following process.

i. Given the template for a particular element type, collect the triplets in the template.
  ii. For each triplet in this list, translate it to a corresponding role in the target NLP extractor definition by creating a role whose name is the string describing the corresponding entities or entity types as required by the target NLP extractor definition API:
    a. Extract the corresponding role name from the relation type name for the triplet and transform it in the reverse method of the previous mechanism.
    b. Add or modify these using the NLP system API to create matching entity type names.
  iii. In the preferred embodiment, the resulting extractor definition is only the starting point for an extractor that is usable in the chosen NLP system. A subsequent extractor training phase is required using sample documents before the extractor can be used, as shown in FIG. 20 for the preferred embodiment's NLP system.
  iv. If the extractor definition needs further revision such as adding or changing roles during training, the previous mechanism (shown in FIG. 18 for the preferred embodiment's NLP system) can be used to update the knowledge structure template to correspond to the changes. Alternating use of the previous mechanism and this one allow refinement in either tool, as needed.
  v. If the extractor definition needs roles that are not desirable for the knowledge structure template, these roles are remembered by the knowledge structure for filtering out when re-creating the template from the extractor definition on later rounds.

Component 35—

One or more Frame Translation Modules configured for translating a filled NLP extractor frame or other collection of triplets for a single NLP system entity into corresponding entities, entity types, and triplets in the/knowledge structure.

In an exemplary embodiment, this module may be implemented as described in the following process:

i. Create a concept corresponding to the entity represented by this NLP extractor frame using the NLP system entity name as its name.
  ii. For each role name in the NLP extractor frame (e.g., "Location", "Suspect", "Agency", in a DrugSeizure NLP extractor) or triplet in the returned collection
    a. Create a (or use an existing) corresponding relation type, giving it a name that can be easily mapped back to the NLP extractor role name, e.g., "has location", "has suspect", "has agency" etc.

b. Create a (or use an existing) corresponding related concept for the value, giving it a name based on the role name or role entity type as described above.
c. Create a triplet tying the NLP extractor frame concept from step i) to the new related concept from step b using the corresponding relation type from step a.
iii. Create an (or find an existing) element type corresponding to the type of entity identified by the NLP Extractor.
iv. If the corresponding element type does not already have a template, create a template for it as defined above.

Component 36—

Figure 34:
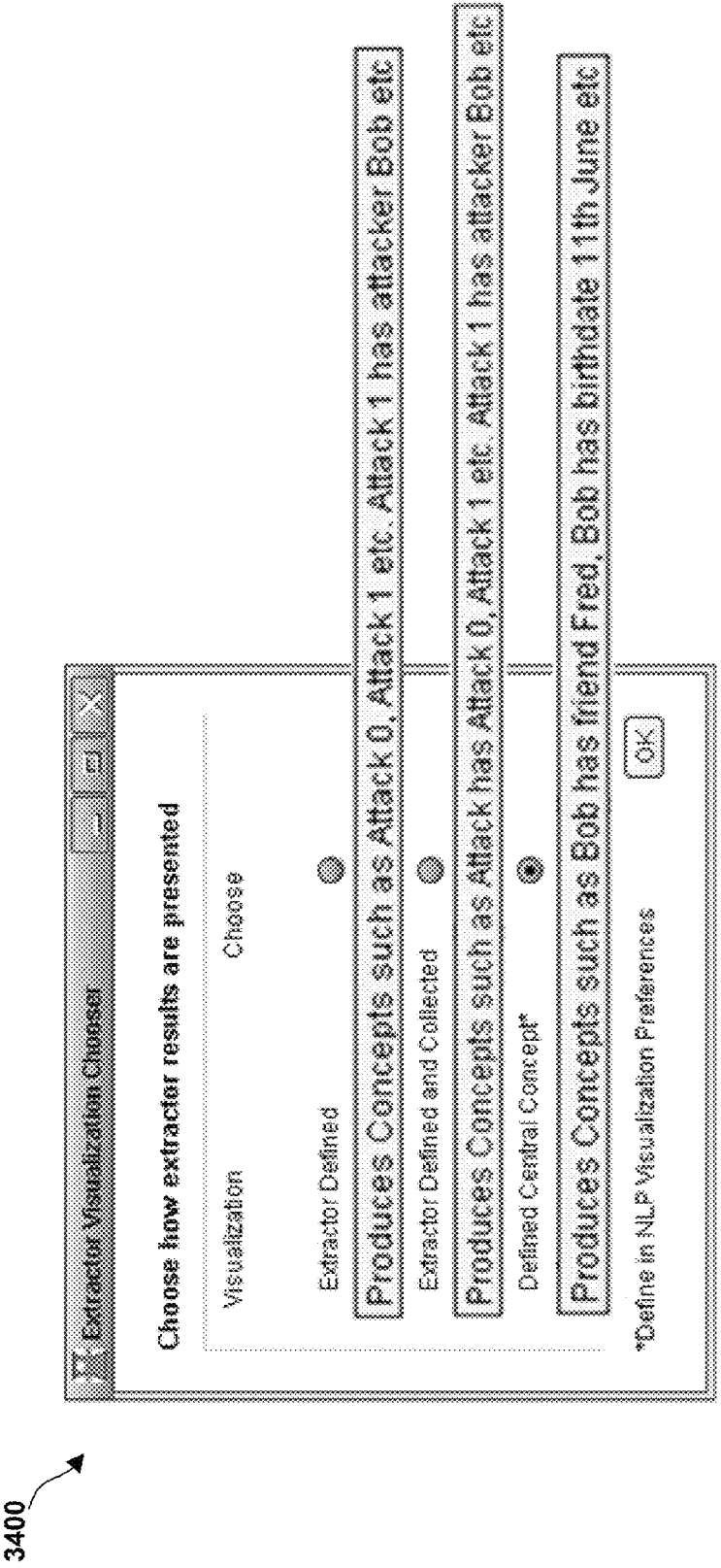
FIG. 34 is an illustration of an example of choice of methods for creating role-filler concepts with additional structure.

One or more Numbering Modules configured for generating separate numbered entity or event concepts to tie NLP roles together as an alternative to using the entity name as the target concept in the frame. In an exemplary embodiment, an user interface is provided (as shown in, for example, screenshot 3400 of FIG. 34) to allow users to select a choice as to whether they want a target entity to become the hub of the triplets in the target semantic network template, e.g. "the seized gun has type 45 mm", "the seized gun has owner Ahmed Chiribiribin", or alternatively to have a new concept "Gun 23" attached to new triplets "Gun 23 has name the seized gun", "Gun 23 has type 45 mm", "Gun 23 has owner Ahmed Chiribiribin". In the latter case, the process for creating new triplets described above is modified accordingly.

As an example, using these three choices, the same text input about a plumber named Bob would result in one of the following sets of triplets:

Extractor Defined:
Person 1 has name Bob
Person 1 has address 123 Main St
Person 1 has hair color blue
Person 1 has occupation Plumber.
Extractor Defined and Collaborated:
Person has Person 1
Person has Person 2
Person 1 has name Bob
Person 1 has address 123 Main St
Person 1 has hair color blue
Person 1 has occupation Plumber
Person 2 . . . would have similar triplets.
Defined Central Concept:
Bob has address 123 Main St
Bob has hair color blue
Bob has occupation Plumber Component 37—

Figure 23:
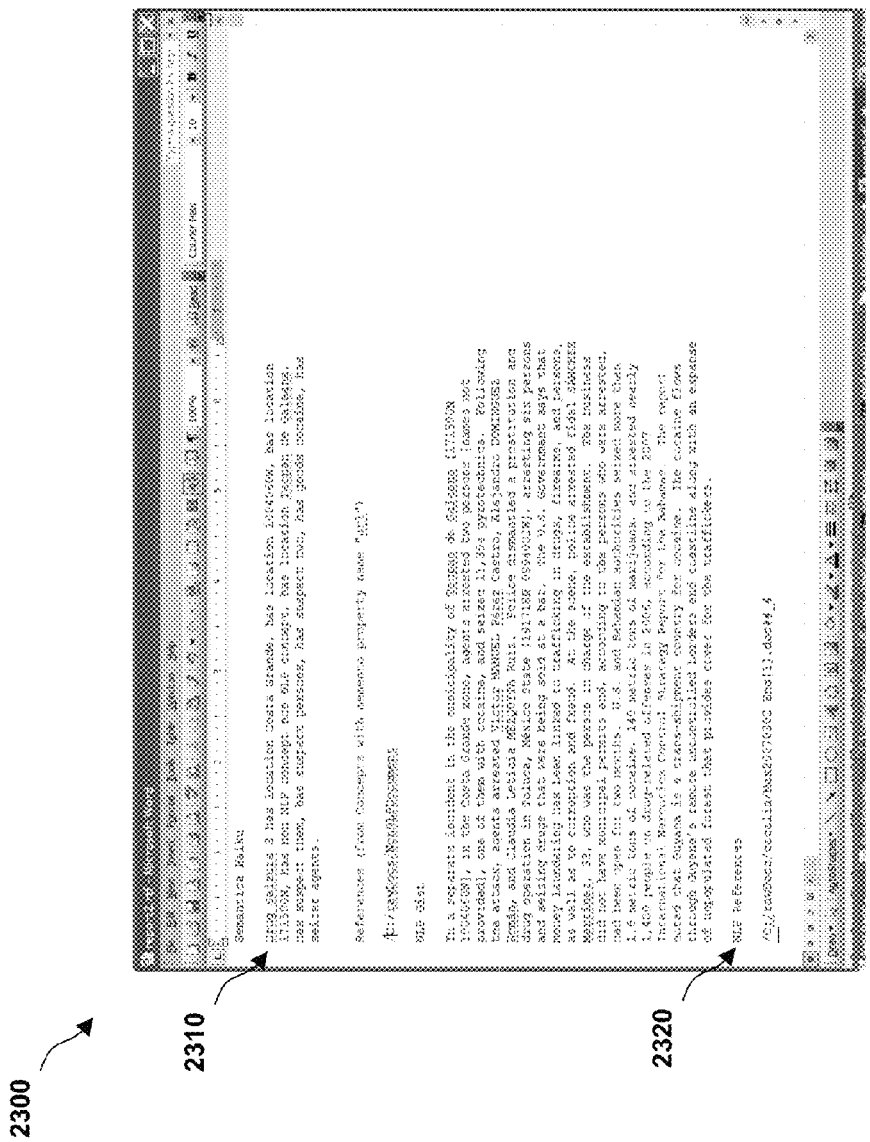
FIG. 23 is an illustration of an example screenshot illustrating Provenance and other Source References in accordance with aspects of the present invention.

One or more Text Summary Generation Modules configured for generating a text summary of selected content in a knowledge structure for sharing with other users. In an exemplary embodiment, this module may be implemented in several ways to generate different kinds of usable text summaries, depending on the desired use of the text. Three specific methods that may be particularly useful are:

A. Raw material for sentences. The purpose of this text summary is as the starting point for massaging the natural language in the selected contents of the knowledge structure into complete sentences and paragraphs in natural languages, as would be wanted in a written report intended to be read by other persons. In an exemplary embodiment, a string is built consisting of one substring for each triplet in the selected content, but avoiding repetition of concepts where feasible without ambiguity. If all triplets are connected to a single "central" concept, start with the name of the shared central concept and, for each triplet, append the relation type and second concept's name. For a more extensive graph, a starting point is chosen, either by the user or randomly, and the concepts in the graph are traversed, handling each concept and its directly connected triplets as in the previous simplest case. This is shown as the Semantic Haiku section 2310 of screenshot 2300 shown in FIG. 23.

In an exemplary embodiment, a random traversal may be used. There are circumstances in which either a breadth-first traversal or a depth-first traversal could be preferred by users who can then be offered a choice. In the case of a depth-first traversal, wherever the end of one triplet is the same as the beginning of the next triplet, duplications are removed, resulting in strings of concept, relation type, concept, relation type, concept, etc.

B. Raw material for triplet processing. The purpose of this form of text summary is to maintain the fundamentally network-of-triplets form of the content for use by programs that can re-import that network. This may be done by the following process.

Build up a string consisting of one substring for each triplet in the selected content built by concatenating the following with white space in between:
a. The name of the first concept in the triplet, surrounded by appropriate format-specific syntax such as HTML, RDF/OWL, Wiki Markup, etc., for representing details about each concept or entity.
b. The name of the relation type in the triplet.
c. The name of the second concept in the triplet, surrounded by appropriate format-specific syntax such as HTML, RDF/OWL, Wiki Markup, etc., for representing details about each concept or entity.

C. A "gist" or natural language summary of the content in complete sentences constructed by the NLP system from the portions of text from which the content was extracted. The purpose of this form of text summary is to reduce or eliminate the need to massage the text at all. It depends upon a component from the NLP system that is rare, the ability to generate usable complete sentences and paragraphs from concepts extracted by the NLP system. In the preferred embodiment, this also requires that the concepts originated from an NLP extraction in the first place.

The NLP system used in an exemplary embodiment using NLP tools provided by LCC as described previously herein provides a mechanism for the semantic network editing tool to request a "gist" of a set of extracted entities. The mechanism passes a list of NLP-system-provided "entity info objects" for the selected entities back to the NLP system which then collects, trims, and summarizes portions of the original text, and ranks them to determine an appropriate order, using the source natural language to create complete sentences summarizing the extracted content. The resulting gist returned by the NLP system is then inserted by the invention into various reports as requested by the user.

D. Provenance and Other References about the Source of the Material.

Provenance and examples of associated data and information are shown and described later herein. An example of this is shown in the NLP References section 2320 of example screenshot 2300 of FIG. 23.

Component 38—

One or more Report Collection and Insertion Modules configured for generating a collection of reports in the RTF format and other semantic network content documents from selected content in a network, and inserting them into the document repository for sharing with other users for their use in the network editing tool and other applications. These may include, but are not limited to, network-specification documents such as .SAR, .SARX, .XML and the like, pictures such as .JPG, .GIF, .PNG format documents and the like, tabular formatted documents such as tab-separated text, .CSV, .XSL, .XSLX and the like, geospatial representation documents such as .KML, .GMAP and the like, and associated knowledge objects.

Figure 24:
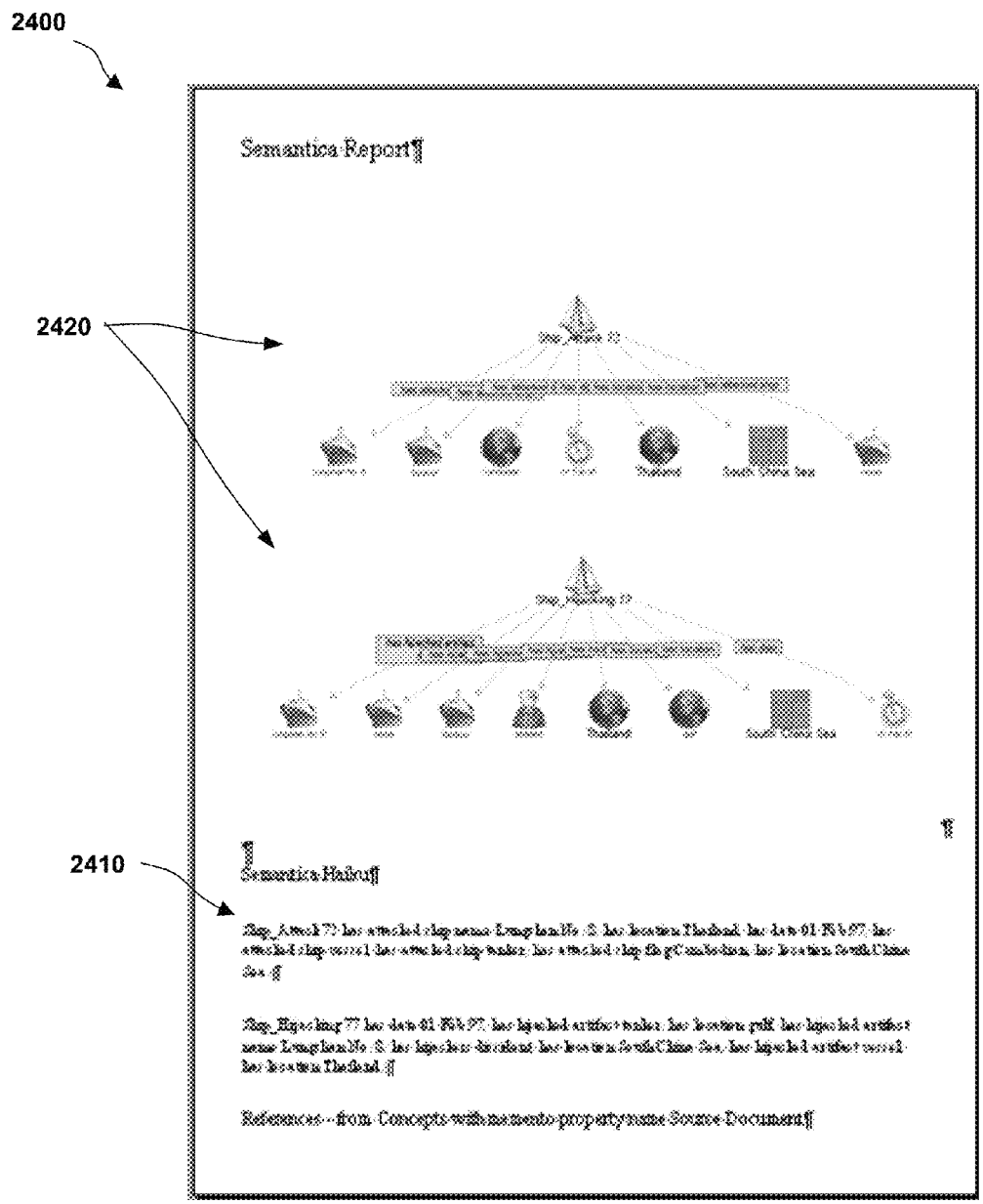
FIG. 24 is an illustration of an example Semantica Report illustrating details of an embodiment of the present invention.
Figure 25:
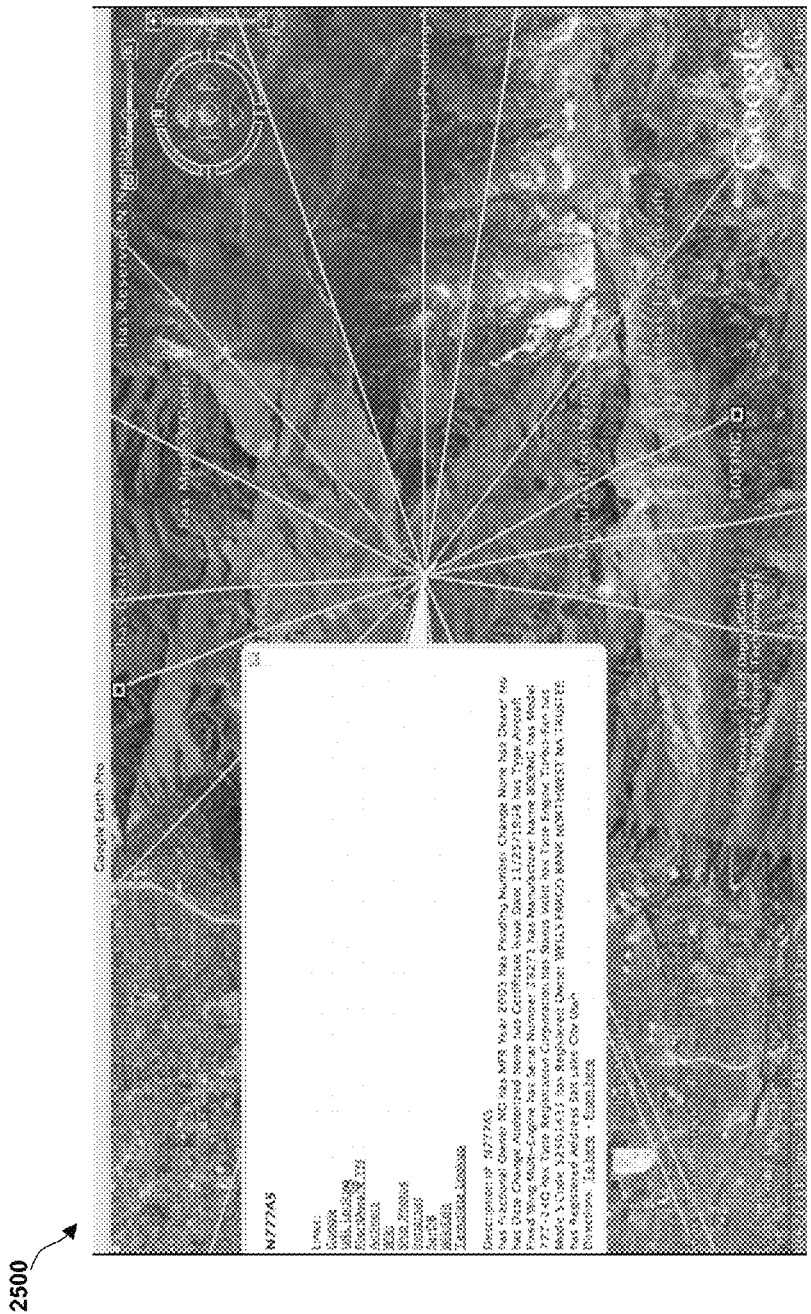
FIG. 25 is an illustration of a screen shot showing a Report with Embedded Geospatial information superimposed on a Google Earth map, in accordance with aspect of the present invention.

In an exemplary embodiment, this module may be implemented using the following process:
  i. Provide an interface to allow users to create a concept map or other subset of the entire knowledge structure containing the key information about the target entity, perhaps including the directly connected triplets, but also containing any other triplets in the semantic network that they consider relevant.
  ii. Upon request by the user, transform this subset into any or all of the following:
  a. A JPEG, PNG, or other graphics formatted file containing the image of a concept map of the subset 2420. FIG. 24 shows concept maps for the filled-in templates for a Ship_Attack and a Ship Hijacking included in an RTF file open in Microsoft Word.
  b. One or more text summaries 2410 produced as in the component above.
  c. If the concept map contains geolocated-elements, a JPEG, PNG, or other graphics-formatted file containing the concept map of the subset drawn on a map of the earth.
  d. If the concept map contains temporally-located elements, an MPEG, WMV, AVI, QuickTime, or other video-formatted file depicting in video the changes in the concept map of the subset over the full time extent covered by the temporal information. This can be drawn in 2-D or 3-D or drawn on a map of the earth (or other 3-D space) as appropriate.
  e. If the concept map contains geolocated elements and/or temporally-located elements, a KML, GMAP, or other geospatially- and temporally-formatted file describing how the concept map of the subset should be drawn on a map of the earth (or other 3-D space) by any geospatial and/or temporal viewer such as, but not limited to, Google Earth, Microsoft Virtual Earth, ArcGIS, etc. FIG. 25 shows a report produced with embedded geospatial information and a map 2500 superimposed on Google Earth via a KML file.
  f. An XML or other structured text format for describing the concept map or subset in a form that can be imported into network editing tools.
  g. Any of several custom or proprietary database-formatted files, including but not limited to 1) a SAR (Semantica ARchive) or other network editing tool's custom database format; or 2) a custom-schema database file for any database application, including but not limited to, postgreSQL, mySQL, Oracle, etc.; containing the concept map or subset for use by other users with applications that can open them.
  h. Any of several open-schema spreadsheet or database-formatted files designed for the sharing of semantic network-like content, including but not limited to 1) a database file for any database application, including but not limited to, postgreSQL, mySQL, Oracle, etc. 2) an XSL, XSLX, CSV, or other spreadsheet-formatted file for sharing tabular data, containing the concept map or subset for use by other users with applications that can open them.
  i. The entire content of the more complete knowledge structure within which the target entity exists (i.e., not a subset but the whole knowledge structure) stored in any of the formats listed in f)-h) above.

Component 39—
One or more Entity to Knowledge Object Conversion Modules configured for converting NLP system entities identified or annotated as referring to documents, web pages, or other URI-addressable entities such as URLs, email addresses or other suitable types into knowledge objects in the knowledge structure (rather than simple elements). In an exemplary embodiment, this mechanism is implemented as follows:
  i. Extract each web page, URL, or other URI-formatted entity into a corresponding URL knowledge object.
  ii. Extract each email entity reference into a corresponding URL knowledge object using the "mailto:" protocol.

Component 40—
One more Element Type Translation Modules configured for translating the organization of element types in a knowledge structure's ontology to the NLP system's entity types and their possibly-re-entrant hierarchical structure.

In an exemplary embodiment, this module may be implemented as shown in the following process:
  i. Starting with the root of the element type structure, do a pre-order traversal of the element type structure, using either the built-in supertype/subtype mechanism, or a custom relation type such as "has supertype/has subtype", generating a new entity type in the NLP system for each element type if it does not already exist, or merging any missing associated information into the corresponding entity type's extractor if it does exist. If the simplest traversal of the structure results in references to not-yet-existent entity types being created and the particular NLP system prevents this, then those insertions must be cached and deferred until the missing entity types are generated. This results in a significantly greater amount of work as each extractor must be modified many times.
  ii. A preferred variation of this can be used when it is desirable to insert only the portion of the ontology that is needed to completely transfer a particular semantic network template. In this case, the traversal is limited to the subset of the element type structure that contains all possible paths back up the hierarchy to the root. This is shown in FIG. 11 where the Coordinate, Place, and Location entity types above Latitude and Longitude have been imported to complete their portion of the NLP system's hierarchy.

Component 41—
One or more Entity Type Translation Modules configured for translating an NLP system's entity types and their possibly-re-entrant hierarchical structure into corresponding elements in the knowledge structure's ontology. In an exemplary embodiment, this module may be implemented using the following process:
  i. Starting at the root of the entity type tree for the NLP system, traverse the tree, using an already-visited cache to prevent revisits for re-entrant trees and caching forward references to non-existent types for later insertion for knowledge structures that prevent creation of temporary element types for later redefinition.
  ii. For each entity type visited during the traversal:
  a. Acquire the entity type definition.
  b. If the corresponding element type exists in the knowledge structure, merge any different features of the definition into the existing element type; otherwise create a new element type with the NLP system's entity type definition.
  c. Acquire the subtypes of the entity type.

d. Create any of those subtypes that do not already exist in the knowledge structure if necessary, and then give the subtype the current entity type as parent. When the network editing tool supports only a strict hierarchy in its built-in element type structure but allows triplets that tie two element types together, as in the current preferred embodiment, use a custom relation type such as "has supertype/has subtype" to store a non-hierarchical entity type structure to match a non-hierarchical ontology in the targeted NLP system.

e. If the NLP system supports direct association of extractor definitions with entity types, optionally translate the extractor definitions to semantic network element type templates. In the preferred embodiment's NLP system, this is not currently supported, so other less automatic mechanisms for translating between extractor definitions and element type templates are used.

Component 42—

One or more Assignment Storage Modules configured for storing the assignments of either NLP entity types or semantic network element types to the elements in individual triplets from an NLP extractor or an NLP-derived knowledge structure or the NLP system pedigree/provenance of individual pieces of knowledge by inserting a tagged representation of each element as text when they are generated into various reports, whether in text sections or in semi-structured sections. In an exemplary embodiment, the NLP system does not support a method of storing triplets in text documents, but for use with Wikipedia and other text reports, this module may be implemented as follows:

i. In the various text reports or semi-structured information inserted into the repository by other mechanisms, whenever a triplet would be inserted using the repository's markup system, use any of the available compatible tagging standards, including but not limited to XML, XHTML and the like, to tag the text of relation types.

For example, in a Wikipedia/Mediawiki embodiment, where other mechanisms would generate
[[Tim]] has dog [[Sasha]].
instead generate
<person>[ [Tim] ]</person>
<relationship>has dog</relationship>
<dingo>[[Sasha]]</dingo> ii. Where desired, other NLP-derived knowledge structure content such as properties, provenance or other pedigree, icons, pictures, or other attached documents, etc. can be inserted using a similar tagging process, thus including more information into the text while leaving it human-readable. This allows the easy embedding of any information that needs to be re-acquired upon ingesting the repository page back into the knowledge structure, as in the described module. For example, if the above triplet about Tim and Sasha was extracted from a particular unclassified document, it could be generated as
<person fromDoc=123.doc classification=unclass>
[ [Tim]]</person>
<relationship>has dog</relationship>
<dingo>[[Sasha]]</dingo> iii. A special case and especially powerful use of this approach allows the embedding of tagged triplets associated with an NLP-extracted entity into the text reports that can be allowed through some scripting code to display a preview of the NLP-extracted entity types, event roles, attributes or relationships when moused over by a user in a GUI.

For example, information that will be seen about Sasha might include:
<on-mouse-over source="TimAndSasha.sarx"
action=getTrip lets
target="Sasha">
<dingo>[[Sasha]]</dingo></on-mouse-over>
which indicates to the scripting language that if the word Sasha is moused-over, then it should access the XML representation of the network in TimAndSasha.sarx and get the triplets associated with the target "Sasha"

Figure 26:
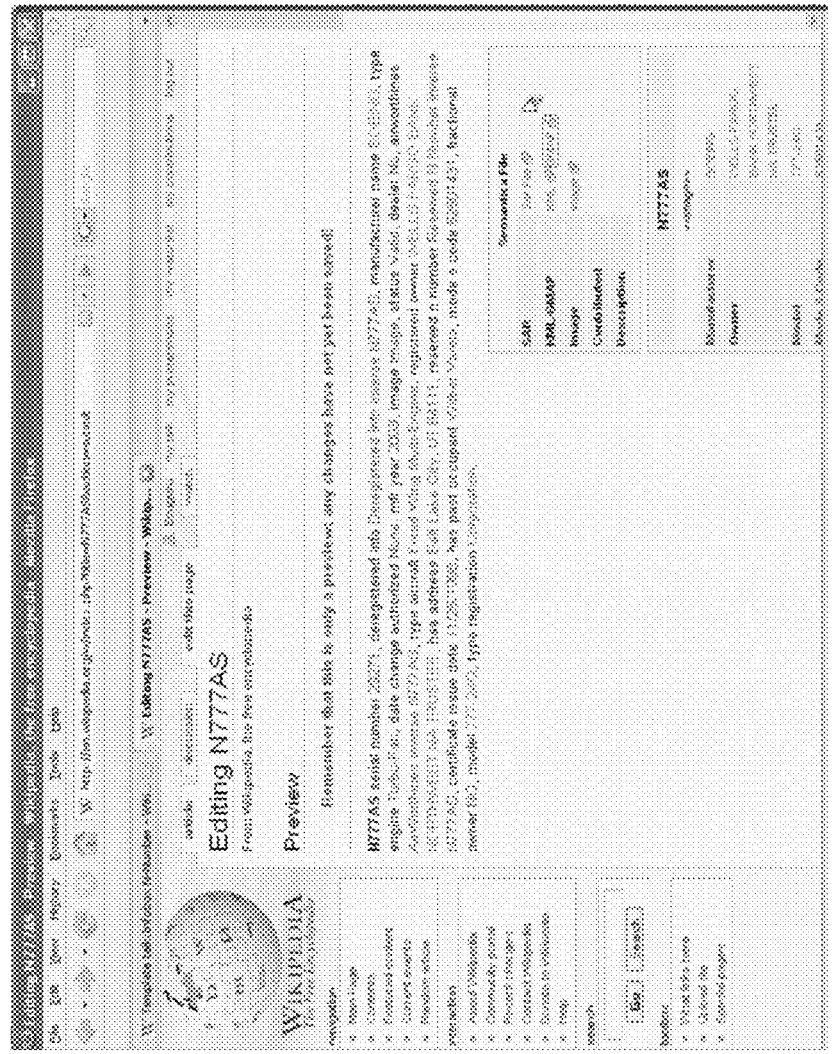
FIG. 26 is an illustration of an example Wiki page.

The extra tagging in i., ii., and iii. is in the underlying markup of the Wiki page shown in FIG. 26, although it does not show up in the rendering 2600 by the browser which typically ignores non-HTML tags.

Component 43—

One or More Modules for Translating Unstructured Web Pages into Knowledge Structure Content by processing or parsing information not created to fit the standards of other portions of this invention. In an exemplary embodiment, this may be done by processing directly with the NLP system and/or parsing other structured forms of tagging including but not limited to structured or semi-structured text sections. These sections include sections such as the See Also, References, Links and Categories sections in Wikipedia pages, In addition, this may be done by Wiki Structured tagging, RDF/OWL or other semantic web-oriented tagging methods, or presence of other tagging to indicate content relevant to knowledge structures such as element typing, triplets, provenance or pedigree, and other embedded references to other pages, and then submitting natural language embedded in these more structured portions to the NLP system for processing. Whenever a web page is visited, the module can present the user with choices of whether any or all of the available processing methods are to be applied to a particular page or batch of pages.

In an exemplary embodiment, this functionality may be implemented by a process as follows:

i. When the network editing tool is asked to ingest a web page, or any other suitably marked up text, the user is offered a choice of kinds of information to be looked for.

ii. The chosen text is then parsed to find any of the kinds of tagging chosen; or in the case of the choice to use the NLP system, all of the chosen text is passed to the NLP engine for conversion to a usable tagged representation.

iii. The resulting tagged text extracted either directly from the source text or received from the NLP engine is then translated into knowledge structure content.

iv. Specific sections of web pages in known structures, such as wiki or wikipedia pages, are processed as described in other sections herein, or as appropriate in translating from other structured or marked up text to knowledge structure content following the patterns established by the descriptions above, or standards developed for interpreting such structure as representing properties or network structures.

Component 44—

One or more Provenance Modules configured for processing, storing and/or presenting provenance of individual entities extracted by the NLP system and added to the semantic network. In an exemplary embodiment, this module gathers information about the source of an entity from the NLP system through its API, and adds it to the semantic network using a combination of properties, triplets, and knowledge objects attached to the entity. An example of this is shown in screen shot 1900 of FIG. 19. Such provenance information may include any or all of the following metadata, as well as other information (not shown), depending on availability and usefulness to a particular user:

i. Document Author/Source—the original author or information source that created the document.

ii. Extractor/Knowledge Structure Author—the user doing the extraction and otherwise annotating extracted elements in the knowledge structure, stored as a property.

iii. Dates of Authorship/Discovery/Extraction—when the document was created, when it was gathered for analysis, and when it was actually extracted, stored as properties when only used as a reference, but stored as triplets when organizing the documents as knowledge objects so that timeline processing can be applied in various views.

iv. Document—the full original document stored as a knowledge object in the knowledge structure and attached to elements extracted from it. Issues with bulk, with multiple copies of changing documents, and with availability of the original document from the document repository and/or NLP system make this optional and infrequently used.

v. Document Path—the path where the original source document was found in the file system, stored as a property. In an ideal implementation where either the documents in the repository or file system continue to be directly available, this path can be used to recover the original document in its full formatted form, including embedded pictures, movies, etc., avoiding the issues of storing the actual document.

vi. Index Access Path—the path for accessing the extracted entity through the NLP system's index file, providing access to the surrounding text as inserted into the index.

vii. Start and End Offsets in the Document.

viii. Sentence and Paragraph—the sentence and paragraph in which the entity appeared, attached as knowledge objects to the extracted entity.

ix. Type of Source—a characterization of the kind of source the document was received from, allowing storage of information that can contribute to various degrees of reliability judgment.

x. Classification—information about the security and access classifications on the information that was extracted that is derived from the combination of the document classification and the current environment and user classification.

xi. Unique Source Entity ID—an ID, either provided by the NLP system or constructed from other unique information provided by the NLP system, used to uniquely identify the particular entity so that later extractions of the same entity can be merged with this one.

xii. Unique Knowledge Structure Element ID—an ID constructed in the network editing tool, used to uniquely identify the particular entity and distinguish it from other elements having the same name.

xiii. Other metadata—other metadata is also stored in the semantic network as properties either on the entity, on the triplets, or on the knowledge objects, such as when and with what method the entity was indexed and/or extracted, any other useful metadata available from the document repository about the original document, etc.

Component 45—

One or more Indexing Modules configured to provide or support NLP indexing of semantic networks. In an exemplary embodiment, storage mechanisms for semantic networks as files are designed to also include the text portions in such a fashion that they will also be visible if indexed by the NLP system. For some text-based formats including but not limited to, RDF, SARX, and other XML-based formats, most of the text is already exposed. To expose the triplet contents for indexing, a text summary (as described previously herein) may also be included. For non-text formats for storing semantic networks whose format is modifiable by users of the format, including but not limited to SAR or other database formats, the associated databases are packaged together with ancillary files (summaries, titles, knowledge objects, etc.) and compressed. In these cases, the text versions of all entities and triplets and such are stored in additional ancillary files so that any NLP indexing system that delves into and extracts information from compressed format files, including but not limited to ZIP, JAR, and SAR, can index them also.

Component 46—

One or more Web Search Modules for supporting web searching of semantic networks. In an exemplary embodiment, the module for supporting NLP indexing of semantic networks also allows web search engines to properly handle semantic networks when they are visible through a web server because search engines are now typically configured to drill into and extract information from ZIP, JAR, and SAR files.

Component 47—

One or more Report Transfer Modules configured for moving and/or storing reports and semantic networks back into the document repository. In an exemplary embodiment using a file system for the document repository, users may be provided with an interface to store any generated reports and any saved semantic networks in the document repository for indexing, querying, and/or further editing.

Component 48—

One or more Desktop NLP Processing Modules configured for providing desktop NLP processing. In an exemplary embodiment, a desktop-computer system compatible version of the NLP system is included with the network editing tool, and a module is provided for users to select small quantities of documents for desktop processing by the local NLP system.

This may be supported by the On Demand NLP panel 1500's browse button 1510, as shown in FIG. 15, which supports selecting multiple documents. The Process button then processes the batch of chosen documents together in a single in-memory index.

Component 49—

One or more Gap Filling Modules configured to fill in a gap through querying the NLP system for relevant answers/responses and/or updating the semantic network based on the answers/responses. In an exemplary embodiment, a module is provided to select a gap in the network editing tool (see, for example, the selected triplet 1030 surrounded by a dashed line as shown in FIG. 10), and transform the triplets it takes part in, or to select an entity and transform all triplets it takes part in with gaps, and submit these to the NLP system in the form of a query.

Figure 27:
FIG. 27 is an illustration of an example screenshot of a Gap Filling User Interface in accordance with aspects of the present invention.

This process may be done by, for example, providing a user interface to facilitate the selection and/or may be automated in whole or part. In response, the NLP system returns a list of possible answers or results; that is, typically the answers/results will be text that might contain answers to the missing information. This list may then be presented to the user as shown in, for example, FIG. 27 and user interface 2700.

Figure 28:
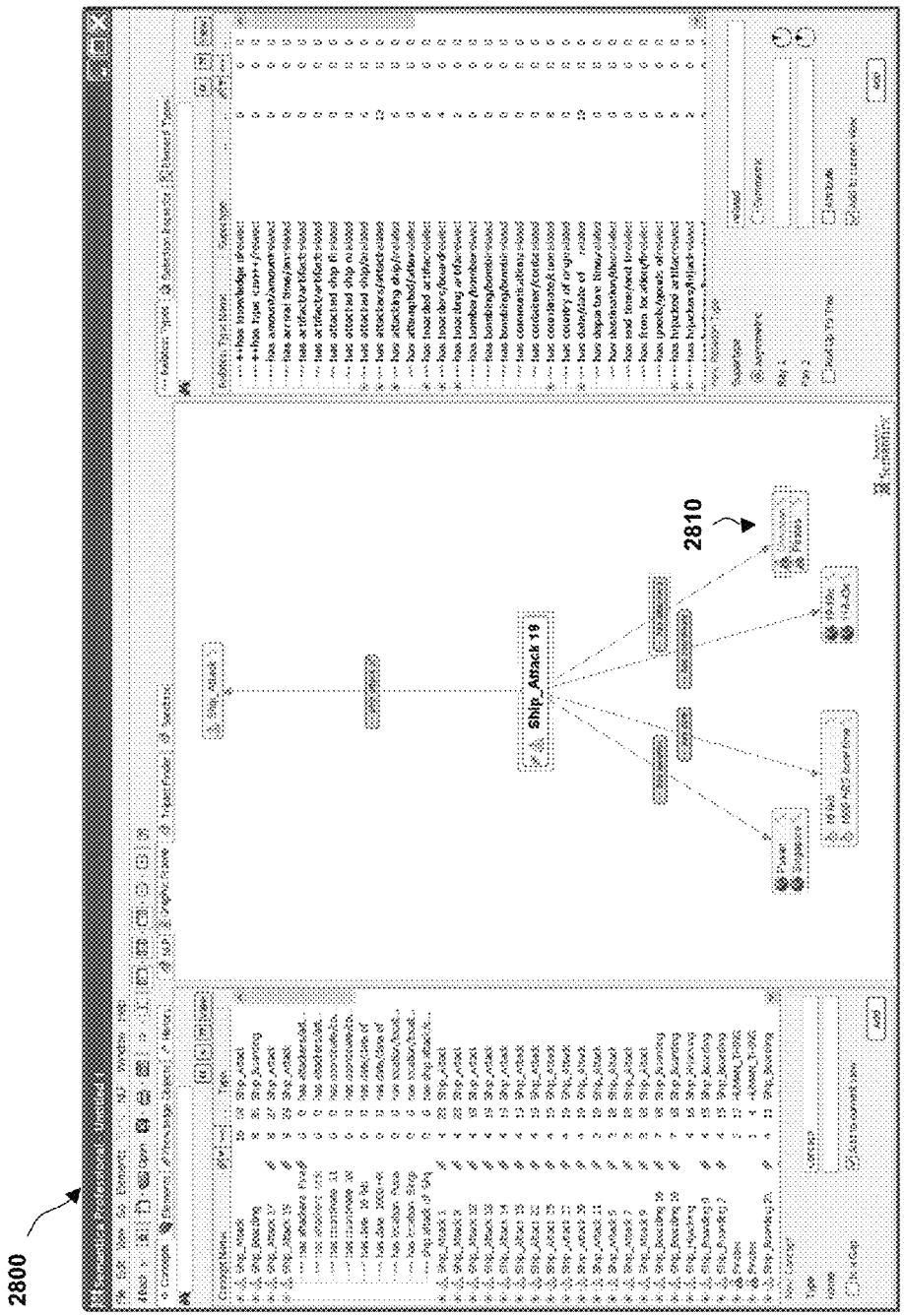
FIG. 28 is an illustration of an example result of Gap Filling for the entities shown in FIG. 10, in accordance with aspects of the present invention.

The user may then be able to choose, via a provided user interface such as UI 2700 (and, for example, the illustrated checkboxes or via another selection method), which results to use to fill in the missing information. An example result is shown in screen shot 2800 of FIG. 28. Screen shot 2800 illustrates the filled in information 2810 corresponding to the "Unknown" of FIG. 10, based on selection of "pirates" in UI 2700.

Component 50—

One or more Workflow Modules configured to support and facilitate full workflow between the NLP text views and the network editing visualization views by adding to the main menus, contextual menus and drag-and-drop mechanisms used in the various components associated with embodiments of the invention. In an exemplary embodiment, a user interface (UI) element of an embodiment of the invention is embedded as views, UI widgets, and other UI elements inside the semantic network editing tool, and the NLP system allows modification of contextual menus in the views it provides. This approach allows enhanced integration of the two tools through addition of special UI elements to simplify the workflow of the system's user.

Figure 29:
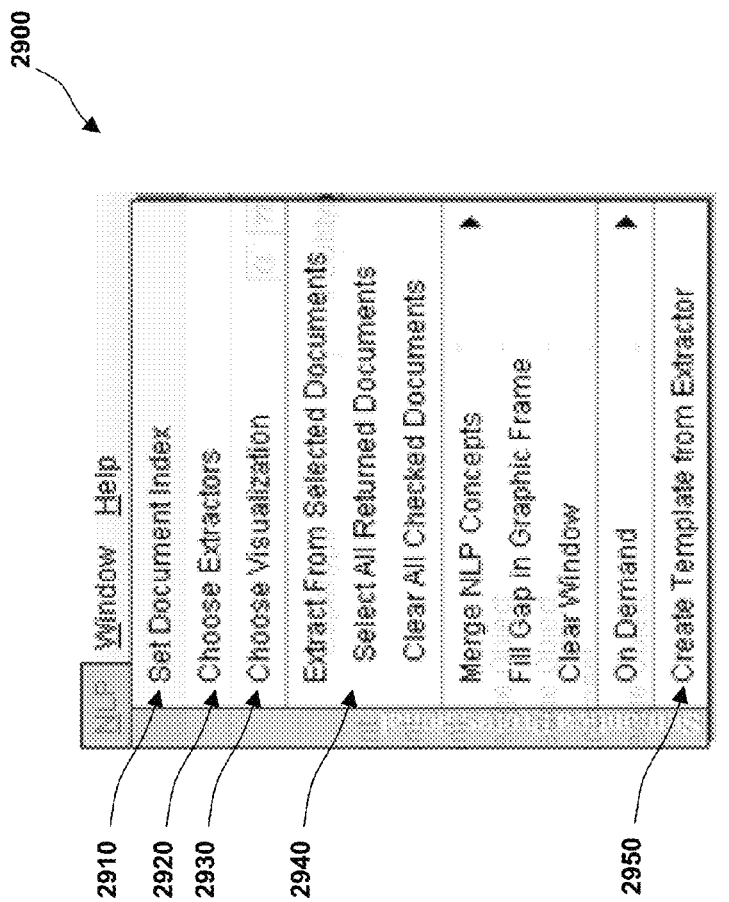
FIG. 29 is an illustration of an example screenshot showing Special Menu Items incorporated in a Network Editing Tool in accordance with aspects of the present invention.
Figure 30:
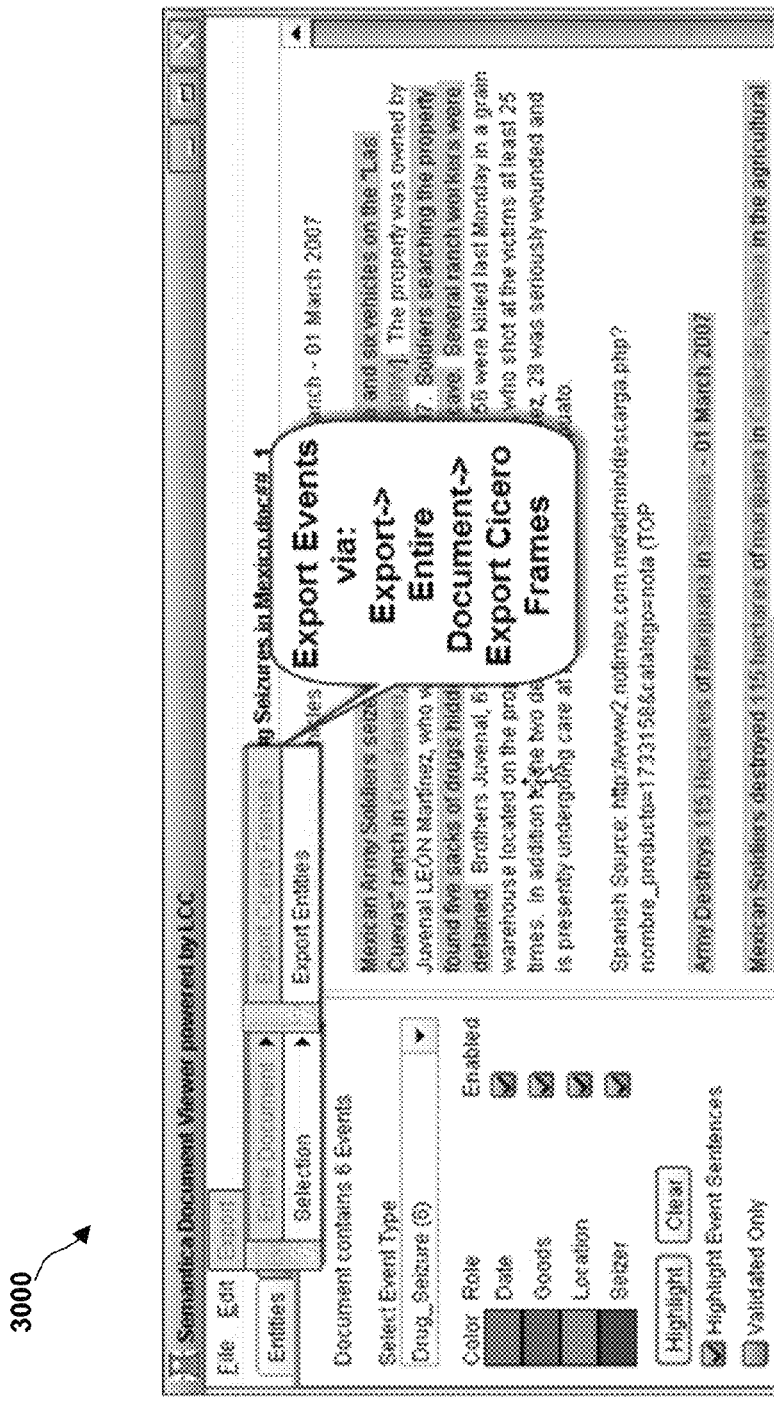
FIG. 30 is an illustration of an example screenshot showing extraction of Entities and their Types in accordance with aspects of the present invention.
Figure 31:
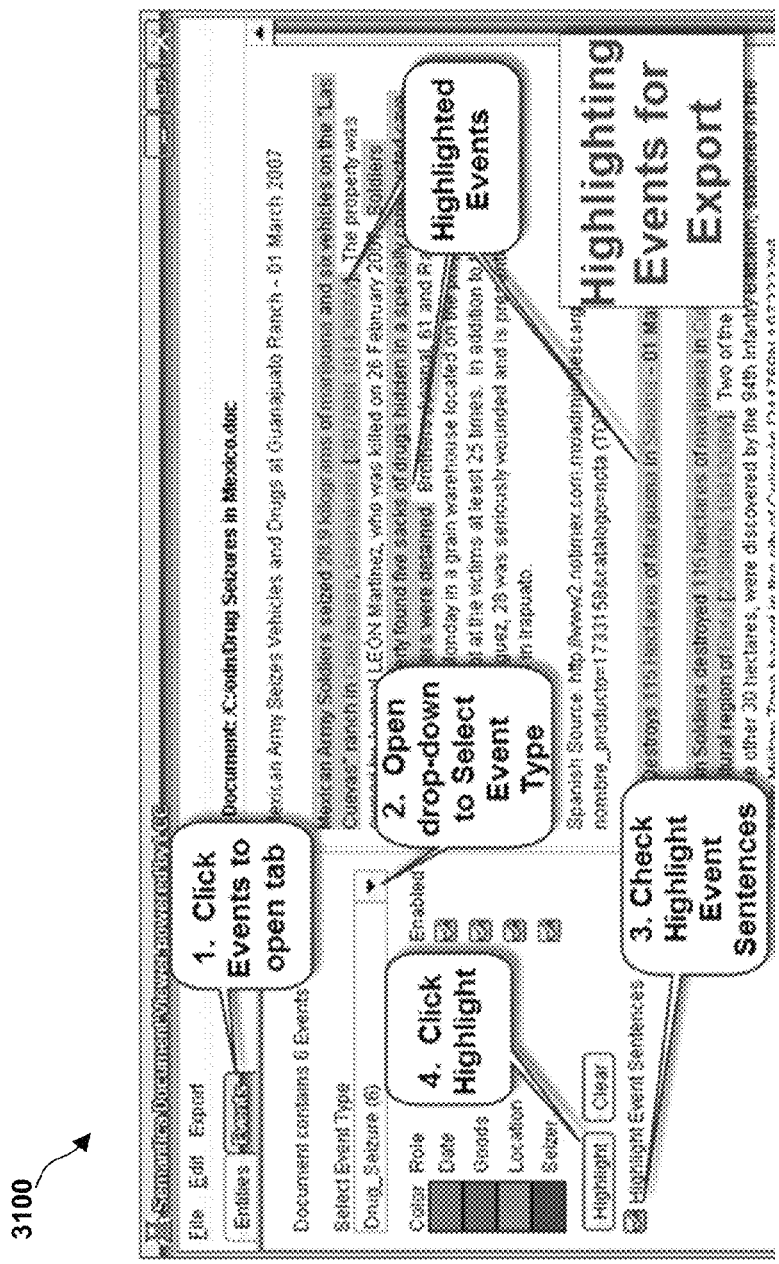
FIG. 31 is an illustration of an example screenshot showing extraction of all Events of Desired Types in accordance with aspects of the present invention.
Figure 32:
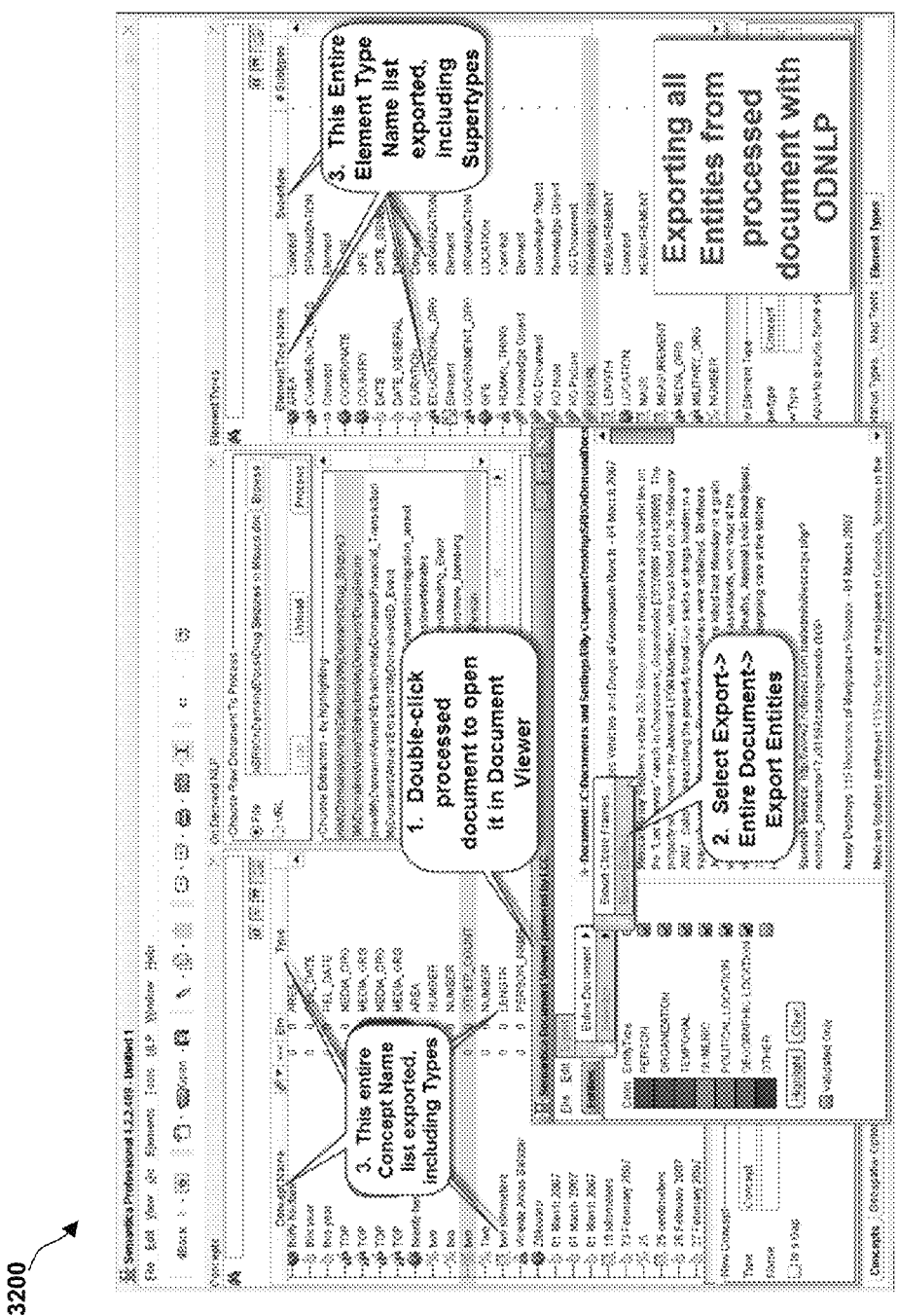
FIG. 32 is an illustration of an example screenshot showing Extraction being requested in accordance with aspects of the present invention.

For example, special menu items in an NLP menu 2900 in the main menu bar of the network editing tool, and/or in the contextual menus of the views provided by both tools, tie them together to simplify various tasks and associated processes. This is illustrated in FIG. 29.

i. Launching the companion tool directly using the communication medium and API provided.
 ii. Choosing which index or indices 2910 in the document repository should be searched or queried from the search/query views.
 iii. Choosing which NLP extractors 2920 should be applied to the documents being searched or queried.
 iv. Choosing a gazetteer to associate geo-locations with entities identified as locations by the NLP system.
 v. Choose various options/preferences for how the resulting extractions should be inserted into the semantic network 2930, e.g., whether to tie triplets directly to the named entity, or to create a numbered stand-in such as "Weapon Seizure 23", or how to merge extracted entities with existing entities.
 vi. Requesting mass extraction of a group of documents returned by the search/query mechanism 2940, extracting only entities and their types, as shown in FIG. 30, or all events of desired types, as shown with event types being requested in FIG. 31 and actual extraction being requested in FIG. 32, with the result similar to that shown in FIG. 10.
 vii. Defining a semantic network template 2950 from an NLP extractor, or an NLP extractor from a semantic network template as described above.
 viii. Load, unload, import or export various components such as the desktop NLP system, various indices or extractors, etc.
 ix. Adjust the extraction of a particular document by assigning different entity types to extracted entities, either correcting or refining the extractions identified by the NLP system.

Component 51—

One or more Drag and Drop Modules configured to support drag-and-drop operations between the views that tie them together may be provided to simplify various tasks, including but not limited to:

i. The ability to drag selected text from a view of a document and to drop it onto targets that accept text drops in the semantic network tool's views that can then incorporate that text into the names of elements, the contents of knowledge objects, and other text components of the semantic network and all of the other provenance and metadata provided by the NLP system being used.
 ii. The ability to drag any entities that have been identified and marked up in the NLP text views to initiate an extraction of those entities and insertion into the semantic network along with all of its metadata and other annotations provided by the NLP system. The information packaged in the dragged content includes enough information to allow access through the NLP system APIs to all relevant properties or other metadata of the entity including, but not limited to, its name, its entity types (including the hierarchy above them), and the provenance of the entity as described in detail above.
 iii. A mechanism for filling gaps by querying the NLP system for more information. The context of the gap to be filled is used to construct a question or other query as needed by the NLP system's question answering component. In the preferred embodiment, a pseudo-English query is constructed from the gap and any nearby concepts, along with their types and relationships, since that is the preferred query mechanism of the NLP system, allowing for a targeted answer based on answer-type detection when the hardware resources are sufficient to support it. If the NLP system used in this invention supports keyword-type queries as typically used to search the web, then the names of the related concepts and relationships in the context can be used to build a list of keywords. If the NLP system allows or requires more structured queries, a structured query with similar effect can be built from the same contextual information.

Figure 33:
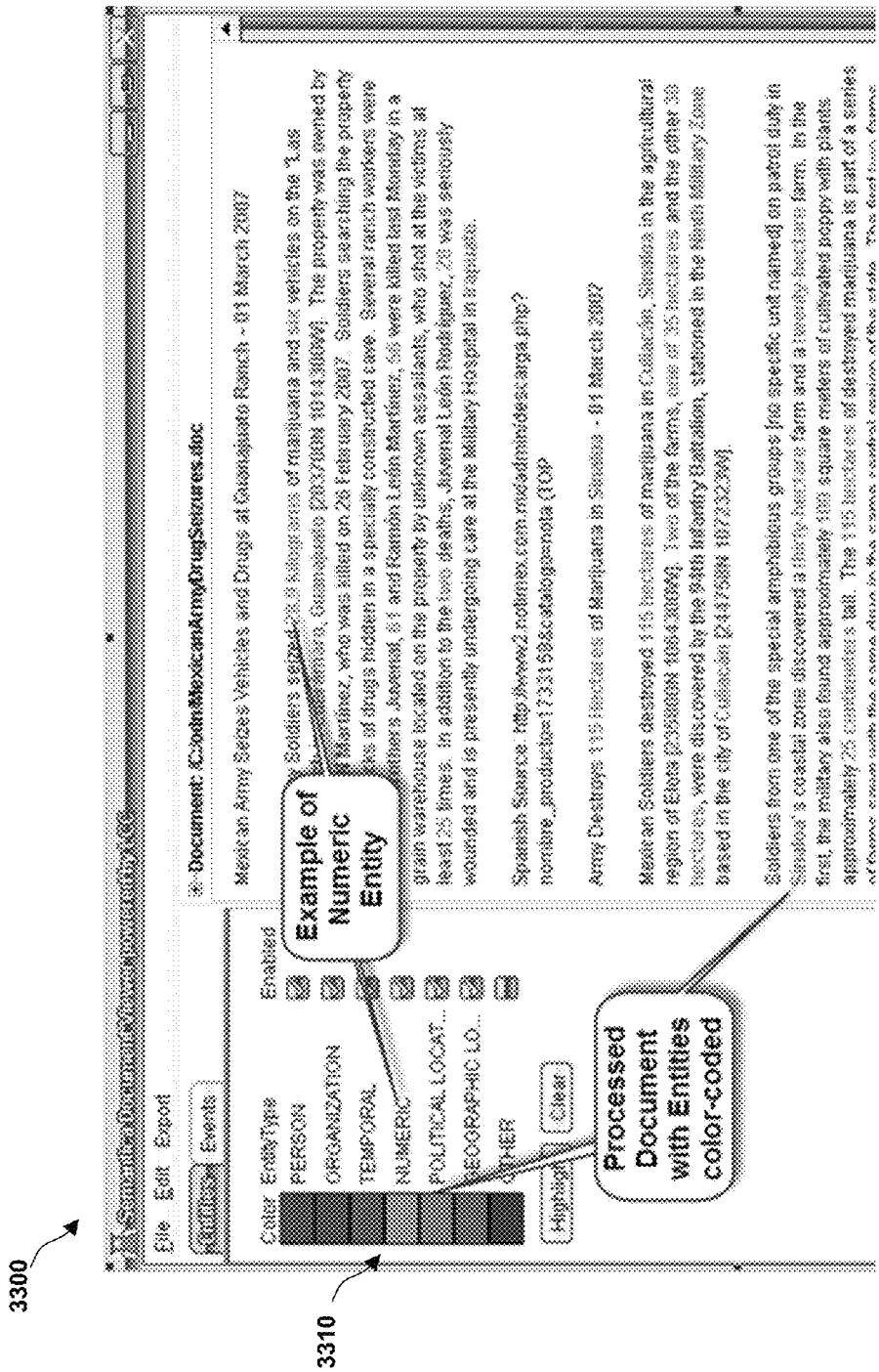
FIG. 33 is an illustration of an example screen shot showing colored entities that can be added to a Network Editing Tool.

FIG. 33 shows a close up view of an example screen shot 3300 showing colored entities 3310 that can be dragged into the network editing tool to add content or to fill gaps, bringing along the entity types assigned to them and the provenance.

Component 51—

One or Wiki Interface Modules as a module configured for using Wikipedia, or any custom wiki, to perform entity extraction and entity type assignment. This component may be one or more Wiki Interface Modules configured to interface with a wiki to perform quick entity extraction and entity type assignment in general domains or in custom domains supported by custom wikis. Details regarding interfacing with Wiki's is described in related U.S. patent application Ser. No. 12/436,0521, incorporated by reference herein. In an exemplary embodiment, this module takes advantage of two common functional abilities of wikis: the ability to request any entity's page simply by plugging its name into a suitable URI/URL and the ability to ask for a list of categories or entity types assigned to each page in the wiki. In an exemplary embodiment, these two capabilities are available in Wikipedia and any custom wiki built on top of the Mediawiki platform that underlies it.

An exemplary module's functionality may be accomplished by a process that performs the following stages:

a. Acquires a block of text for which entities and their types need to be extracted.
 b. Traverses the block of text in chunks or subsequences of N, N−1 . . . 1 adjacent words at a time, where N can be adjusted to fit the longest likely length of entity names in the particular domain supported by the wiki. For the preferred embodiment, which is in English and focused on people, places and common events involving them, N is typically 3, but easily adjusted to larger numbers for circumstances where, for example, people's names are frequently more than 3 words.
 c. For each subsequence of words, constructs a request to the wiki for a page with that sequence of words as its name.
 d. If there is no such page, moves on to the next subsequence.
 e. If the wiki returns a page with that name, marks the sequence of words as an entity, and link it to the returned page of the wiki. Requests from the wiki's returned page both any entity type stored in the page's corresponding InfoBox, and any set of categories or types provided by custom outside the InfoBox for the particular wiki. This can use a method tuned to the customs for the resulting categories or entity types to choose the most likely to be useful one and mark the entity as being of that type (probably the first or last one). Then move on to the next subsequence.

f. When the document has been processed completely, presents the resulting marked up document to the user in a manner similar to the preferred embodiment's NLP system, and support similar abilities to extract single entities with their types, or all the entities, or only entities of desired types in a similar fashion to what is described above.

g. When doing extraction into a semantic network, also imports any supertypes for the assigned types or categories to generate the supporting ontology similar to the method described above. It is noted that this process can be run in tandem with a more targeted NLP system as describe above to provide both trained (and trainable) entity, event, and relationship extraction, while also providing a more generalized (but perhaps less reliable) entity extraction and element type assignment mechanism for those portions of text that the NLP system is not trained for. This allows for several benefits, including: the ability to target known custom entities, such as persons, places, addresses, etc. of interest as well as the ability to find useful pieces of text based on a general encyclopedia of entities for a target language, such as Wikipedia provides, even when no trained NLP extractors exist.

It is noted that in various embodiments the present invention relates to one or more processes such as are described and/or illustrated herein. These processes are typically implemented in one or more modules as are described herein, and such modules may include computer software stored on a computer readable medium and/or in a computer memory or other instruction storage device, including instructions configured to be executed by one or more microprocessors or other digital instructions execution mechanisms to perform the described process steps or stages.

It is further noted that, while the processes described and illustrated herein may include particular steps or stages, it is apparent that other processes including fewer, more, or different stages than those described and shown are also within the spirit and scope of the present invention. Accordingly, as noted previously, the processes and associated modules shown herein are provided for purposes of illustration, not limitation.

Some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as described herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM memory devices. Examples of computer code may include machine code, such as produced by a compiler or other machine code generation mechanisms, scripting programs, and/or other code or files containing higher-level code that are executed by a computer using an interpreter or other code execution mechanism.

Computer code may be comprised of one or more modules executing a particular process or processes to provide useful results, and the modules may communicate with one another via means known or developed in the art. For example, some embodiments of the invention may be implemented using assembly language, Java, C, C#, C++, scripting languages, and/or other programming languages and software development tools as are known or developed in the art. Other embodiments of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. It is intended that the following claims and their equivalents define the scope of the invention.

We claim:

1. A computer implemented method for processing natural language information in conjunction with a semantic network editing tool, the method comprising:
providing a user interface in communication with the semantic network editing tool disposed to facilitate processing of information in a natural language processing (NLP) system from a collection of documents stored in a document repository so as to provide a set of processed information;
communicatively coupling the semantic network editing tool and the NLP system so as to facilitate transfer of data or information between the semantic network editing tool and the NLP system, the communicatively coupling including automatically converting one or more semantic network entity types and associated semantic network templates into NLP extractor definitions wherein the extractor definitions are trained using sample documents prior to being utilized to facilitate the processing of the information in the NLP system;
mapping, using the semantic network editing tool, entity types and relation types of a first ontology of the NLP system to element types and relation types, respectively, of a second ontology of a semantic network, the first ontology being different from the second ontology wherein ones of the element types are associated with ones of the semantic network templates, each of the semantic network templates including a plurality of roles corresponding to a plurality of additional element types;

responsive to a user input provided at the user interface, extracting the set of processed information from the NLP system for use in the semantic network; and using the semantic network editing tool to view and edit entities and triplets included within the semantic network.

2. The method of claim 1 wherein the coupling includes sharing data describing the second ontology of the semantic network and the first ontology of the NLP system.

3. The method of claim 1 wherein the coupling includes sharing data describing the contents of the semantic network and the NLP system.

4. The method of claim 2 wherein the second ontology of the semantic network and the first ontology of the NLP system are automatically mapped responsive to a change in the content of either the semantic network or the NLP system.

5. The method of claim 2 wherein the second ontology of the semantic network and the first ontology of the NLP system are transformed into corresponding formats in response to a user request received at the user interface.

6. The method of claim 1 wherein the user interface is incorporated in a user interface of the semantic network editing tool.

7. The method of claim 1 wherein the user interface is provided in an application external to the semantic network editing tool.

8. The method of claim 7 wherein the user interface is configured to interface with the semantic network editing tool through one or more application programming interfaces (APIs).

9. The method of claim 1 wherein the user interface is configured to provide one or more options for manual selection of one or more documents of the document repository for information processing in conjunction with the NLP system.

10. The method of claim 1 wherein one or more documents of the document repository are selected automatically for processing in conjunction with the NLP system in response to a user request received at the user interface.

11. The method of claim 1 wherein the coupling includes automatic conversion of one or more NLP extractors into semantic network entity types and their corresponding templates.

12. The method of claim 1 wherein the NLP system includes the functionality of entity recognition and entity type assignment, and further wherein these are provided by a wiki that includes the ability to receive requested pages for word sequences and provide corresponding response data.

13. The method of claim 12 wherein the wiki includes the ability to receive a request for a list of categories or types for any pages found responsive to the page request and provide corresponding response data.

14. The method of claim 1 further comprising providing a second user interface configured to graphically display a graph corresponding to-the semantic network responsive to said extracting.

15. A non-transitory machine readable medium including executable instructions for execution on a processor to:

provide a user interface in communication with a semantic network editing tool disposed to facilitate processing of information in a natural language processing (NLP) system from a collection of documents stored in a document repository so as to provide a set of processed information;

communicatively couple the semantic network editing tool and the NLP system so as to facilitate transfer of data or information between the semantic network editing tool and the NLP system;

automatically convert one or more semantic network entity types and associated semantic network templates into NLP extractor definitions wherein the extractor definitions are trained using sample documents prior to being utilized to facilitate the processing of the information in the NLP system;

map, using the semantic network editing tool, entity types and relation types of a first ontology of the NLP system to element types and relation types, respectively, of a second ontology of a semantic network, the first ontology being different from the second ontology wherein ones of the element types are associated with ones of the semantic network templates, each of the semantic network templates including a plurality of roles corresponding to a plurality of additional element types;

responsive to said coupling, extract the set of processed information from the NLP system for use in the semantic network; and use the semantic network editing tool to view and edit entities and triplets included within the semantic network.

16. The medium of claim 15 wherein the instructions for coupling include instructions for sharing data describing the second ontology of the semantic network and the first ontology of the NLP system.

17. The medium of claim 15 wherein the instructions for coupling include instructions for sharing data describing the contents of the semantic network and the NLP system.

18. The medium of claim 16 wherein the instructions including instructions for automatically synchronizing the second ontology of the semantic network and the first ontology of the NLP system responsive to a change in the content of either the semantic network or the NLP system.

19. The medium of claim 16 wherein the instructions include instructions for transforming the second ontology of the semantic network and the first ontology of the NLP system into corresponding formats in response to a user request received at the user interface.

20. The medium of claim 15 wherein the instructions include instructions for incorporating the user interface into a user interface of the semantic network editing tool.

21. The medium of claim 15 wherein the instructions include instructions to provide the user interface in an application external to the semantic network editing tool.

22. The medium of claim 21 wherein the instructions include instructions to interface the user interface with the semantic network editing tool through one or more application programming interfaces (APIs).

23. The medium of claim 15 wherein the instructions include instructions to provide, in the user interface, one or more options for manual selection of one or more documents of the document repository for information processing.

24. The medium of claim 15 wherein the instructions include instructions to automatically select one or more documents of the document repository for processing in conjunction with the NLP system in response to a user request received at the user interface.

25. The medium of claim 15 wherein instructions for coupling include instructions for automatic conversion of one or more NLP extractors into semantic network entity types and their corresponding templates.

26. The medium of claim 15 wherein the NLP system includes the functionality of entity recognition and entity type assignment, and further wherein these are provided by a wiki that includes the ability to receive requested pages for word sequences and provide corresponding response data.

27. The medium of claim 26 wherein the wiki includes the ability to receive a request for a list of categories or types for any pages found responsive to the page request and provide corresponding response data.

28. The medium of claim 15 further comprising instructions for providing a second user interface configured to graphically display information in the semantic network responsive to said extracting.

29. A system for processing natural language information, comprising:
   a processor;
   a memory; and
   a semantic network editing tool, said semantic network editing tool including one or more modules communicatively coupled with a natural language processing (NLP) system and a document repository to facilitate extraction of processed information from the NLP system for use in a semantic network wherein the semantic network editing tool is disposed to be used to view and edit entities and triplets included within the semantic network and to map entity types and relation types of a first ontology of the NLP system to element types and relation types, respectively, of a second ontology of the semantic network, the first ontology being different from the second ontology;
   wherein communicatively coupling the one or more modules with the NLP system includes automatically converting one or more semantic network entity types and associated semantic network templates into NLP extractor definitions and wherein the extractor definitions are trained using sample documents prior to being utilized to facilitate the extraction of the processed information from the NLP system,
   wherein ones of the element types are associated with ones of the semantic network templates, each of the semantic network templates including a plurality of roles corresponding to a plurality of additional element types.

30. The system of claim 29 further comprising the document repository.

31. The system of claim 29 further comprising the NLP system.

32. The system of claim 29 further comprising the document repository and the NLP system.

33. The method of claim 1 wherein the processed information includes a set of triplets associating the entities with each other and with other information within the documents.

34. The method of claim 33 wherein the set of triplets includes one or more groups of triplets relating to one or more user-specified target entities.

35. The method of claim 34 wherein the one or more groups of triplets are selected for inclusion based on one or more relation types prescribed for an element type by the second ontology.

36. The method of claim 33 wherein the set of triplets includes one or more groups of triplets relating to an event.

37. The method of claim 1 wherein the processed information from the NLP system includes at least one of a set of triplets or frames identifying attributes or characteristics of the entities.

38. The method of claim 1 wherein the processed information from the NLP system includes at least one of a judgment, opinion, perspective, or point of view of one of the entities relative to another of the entities.

39. The method of claim 1 wherein the processed information from the NLP system includes at least one of a judgment, opinion, perspective, or point of view of one of the entities relative to an event.

40. The method of claim 1 wherein the processed information includes provenance information concerning one or more of the entities, attachments, or triplets.

41. The method of claim 1 wherein the processed information includes one or more text components from which one of the entities was extracted, the one or more text components being included within the collection of documents.

42. The method of claim 1 wherein the processed information includes one or more text components from which one of the entities was extracted, the one or more text components being included as attachments within the semantic network.

43. The method of claim 1 wherein the processed information includes a summary of the entities and associated triplets.

44. The method of claim 42 wherein the summary of the entities and associated triplets is included as an attachment within the semantic network.

45. The method of claim 43 wherein the summary of the entities and associated triplets is included as a new document in the repository.

46. The method of claim 1, further including:
   transforming a representation of a knowledge structure within the semantic network into a document, the knowledge structure containing information relevant to one of the entities;
   storing the document within the document repository.

47. The method of claim 46 wherein the document is formatted in a structured text format.

48. The method of claim 46 wherein the document is a tabular formatted file or a graphics formatted file.

49. The method of claim 1, further including:
   identifying one or more gaps in relations or entities in the triplets in the semantic network;
   submitting a query to the NLP system relating to the gaps.

50. The method of claim 49 wherein the query is accompanied by one or more restrictions on the gaps.

51. The method of claim 50 wherein the one or more gaps comprise one or more triplets with gap entities.

52. The method of claim 1 further including extracting events from the NLP system and mapping the events to elements of the semantic network.

53. The non-transitory machine readable medium of claim 15 wherein the instructions include instructions for execution on a processor to extract events from the NLP system and map the events to elements of the semantic network.

54. The method of claim 1 wherein the coupling includes automatically converting one or more semantic network entity types into NLP extractor definitions wherein at least one of the NLP extractor definitions includes a plurality of role names respectively associated with semantic network relation types and semantic network entity types.

\* \* \* \* \*